United States Patent
Liu et al.

(10) Patent No.: US 11,682,966 B2
(45) Date of Patent: Jun. 20, 2023

(54) PIPELINE RESONANT AND NON-RESONANT SWITCHED CAPACITOR CONVERTER CIRCUIT

(71) Applicant: Richtek Technology Corporation, Zhubei (TW)

(72) Inventors: Kuo-Chi Liu, Hsinchu (TW); Ta-Yung Yang, Taoyuan (TW); Chung-Lung Pai, Hsinchu (TW)

(73) Assignee: RICHTEK TECHNOLOGY CORPORATION, Zhubei (TW)

( * ) Notice: Subject to any disclaimer, the term of this patent is extended or adjusted under 35 U.S.C. 154(b) by 174 days.

(21) Appl. No.: 17/325,689

(22) Filed: May 20, 2021

(65) Prior Publication Data

US 2021/0367511 A1 Nov. 25, 2021

Related U.S. Application Data

(60) Provisional application No. 63/027,818, filed on May 20, 2020, provisional application No. 63/029,714, filed on May 26, 2020, provisional application No. 63/036,407, filed on Jun. 8, 2020, provisional application No. 63/041,135, filed on Jun. 19, 2020, provisional application No. 63/056,544, filed on Jul. 24, 2020, provisional application No. 63/108,455, filed on Nov. 2, 2020, provisional application No. 63/118,615, filed on Nov. 25, 2020, provisional application No. 63/153,401, filed on Feb. 25, 2021, provisional application No. 63/153,404, filed on Feb. 25, 2021, provisional application No. 63/166,299, filed on Mar. 26, 2021.

(51) Int. Cl.
  *H02M 3/00* (2006.01)
  *H02M 3/07* (2006.01)

(52) U.S. Cl.
  CPC ............... *H02M 3/07* (2013.01); *H02M 3/01* (2021.05)

(58) Field of Classification Search
  CPC .................................. H02M 3/07; H02M 3/01
  See application file for complete search history.

(56) References Cited

U.S. PATENT DOCUMENTS 10,027,223 B1 * 7/2018 Zhang .................... H02M 3/07
2019/0272001 A1 * 9/2019 Puggelli .................. H02J 7/00

* cited by examiner

*Primary Examiner* — Adolf D Berhane
*Assistant Examiner* — Afework S Demisse
(74) *Attorney, Agent, or Firm* — Tung & Associates

(57) ABSTRACT

A switched capacitor converter circuit includes: plural capacitors and plural switches which periodically switch the coupling relationships of the plural capacitors. During a first period, the switches control at least two of the capacitors to be electrically connected in series between the first power and the second power, and control a first capacitor of the capacitors to be electrically connected in parallel to the second power. During a second period, the switches control at least two of the capacitors to be electrically connected in series between the second power and a ground voltage level, and control a second capacitor of the capacitors to be electrically connected in parallel with the second power, thereby executing power conversion between the first power and the second power.

41 Claims, 40 Drawing Sheets

Q3, Q5, Q6, Q10 are always OFF
C1, C2 are Floating

Q5, Q6 are always OFF
C2 is Floating

Q5, Q6 are always OFF

C2 is Floating

Q5, Q6 are always OFF
C2 is Floating

PIPELINE RESONANT AND NON-RESONANT SWITCHED CAPACITOR CONVERTER CIRCUIT

CROSS REFERENCE

The present invention claims priority to following provisional applications, Ser. No. 63/027818, filed on May 20, 2020; provisional applications, Ser. No. 63/029,714, filed on May 26, 2020; provisional applications, Ser. No. 63/036,407, filed on Jun. 8, 2020; provisional applications, Ser. No. 63/041,135, filed on Jun. 19, 2020; provisional applications, Ser. No. 63/056,544, filed on Jul. 24, 2020; provisional applications, Ser. No. 63/108,455, filed on Nov. 2, 2020; provisional applications, Ser. No. 63/118,615, filed on Nov. 25, 2020; provisional applications, Ser. No. 63/153,401, filed on Feb. 25, 2021; provisional applications Ser. No. 63/153,404, filed on Feb. 25, 2021; provisional applications, Ser. No. 63/166,299, filed on Mar. 26, 2021, all of which applications are incorporated herein by their reference in their entirety.

BACKGROUND OF THE INVENTION

Field of Invention

The present invention relates to a switched capacitor converter circuit; particularly, it relates to a pipeline switched capacitor converter circuit. The present invention also relates to a pipeline resonant switched capacitor converter circuit.

Description of Related Art

Please refer to FIGS. 1A-1E which show schematic diagrams of several conventional switched capacitor converters. FIGS. 1A-1E show a ladder type switched capacitor converter, a Dickson type switched capacitor converter, a Fibonacci type switched capacitor converter, a Series-Parallel type switched capacitor converter and a Doubler type switched capacitor converter, respectively. The switched capacitor converters shown in FIGS. 1A-1E can convert a first power (corresponding to V1 shown in FIGS. 1A-1E) to a second power (corresponding to V2 shown in FIGS. 1A-1E) or convert the second power to the first power.

Please refer to FIG. 2A and FIG. 2B. FIG. 2A shows a schematic diagram of a conventional switched resonator converter. FIG. 2B shows a typical capacitance-voltage characteristic curve of a capacitor. As shown in FIG. 2B, the equivalent capacitance of a capacitor decreases drastically as the voltage across the capacitor increases. The prior art switched capacitor converters shown in FIG. 1A to FIG. 1E and the prior art switched resonator converter shown in FIG. 2A have the following drawbacks that: it is required for the voltage across the capacitor to be high, so the capacitor needs to withstand high voltage and the required capacitor size is large.

In view of the above, to overcome the drawbacks in the prior art, the present invention proposes a pipeline switched capacitor converter circuit, which can be implemented as a pipeline resonant switched capacitor converter circuit or a pipeline non-resonant switched capacitor converter circuit. As compared to the prior arts shown in FIG. 1A to FIG. 1E and FIG. 2A, the present invention is advantageous in that: the conversion stages of the pipeline switched capacitor converter circuit can be recursively expanded to increase the scaling factor of the conversion. Besides, in the pipeline resonant switched capacitor converter circuit and the pipeline non-resonant switched capacitor converter circuit according to the present invention, because the voltage across the capacitor is relatively lower, the capacitor does not need to withstand high voltage and the required capacitor size can be small, and, the resonant frequency of the present invention is relatively more stable. In addition, under the same nominal capacitance, the effective capacitance of the present invention is higher, so the transient response is better. Moreover, the pipeline resonant switched capacitor converter circuit of the present invention achieves better current balance.

SUMMARY OF THE INVENTION

From one perspective, the present invention provides a switched capacitor converter circuit, which is configured to operably convert a first power to a second power or which is configured to operably convert the second power to the first power; the switched capacitor converter circuit comprising: at least one switching converter; and a control circuit, which is configured to operably control the switching converter; wherein the at least one switching converter includes: a plurality of capacitors; and a plurality of switches, which are controlled by the control circuit to operably and periodically switch the plurality of capacitors according to a plurality of cycle periods; wherein during a first period within one cycle period, the plurality of switches are configured to operably control at least two of the plurality of capacitors to be electrically connected in series between the first power and the second power, and the plurality of switches are configured to operably control at least one of the plurality of capacitors to be electrically connected in parallel to the second power; wherein during a second period within the one cycle period, the plurality of switches are configured to operably control at least two of the plurality of capacitors to be electrically connected in series between the second power and a ground voltage level, and the plurality of switches are configured to operably control at least one of the plurality of capacitors to be electrically connected in parallel to the second power; wherein the capacitor electrically connected in parallel to the second power during the first period is different from the capacitor electrically connected in parallel to the second power during the second period; whereby power conversion between the first power and the second power is achieved during the plurality of cycle periods.

In one embodiment, the plurality of capacitors include: a first capacitor, a second capacitor and a third capacitor, which are coupled to one another; wherein during the first period within the one cycle period, the plurality of switches are configured to operably control the first capacitor and the third capacitor to be electrically connected in series between the first power and the second power, and the plurality of switches are configured to operably control the second capacitor to be electrically connected in parallel to the second power; wherein during the second period within the one cycle period, the plurality of switches are configured to operably control the second capacitor and the third capacitor to be electrically connected in series between the second power and the ground voltage level, and the plurality of switches are configured to operably control the first capacitor to be electrically connected in parallel to the second power; whereby power conversion between the first power and the second power is achieved during the plurality of cycle periods.

In one embodiment, a ratio of a first voltage of the first power to a second voltage of the second power is equal to 4.

In one embodiment, a ratio of a voltage across the third capacitor to the second voltage is equal to 2, whereas, a ratio of a voltage across the first capacitor to the second voltage is equal to 1, and whereas, a ratio of a voltage across the second capacitor to the second voltage is equal to 1.

In one embodiment, the plurality of switches include: a first switch, a second switch, a third switch, a fourth switch, a fifth switch, a sixth switch, a seventh switch, an eighth switch, a ninth switch and a tenth switch; wherein during the first period within the one cycle period, the first switch, the second switch and the third switch are ON to control the first capacitor and the third capacitor to be electrically connected in series between the first power and the second power, and the fourth switch and the fifth switch are ON to control the second capacitor to be electrically connected in parallel to the second power, while the sixth switch to the tenth switch are OFF; wherein during the second period within the one cycle period, the sixth switch, the seventh switch and the eighth switch are ON to control the second capacitor and the third capacitor to be electrically connected in series between the second power and the ground voltage level, and the ninth switch and the tenth switch are ON to control the first capacitor to be electrically connected in parallel to the second power; whereby power conversion between the first power and the second power is achieved during the plurality of cycle periods.

In one embodiment, the switched capacitor converter circuit further comprises: at least one inductor coupled to at least one current path of the plurality of capacitors; wherein the plurality of switches are further configured to operably and periodically switch a coupling relationship between the at least one inductor and the first capacitor and/or a coupling relationship between the at least one inductor and the second capacitor, so that the at least one inductor and the first capacitor and/or the at least one inductor and the second capacitor operate in resonant fashion, thereby achieving power conversion between the first power and the second power.

In one embodiment, the switched capacitor converter circuit further comprises one of the following features: (1) the at least one inductor includes: a first inductor and a second inductor, wherein the first capacitor is directly electrically connected in series to the first inductor, so that the first capacitor and the first inductor constitutes a first resonant tank, and wherein the second capacitor is directly electrically connected in series to the second inductor, so that the second capacitor and the second inductor constitutes a second resonant tank; wherein during the first period within the one cycle period, the plurality of switches are configured to operably control the first resonant tank and the third capacitor to be electrically connected in series between the first power and the second power, and the plurality of switches are configured to operably control the second resonant tank to be electrically connected in parallel to the second power; wherein during the second period within the one cycle period, the plurality of switches are configured to operably control the second resonant tank and the third capacitor to be electrically connected in series between the second power and the ground voltage level, and the plurality of switches are configured to operably control the first resonant tank to be electrically connected in parallel to the second power; (2) the at least one inductor is coupled between the second power and a switching node; wherein during the first period within the one cycle period, the plurality of switches control the first capacitor and the third capacitor to be electrically connected in series to the at least one inductor via the switching node, and the series circuit formed by the first capacitor, the third capacitor and the at least one inductor is electrically connected in series between the first power and the second power, and the plurality of switches control the second capacitor to be electrically connected in series to the at least one inductor via the switching node, and the series circuit formed by the second capacitor and the at least one inductor is electrically connected in parallel to the second power; wherein during the second period within the one cycle period, the plurality of switches control the second capacitor and the third capacitor to be electrically connected in series to the at least one inductor via the switching node, and the series circuit formed by the second capacitor, the third capacitor and the at least one inductor is electrically connected in series between the second power and the ground voltage level, and the plurality of switches control the first capacitor to be electrically connected in series to the at least one inductor via the switching node, and the series circuit formed by the first capacitor and the at least one inductor is electrically connected in parallel to the second power; or (3) the at least one inductor includes: a third inductor and a fourth inductor, wherein the third inductor is coupled between the second power and a first switching node, whereas, the fourth inductor is coupled between the second power and a second switching node; wherein during the first period within the one cycle period, the plurality of switches control the first capacitor and the third capacitor to be electrically connected in series to the third inductor via the first switching node, and the series circuit formed by the first capacitor, the third capacitor and the third inductor is electrically connected in series between the first power and the second power, and the plurality of switches control the second capacitor to be electrically connected in series to the fourth inductor via the second switching node, and the series circuit formed by the second capacitor and the fourth inductor is electrically connected in parallel to the second power; wherein during the second period within the one cycle period, the plurality of switches control the second capacitor and the third capacitor to be electrically connected in series to the fourth inductor via the second switching node, and the series circuit formed by the second capacitor, the third capacitor and the fourth inductor is electrically connected in series between the second power and the ground voltage level, and the plurality of switches control the first capacitor to be electrically connected in series to the third inductor via the first switching node, and the series circuit formed by the first capacitor and the third inductor is electrically connected in parallel to the second power.

In one embodiment, a capacitance of the third capacitor is far more greater than a capacitance of the first capacitor and the capacitance of the third capacitor is far more greater than a capacitance of the second capacitor, so that a first resonant frequency of the first capacitor and the at least one inductor is greater than or equal to ten times of a third resonant frequency of the third capacitor and the at least one inductor, and a second resonant frequency of the second capacitor and the at least one inductor is greater than or equal to ten times of a third resonant frequency of the third capacitor and the at least one inductor.

In one embodiment, in the feature (1), a resonant current of the at least one inductor is a full-wave AC sinusoidal wave.

In one embodiment, in the feature (2) or the feature (3), a resonant current of the at least one inductor is a full-wave rectified sinusoidal wave.

In one embodiment, at least a part of the plurality of switches are switched at time points at which an inductor current of the at least one inductor is zero, so that the at least a part of the plurality of switches achieve zero current switching.

In one embodiment, a first part of the plurality of switches are switched after a delay period subsequent to a time point at which the inductor current reaches zero, so that the inductor current of the at least one inductor continues flowing, so that a second part of the plurality of switches achieve zero voltage switching; or the first part of the plurality of switches are switched before a preceding period prior to the time point at which the inductor current reaches zero, so that the second part of the plurality of switches achieve the zero voltage switching.

In one embodiment, in a 2-fold conversion mode, a part of the plurality of switches are always ON, whereas, another part of the plurality of switches are always OFF, and whereas, yet another part of the plurality of switches are configured to operably switch one of the second capacitor and the third capacitor according to the plurality of cycle periods, so that during the first period within the one cycle period, one of the second capacitor and the third capacitor is electrically connected in series between the first power and the second power, and during the second period within the one cycle period, said one of the second capacitor and the third capacitor is electrically connected in parallel to the second power, such that a ratio of a first voltage of the first power to a second voltage of the second power is equal to 2.

In one embodiment, in a 2-fold conversion mode, a part of the plurality of switches are always ON, whereas, another part of the plurality of switches are always OFF, and whereas, yet another part of the plurality of switches are configured to operably switch one of the second capacitor and the third capacitor according to the plurality of cycle periods, so that during the first period within the one cycle period, said one of the second capacitor and the third capacitor and the at least one inductor are electrically connected in series between the first power and the second power, and during the second period within the one cycle period, a series circuit formed by the capacitor and the at least one inductor is electrically connected in parallel to the second power, such that a ratio of a first voltage of the first power to a second voltage of the second power is equal to 2, wherein the capacitor and the at least one inductor operate in resonant fashion to achieve power conversion between the first power and the second power.

In one embodiment, in a 3-fold conversion mode, a part of the plurality of switches are always ON, whereas, another part of the plurality of switches are always OFF, and whereas, yet another part of the plurality of switches are configured to operably switch the first capacitor and the third capacitor according to the plurality of cycle period, so that during the first period within the one cycle period, the first capacitor and the third capacitor are electrically connected in series between the first power and the second power, and during the second period within the one cycle period, the first capacitor and the third capacitor are electrically connected in parallel to the second power, such that a ratio of a first voltage of the first power to a second voltage of the second power is equal to 3.

In one embodiment, in a 3-fold conversion mode, a part of the plurality of switches are always ON, whereas, another part of the plurality of switches are always OFF, and whereas, yet another part of the plurality of switches are configured to operably switch the first capacitor and the third capacitor according to the plurality of cycle periods, so that during the first period within the one cycle period, the first capacitor and the third capacitor are electrically connected in series between the first power and the second power, and during the second period within the one cycle period, the first capacitor and the third capacitor are electrically connected in parallel to the second power, such that a ratio of a first voltage of the first power to a second voltage of the second power is equal to 3; wherein the at least one inductor along with the first capacitor and/or the at least one inductor along with the third capacitor operate in resonant fashion to achieve power conversion between the first power and the second power.

In one embodiment, the switching converter includes: a plurality of inductors coupled to a plurality of current patties of the plurality of capacitors, wherein the plurality of switches are configured to operably and periodically switch coupling relationships between the plurality of inductors and the plurality of capacitors, so that each inductor and a corresponding one of the capacitors operate in resonant fashion to achieve power conversion between the first power and the second power, wherein at least two of the plurality of inductors have coupled inductance between each other.

In one embodiment, the at least two of the plurality of inductors having coupled inductance between each other are configured as coupled inductors or configured as a transformer.

In one embodiment, the at least one switching converter includes: a first switching converter and a second switching converter, wherein the first switching converter and the second switching converter are coupled in parallel between the first power and the second power, wherein the first switching converter and the second switching converter are configured to operably switch the corresponding plurality of switches therein, respectively, in respective phases of the first switching converter and the second switching converter which are opposite to each other.

In one embodiment, the switched capacitor converter circuit has the feature (3), wherein the third inductor and the fourth inductor both operate in a continuous conduction mode (CCM).

In one embodiment, the switched capacitor converter circuit has the feature (3), wherein a switching frequency corresponding to the cycle period is lower than a resonant frequency of the third inductor and the first capacitor and/or the switching frequency corresponding to the cycle period is lower than a resonant frequency of the fourth inductor and the second capacitor.

In one embodiment, the control circuit includes: a zero current detection circuit, which is configured to operably generate a zero current detection signal according to an inductor current flowing through the at least one inductor; wherein when the zero current detection signal indicates that the inductor current is zero, each switch is switched to its opposite phase state, whereby power conversion between the first power and the second power is executed.

In one embodiment, the control circuit further includes: a delay circuit, which is configured to operably delay a time point at which each switch is switched to its opposite phase state.

In one embodiment, the zero current detection circuit includes: a zero current estimation circuit, which is coupled to one or more of (1)-(3): (1) the at least one inductor, (2) the first capacitor and (3) the second capacitor, and which is configured to operably estimate the time point at which the inductor current is zero correspondingly according to one or more of (1)-(3): (1) a voltage difference across two ends of the at least one inductor, (2) a voltage difference across two ends of the first capacitor and (3) a voltage difference across two ends of the second capacitor, so as to generate the zero current detection signal.

In one embodiment, the zero current estimation circuit includes: a voltage detection circuit, which is configured to operably generate a voltage detection signal according to the voltage difference across the two ends of the at least one resonator, wherein the voltage detection signal is indicative of a first period wherein the voltage difference across the two ends of the at least one resonator is above zero voltage; a ramp circuit, which is configured to operably generate a first ramp of a ramp signal according to the voltage detection signal during the first period, and to operably generate a second ramp of the ramp signal following an end of the first ramp after the first period ends, wherein a slope of the first ramp and a slope of the second ramp have a same absolute value but opposite signs; and a comparison circuit, which is configured to operably indicate the time point at which the inductor current is zero when the second ramp reaches a zero current threshold, for generating the zero current detection signal.

In one embodiment, the zero current estimation circuit is configured to operably estimate the time point at which the inductor current is zero according to one or more of (1)-(2): (1) a time point at which a voltage difference across two ends of the first capacitor reaches a peak and a time point at which the voltage difference across two ends of the first capacitor reaches a valley and (2) a time point at which a voltage difference across two ends of the second capacitor reaches a peak and a time point at which the voltage difference across two ends of the second capacitor reaches a valley, for generating the zero current detection signal.

In one embodiment, the at least one inductor includes a plurality of inductors, wherein a plurality of inductor currents of the plurality of inductors are regulated via the following way: wherein the control circuit is further configured to operably generate a plurality of delay periods and the control circuit is further configured to operably adjust at least one of the plurality of delay periods according to a difference between an average of the plurality of inductor currents and at least one of the plurality of inductor currents, so that the plurality of inductor currents have a constant ratio among one another; wherein the plurality of inductor currents correspond to an inductor current of the first inductor and an inductor current of the second inductor or the plurality of inductor currents correspond to an inductor current of the third inductor and an inductor current of the fourth inductor; wherein the plurality of delay periods are configured to operably delay a starting time point of charging a corresponding one of the inductor or a starting time point of discharging a corresponding one of the inductor.

In one embodiment, the constant ratio is 1:1.

In one embodiment, one of the plurality of capacitors functions as a distribution capacitor, and one of the plurality of switches functions as a pre-charging transistor; wherein the pre-charging transistor is electrically connected between an input power and the distribution capacitor, wherein the input power corresponds to one of the first power and the second power; wherein in a pre-charging mode, the control circuit is further configured to operably control a conduction level of the pre-charging transistor by feedback linear control and is further configured to operably control switchings of the rest of the plurality of switches, so as to control electrical connection relationships among the plurality of capacitors, so that when a voltage drop across the distribution capacitor is lower than a voltage threshold, a voltage across at least one of the plurality of capacitors is pre-charged to a predetermined voltage.

In one embodiment, the predetermined voltage is a target voltage of an output voltage, wherein the output voltage corresponds to a voltage of another one of the first power and the second power.

In one embodiment, the switched capacitor converter circuit further comprises: a driver circuit, which is configured to operably drive at least a part of the plurality of switches, wherein the driver circuit includes: a plurality of drivers, which are configured to operably generate a plurality of driving signals under control by the control circuit, wherein the plurality of driving signals are configured to operably and periodically drive a part of the plurality of switches, so as to execute power conversion between the first power and the second power in resonant fashion; and a power supply circuit, which is configured to operably provide a plurality of driving powers for the part of the plurality of switches, wherein the power supply circuit includes: a voltage booster circuit, which is configured to operably generate a boost power according to a clock signal, a direct current (DC) voltage and an output related signal which is related to an output voltage, wherein a voltage of the boost power is correlated to a sum of an input voltage plus the output related signal, wherein the input voltage and the output voltage correspond to a first voltage of the first power and a second voltage of the second power, respectively, or wherein the input voltage and the output voltage correspond to the second voltage and the first voltage, respectively; a plurality of driving capacitors, wherein a voltage across each driving capacitor corresponds to a corresponding one of the driving powers; and a plurality of supply diodes, which are coupled to the boost power and coupled in series in an order along a forward friction of the plurality of supply diodes from the boost power, wherein a backward end of each supply diode is coupled to a positive end of the corresponding driving power, so as to charge a corresponding one of the driving capacitors to generate the corresponding driving power, and wherein the plurality of supply diodes are configured to operably block a backward current and a backward voltage.

In one embodiment, the voltage booster circuit, a corresponding one of the driving capacitors and a corresponding one of the supply diodes constitute a charge pump, wherein when the boost power is generated by the voltage booster circuit, the corresponding supply diode charges the corresponding driving capacitor according to the boost power, so as to generate the corresponding driving power, wherein a negative end of the corresponding driving power is coupled to the output voltage, and the corresponding driving power is correlated to the input voltage.

In one embodiment, the voltage booster circuit, a corresponding one of the driving capacitors, a corresponding one of the supply diodes and a corresponding one of the switches constitute a bootstrap circuit, when the boost power is generated by the voltage booster circuit, the corresponding supply diode charges the corresponding driving capacitor according to a second boost power, so as to generate the corresponding driving power, wherein a voltage at a negative end of the corresponding driving power is varied as the plurality of switches perform switching and a voltage at the positive end of the corresponding driving power is varied as the plurality of switches perform switching, wherein in a steady state, the corresponding driving power is correlated to the input voltage, wherein the second boost power is correlated to the boost power.

In one embodiment, the switched capacitor converter circuit further comprises: an upper layer capacitor and a plurality of upper layer switches, wherein the at least one switching converter includes: a first switching converter and a second switching converter; wherein the upper layer capacitor, the plurality of upper layer switches, the first switching converter and the second switching converter are coupled to one another according to a fundamental topology; wherein during a first period within the one cycle period, the plurality of upper layer switches are configured to operably control the first switching converter and the upper layer capacitor to be electrically connected in series between the first power and the second power, and the plurality of upper layer switches are configured to operably control the second switching converter to be electrically connected in parallel to the second power; wherein during a second period within the one cycle period, the plurality of upper layer switches are configured to operably control the second switching converter and the upper layer capacitor to be electrically connected in series between the second power and a ground voltage level, and the plurality of upper layer switches are configured to operably control the first switching converter to be electrically connected in parallel to the second power.

In one embodiment, a ratio of a first voltage of the first power to a second voltage of the second power is equal to 8.

In one embodiment, the switched capacitor converter circuit further comprises: a further upper layer capacitor, a plurality of further upper layer switches, a further upper layer first switching converter and a further upper layer second switching converter, wherein the further upper layer capacitor, the plurality of further upper layer switches, the further upper layer first switching converter and the further upper layer second switching converter are coupled to one another according to the fundamental topology so that the fundamental topology expands recursively, wherein each of the further upper layer first switching converter and the further upper layer second switching converter has a configuration corresponding to the switched capacitor converter circuit of a layer below.

From another perspective, the present invention provides a power conversion system, comprising: a switched capacitor converter circuit of claim 6; a voltage regulator, which is configured to operably receive a first stage power supply, so as to generate an output voltage, wherein the output voltage is regulated to a predetermined level; and an interface and control unit, which is configured to operably control the voltage regulator, so as to regulate the output voltage to the predetermined level, wherein the interface and control unit is configured to operably control a switching frequency of the voltage regulator and/or configured to operably control a switching frequency of the switched capacitor converter circuit via a communication interface, thus enhancing power conversion efficiency of the power conversion system.

In one embodiment, the interface and control unit is configured to operably control the switching frequency of the voltage regulator to be synchronous with the switching frequency of the switched capacitor converter circuit, thus mitigating electrical magnetic interference (EMI) of the power conversion system.

In one embodiment, the switched capacitor converter circuit is configured to operably adjust the switching frequency of the switched capacitor converter circuit through adjusting delay periods corresponding to at least part of the plurality of switches.

The objectives, technical details, features, and effects of the present invention will be better understood with regard to the detailed description of the embodiments below, with reference to the attached drawings.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies.

Figure 3:
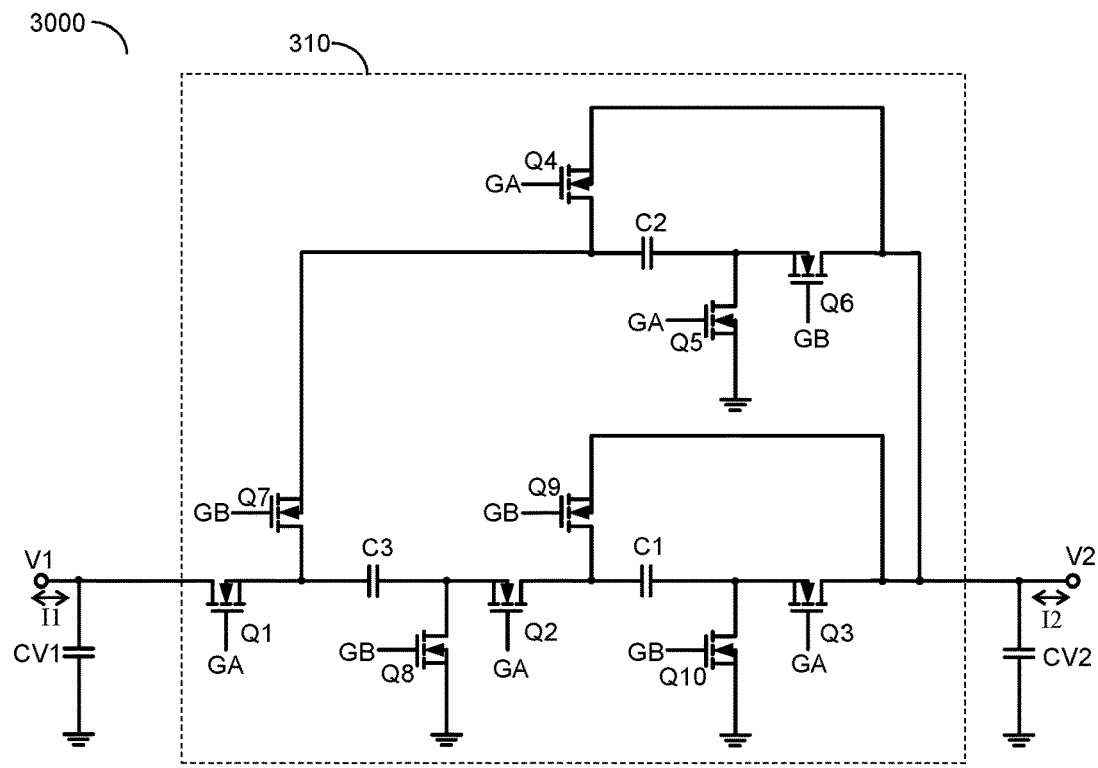
FIG. 3 shows a schematic diagram of a non-resonant switched capacitor converter circuit according to a specific embodiment of the present invention.
Figure 4A:
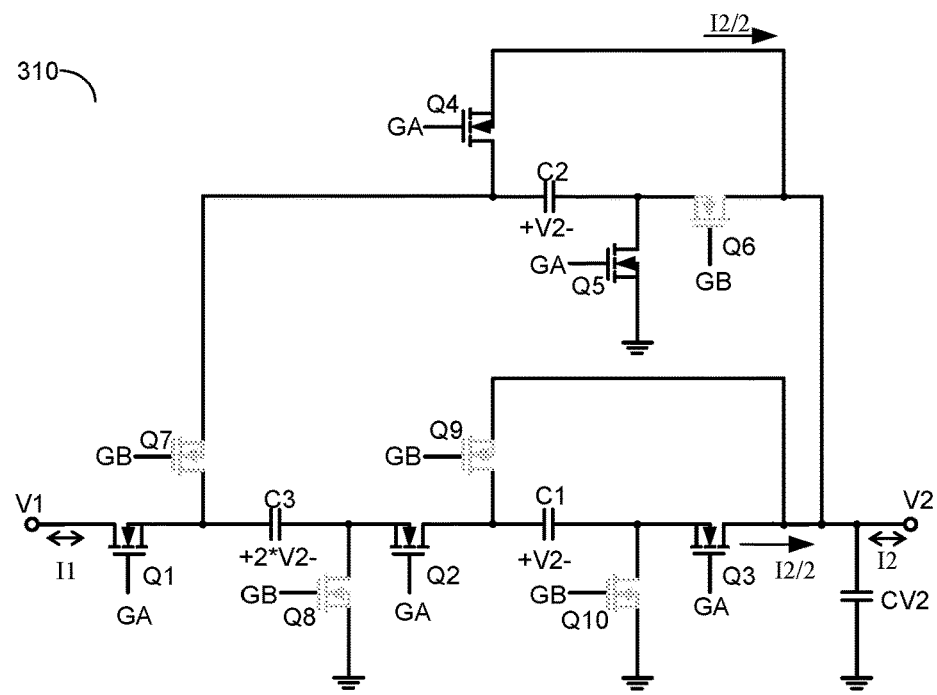
FIG. 4A and FIG. 4B show operation embodiments corresponding to the non-resonant switched capacitor converter circuit of FIG. 3.
Figure 4B:
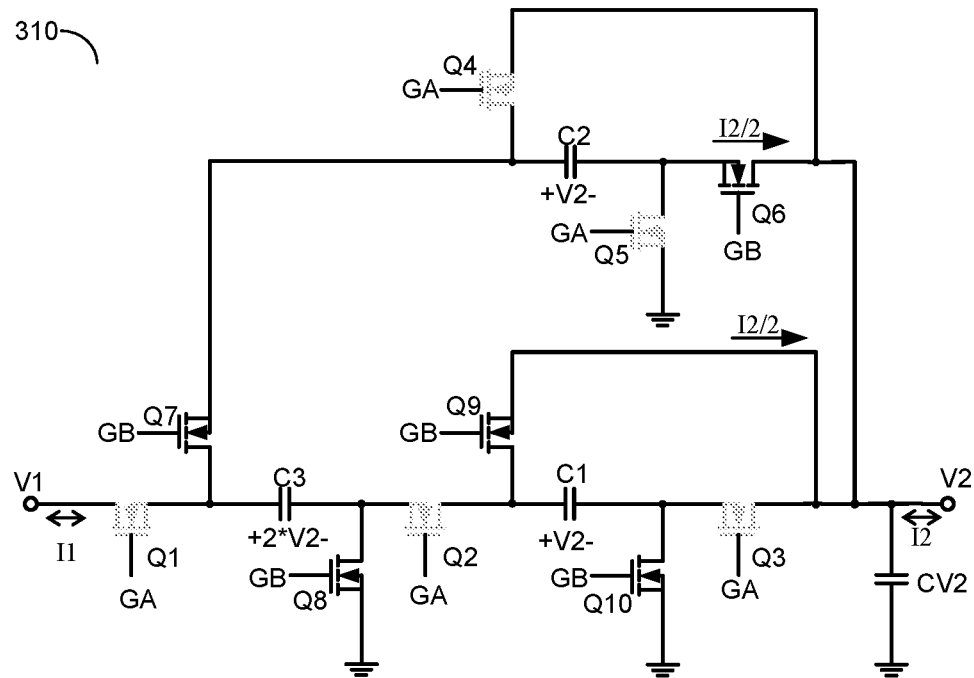

Please refer to FIG. 3, FIG. 4A and FIG. 4B. FIG. 3 shows a schematic diagram of a non-resonant switched capacitor converter circuit (i.e., switched capacitor converter circuit 3000) according to a specific embodiment of the present invention. FIG. 4A and FIG. 4B show operation embodiments of the non-resonant switched capacitor converter circuit of FIG. 3.

The switched capacitor converter circuit 3000 is configured to operably convert a first power (corresponding to a first voltage V1 and a first current I1) to a second power (corresponding to a second voltage V1 and a second current I1) or is configured to operably convert the second power to the first power. In this embodiment, the switched capacitor converter circuit 3000 comprises a switching converter 310. The switching converter 310 includes: a first capacitor (i.e., capacitor C1), a second capacitor (i.e., capacitor C2), a third capacitor (i.e., capacitor C3) and switches Q1~Q10.

In one embodiment, during a first period within a cycle period (corresponding to FIG. 4A), the switches Q1~Q10 are configured to operably control the first capacitor (i.e., capacitor C1) and the third capacitor (i.e., capacitor C3) to be electrically connected in series between the first power and the second power, and to operably control the second capacitor (i.e., capacitor C2) to be electrically connected in parallel to the second power, wherein the other end of the second capacitor (i.e., capacitor C2) is controlled to be coupled to a ground voltage level. As exemplified by FIG. 4A, the switches Q1~Q3 are ON, so as to control the first capacitor (i.e., capacitor C1) and the third capacitor (i.e., capacitor C3) to be electrically connected in series between the first power and the second power, whereas, the switches Q4~Q5 are ON, so as to control the second capacitor (i.e., capacitor C2) to be electrically connected in parallel to the second power; in the meantime, the switches Q6~Q10 are OFF, as illustrated as color grey in FIG. 4A. In this embodiment, during the first period, the control signal GA is in in enable state, so that the switches controlled by the control signal GA are ON. On the other hand, during the first period, the control signal GB is in disable state, so that the switches controlled by the control signal GB are OFF.

During a second period within the cycle period (corresponding to FIG. 4B), the switches Q1~Q10 are configured to operably control the second capacitor (i.e., capacitor C2) and the third capacitor (i.e., capacitor C3) to be electrically connected in series between the second power and a ground voltage level, and to operably control the first capacitor (i.e., capacitor C1) to be electrically connected in parallel to the second power. As shown in FIG. 4B, in one embodiment, during the second period within the cycle period, the second capacitor (i.e., capacitor C2) and the third capacitor (i.e., capacitor C3) are electrically connected in series in a reversed direction between the second power and the ground voltage level. As exemplified by FIG. 4B, the switches Q6~Q8 are ON, so as to control the second capacitor (i.e., capacitor C2) and the third capacitor (i.e., capacitor C3) to be electrically connected in series between the second power and the ground voltage level, and the switches Q9~Q10 are ON, so as to control the first capacitor (i.e., capacitor C1) to be electrically connected in parallel to the second power; in the meantime, the switches Q1~Q5 are OFF, as illustrated as color grey in FIG. 4B. In this embodiment, during the second period, the control signal GA is in disable state, so that the switches controlled by the control signal GA are OFF. On the other hand, during the second period, the control signal GB is in enable state, so that the switches controlled by the control signal GB are ON.

The switched capacitor converter circuit 3000 executes power conversion between the first power and the second power through periodically conducting the above-mentioned operations. In this embodiment, a ratio of the first voltage V1 of the first power to the second voltage V2 of the second power is equal to 4.

It is worthwhile noting that, in one embodiment, as one having ordinary skill in the art readily understands, the term "electrically connected in series 'in a reversed direction'", refers to that the voltage across the second capacitor (i.e., capacitor C2) and the voltage across the third capacitor (i.e., capacitor C3) are in opposite direction to each other (i.e., the direction from the positive end to the negative end of the capacitor C2 is opposite to the direction from the positive end to the negative end of the capacitor C3).

Please still refer to FIG. 4A and FIG. 4B. In the embodiment wherein the first power is converted to the second power, during the first period within the cycle period (corresponding to FIG. 4A), the first power charges the first capacitor (i.e., capacitor C1) and the third capacitor (i.e., capacitor C3) which are electrically connected in series, whereas, the second capacitor (i.e., capacitor C2) is discharged, to thereby supply power to the second CVpower;

that is, the second capacitor (i.e., capacitor C2) charges a capacitor CV2 coupled to the second power. On the other hand, during the second period within the cycle period (corresponding to FIG. 4B), the third capacitor (i.e., capacitor C3) charges the second capacitor (i.e., capacitor C2) and the second power.

In addition, in the embodiment wherein the second power is converted to the first power, during the first period within the cycle period (corresponding to FIG. 4A), the second power charges the first capacitor (i.e., capacitor C1) and the third capacitor (i.e., capacitor C3) which are electrically connected in series and the second power charges the second capacitor (i.e., capacitor C2). On the other hand, during the second period within the cycle period (corresponding to FIG. 4B), the second power charges the first capacitor (i.e., capacitor C1), and the second power charges the third capacitor (i.e., capacitor C3) via the second capacitor (i.e., capacitor C2).

Figure 1A:
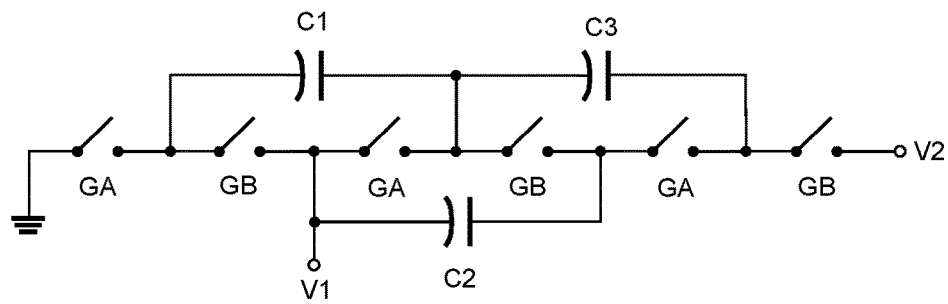
FIG. 1A-FIG. 1E show schematic diagrams of several conventional switched capacitor converters.
Figure 1B:
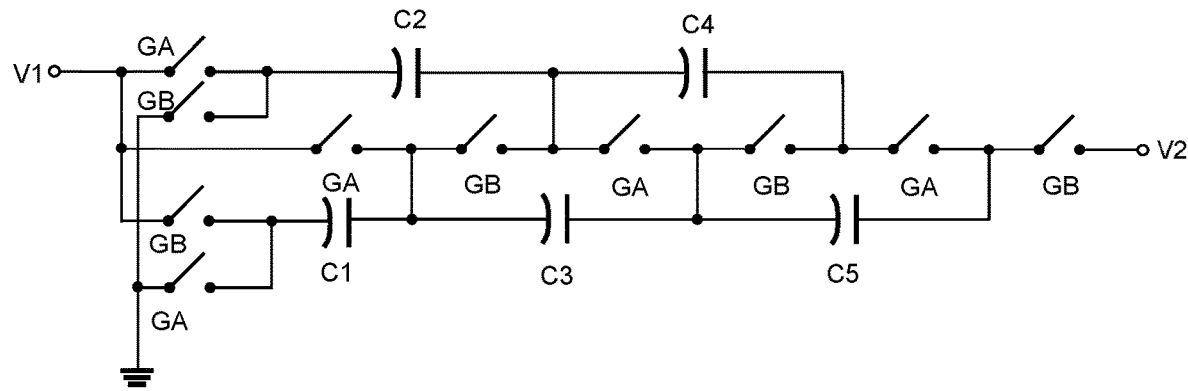
Figure 1C:
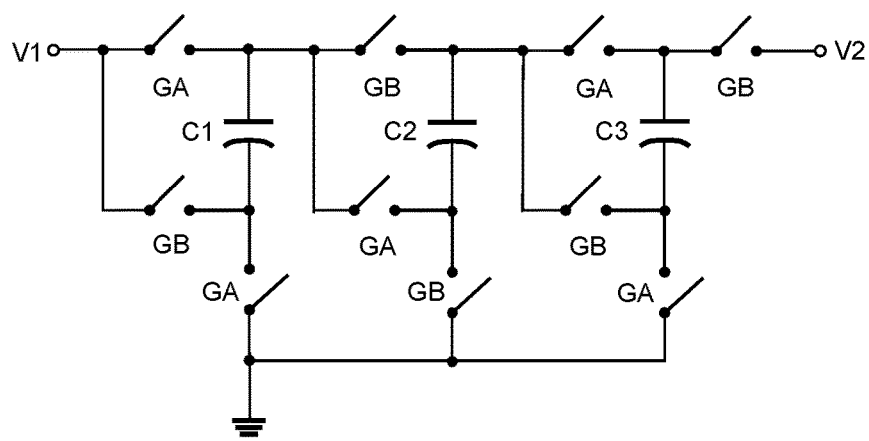
Figure 1D:
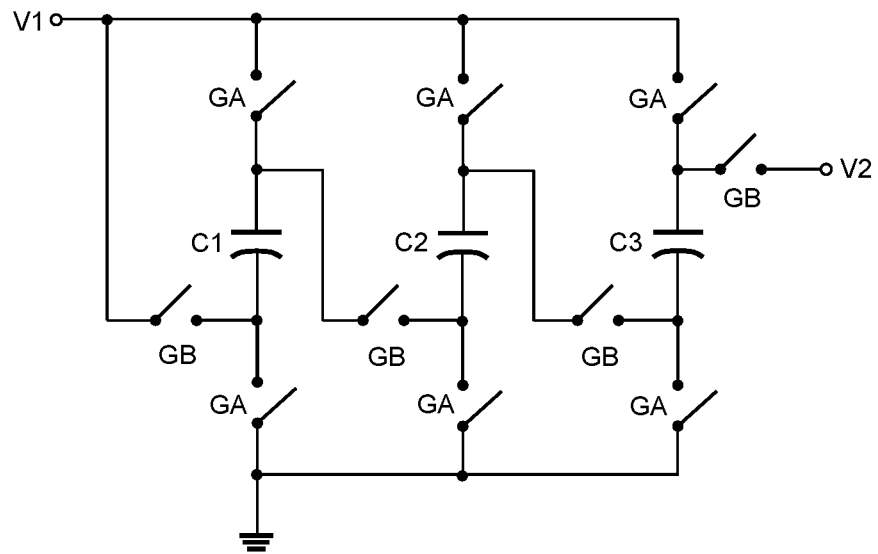
Figure 1E:
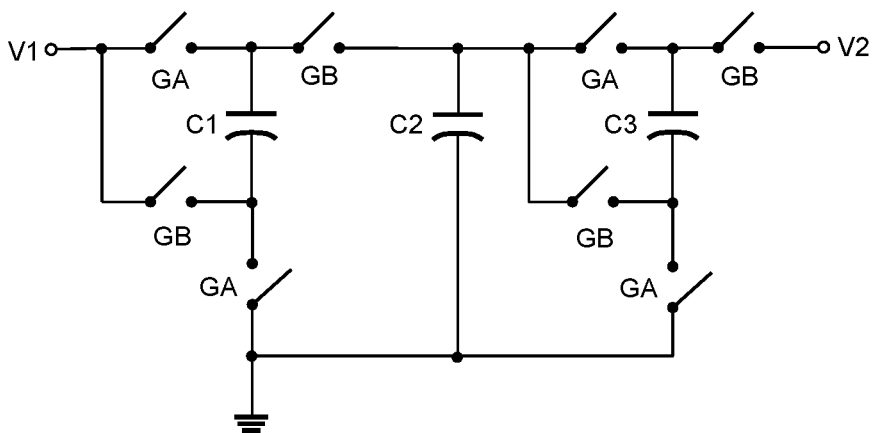
Figure 2A:
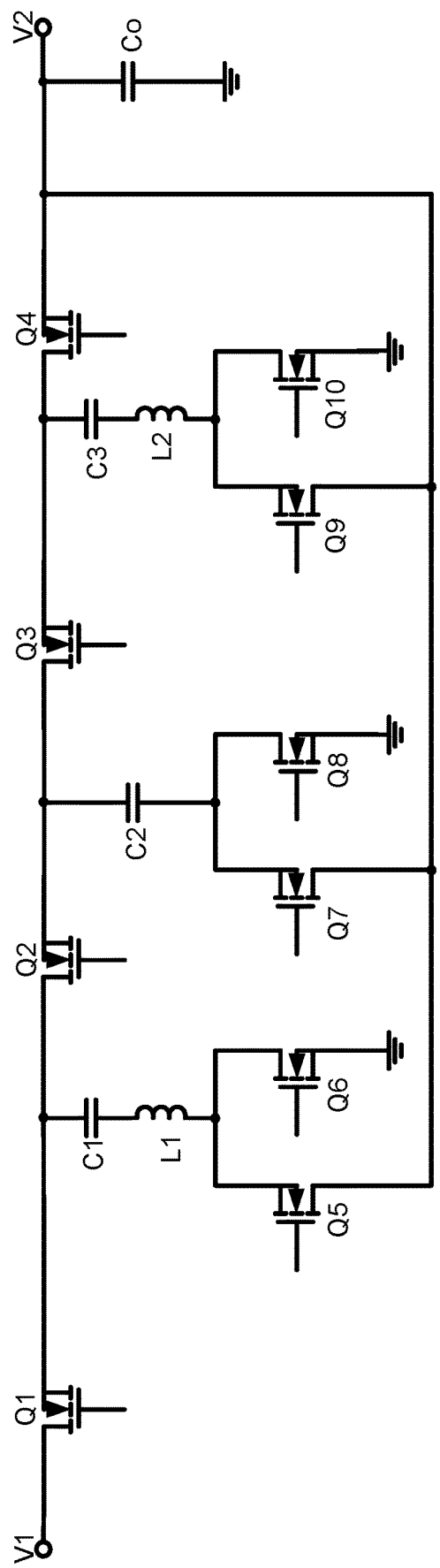
FIG. 2A shows a schematic diagram of a conventional switched resonator converter.
Figure 2B:
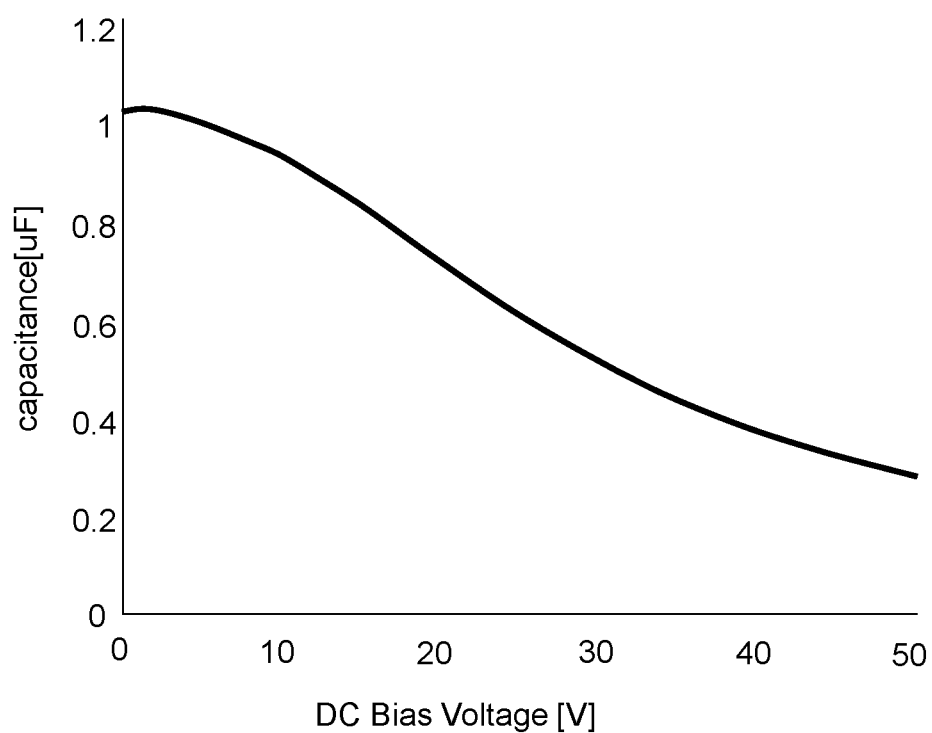
FIG. 2B shows a typical capacitance-voltage characteristic curve of a capacitor.

Through periodically conducting the above-mentioned operations, in this embodiment, in a steady state, a ratio of the voltage across the third capacitor (i.e., capacitor C3) to the second voltage V2 is equal to 2. A ratio of a voltage VC1 across the first capacitor (i.e., capacitor C1) to the second voltage V2 is equal to 1. And, a ratio of a voltage VC2 across the second capacitor (i.e., capacitor C2) to the second voltage V2 is equal to 1. In an implementation wherein the second voltage V2 is equal to 12V, in a steady state, the voltage VC1 across the first capacitor (i.e., capacitor C1) and the voltage VC2 across the second capacitor (i.e., capacitor C2) are both equal to 12V. It is worthwhile noting that, referring to FIG. 2B, because the present invention can ensure a voltage across a capacitor to be kept at a relatively lower voltage level in a steady state, the effective capacitance of such capacitor will be relatively higher. As a result, both the required voltage withstanding capability and the required size for such capacitor can be effectively decreased. Besides, under such situation, the resonant frequency of the present invention is relatively stabler and the transient response is better. Moreover, it is worthwhile noting that, because the output current (e.g., corresponding to the second current I2) of the present invention are provided by two channels, ripple can be reduced.

In the embodiment wherein the first power is converted to the second power, the capacitor CV1 coupled to the first power and the capacitor CV2 coupled to the second power correspond to an input capacitor and an output capacitor, respectively. Or, in the embodiment wherein the second power is converted to the first power, the capacitor CV1 coupled to the first power and the capacitor CV2 coupled to the second power correspond to an output capacitor and an input capacitor, respectively.

In the switched capacitor converter circuit 3000 of the present invention, in one embodiment, the switching converter further includes: at least one inductor L, which is coupled to at least one current path of at least a part of the capacitors (e.g., capacitors C1~C2). Under scup implementation, the switches (e.g., switches Q1~Q10) are further configured to operably and periodically switch the coupling relationship between the inductor L and the first capacitor (i.e., capacitor C1) and/or the coupling relationship between the inductor L and the second capacitor (i.e., capacitor C2), so that the inductor L and the first capacitor (i.e., capacitor C1) and/or coupling between the inductor L and the second capacitor (i.e., capacitor C2) operate in resonant fashion, thereby achieving power conversion between the first power and the second power.

Figure 5:
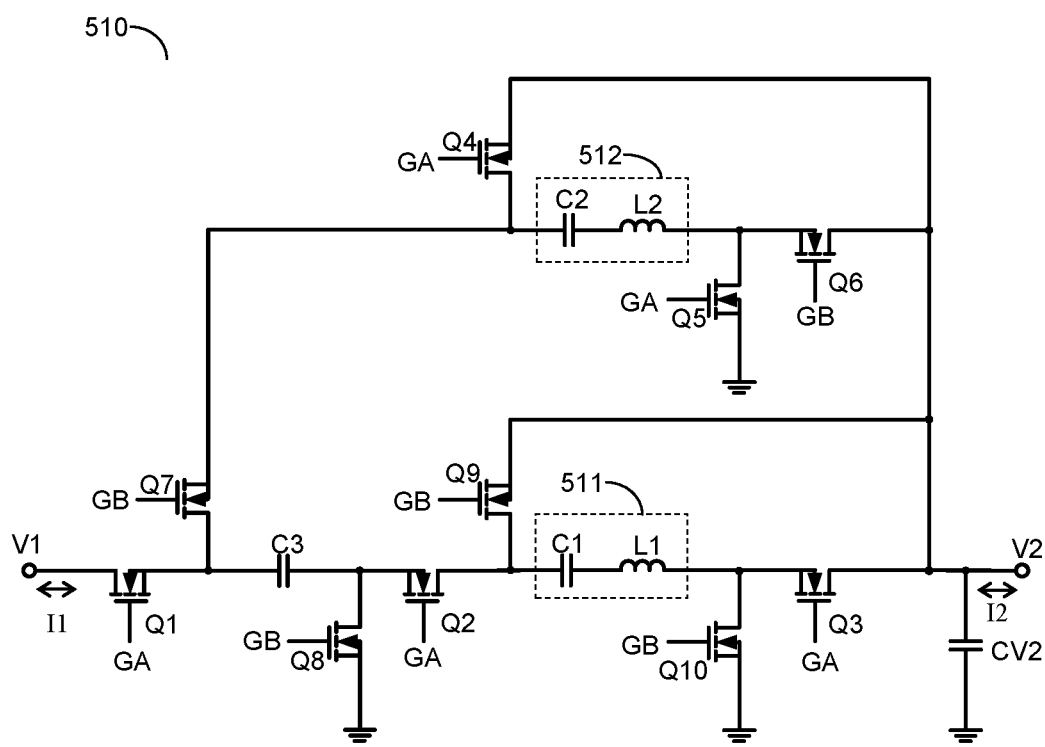
FIG. 5 shows a schematic diagram of a resonant switched capacitor converter circuit according to an embodiment of the present invention.

Please refer to FIG. 5, which shows a schematic diagram of a resonant switched capacitor converter circuit according to an embodiment of the present invention. The switching converter 510 of FIG. 5 is similar to the switching converter 310 of the embodiment shown in FIG. 3, but is different in that: the switching converter 510 of this embodiment further includes an inductor L1 and an inductor L2. The first capacitor (i.e., capacitor C1) is directly electrically connected in series to the inductor L1, so that the first capacitor (i.e., capacitor C1) and the inductor L1 constitutes a first resonant tank 511. The second capacitor (i.e., capacitor C2) is directly electrically connected in series to the inductor L2, so that the second capacitor (i.e., capacitor C2) and the inductor L2 constitutes a second resonant tank 512. In one embodiment, during a first period within the cycle period, the switches Q1~Q10 are configured to operably control the first resonant tank 511 and the third capacitor (i.e., capacitor C3) to be electrically connected in series between the first power and the second power, and the switches Q1~Q10 are configured to operably control the second resonant tank 512 to be electrically connected in parallel to the second power. On the other hand, during a second period within the cycle period, the switches Q1~Q10 are configured to operably control the second resonant tank 512 and the third capacitor (i.e., capacitor C3) to be electrically connected in series between the second power and a ground voltage level, and the switches Q1~Q10 are configured to operably control the first resonant tank 511 to be electrically connected in parallel to the second power. The switching converter 510 executes power conversion between the first power and the second power through periodically conducting the above-mentioned operations in resonant fashion. In regard to operation details of the switches Q1~Q10, please refer to the embodiments shown in FIG. 4A and FIG. 4B.

Figure 6:
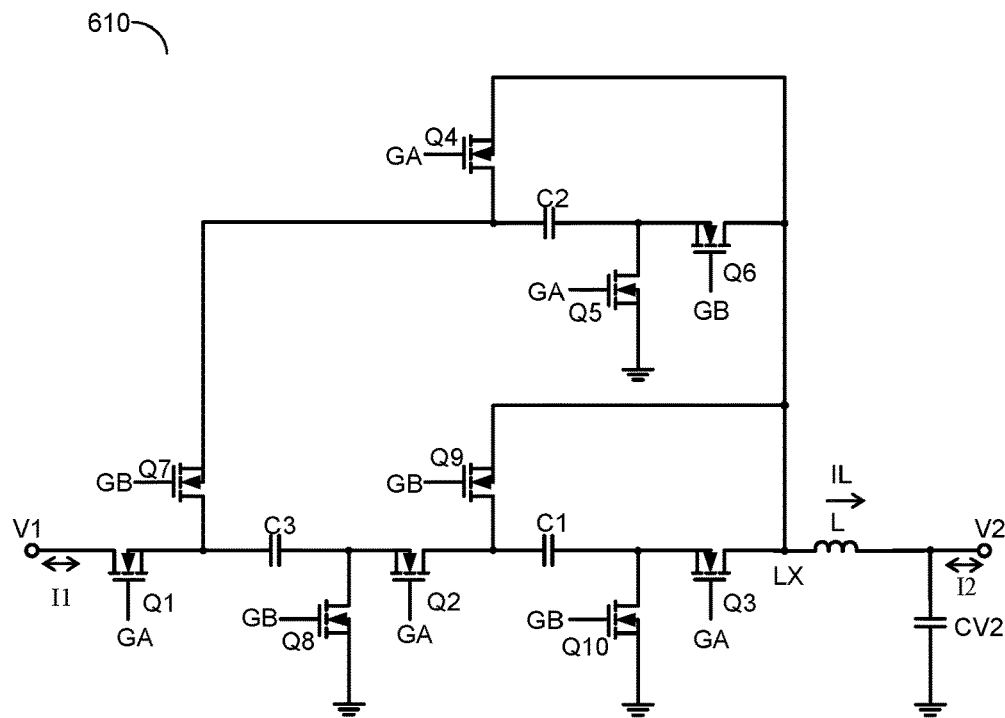
FIG. 6 shows a schematic diagram of a resonant switched capacitor converter circuit according to an embodiment of the present invention.

Please refer to FIG. 6, which shows a schematic diagram of a resonant switched capacitor converter circuit according to an embodiment of the present invention. The switching converter 610 of FIG. 6 is similar to the switching converter 310 of the embodiment shown in FIG. 3, but is different in that: the switching converter 610 of this embodiment further includes an inductor L, which is coupled between the second power and a switching node LX. During the first period within the cycle period, the switches Q1~Q10 control the first capacitor (i.e., capacitor C1) and the third capacitor (i.e., capacitor C3) to be electrically connected in series to the inductor L via the switching node LX, and the series circuit formed by the first capacitor (i.e., capacitor C1), the third capacitor (i.e., capacitor C3) and the inductor L is electrically connected in series between the first power and the second power, and the switches Q1~Q10 control the second capacitor (i.e., capacitor C2) to be electrically connected in series to the inductor L via the switching node LX, and the series circuit formed by the second capacitor (i.e., capacitor C2) and the inductor L is electrically connected in parallel to the second power. On the other hand, during the second period within the cycle period, the switches Q1~Q10 control the second capacitor (i.e., capacitor C2) and the third capacitor (i.e., capacitor C3) to be electrically connected in series to the inductor L via the switching node LX, and the series circuit formed by the second capacitor (i.e., capacitor C2), the third capacitor (i.e., capacitor C3) and the inductor L is electrically connected in series between the second power and the ground voltage level, and the switches Q1~Q10 control the first capacitor (i.e., capacitor C1) to be electrically connected in series to the inductor L via the switching node LX, and the series circuit formed by the first capacitor (i.e., capacitor C1) and the inductor L is electrically connected in parallel to the second power. In this embodiment, the first capacitor (i.e., capacitor C1), the second capacitor (i.e., capacitor C2), and the third capacitor (i.e., capacitor C3) operate together with the inductor L in resonant fashion to execute power conversion between the first power and the second power. In regard to operation details of the above-mentioned switches Q1~Q10, please refer to the embodiments shown in FIG. 4A and FIG. 4B.

It is worthwhile noting that, in this embodiment, the charging and discharging operation is executed in resonant fashion by a capacitor (or capacitors) in cooperation with an inductor. As a result, this embodiment can effectively reduce surge currents in the charging and discharging operation. Besides, this embodiment can achieve zero current switching or zero voltage switching in resonant fashion. The embodiments operating in resonant fashion which will be described later in the specification operate in the same way as this embodiment. The details will be explained later.

Figure 7:
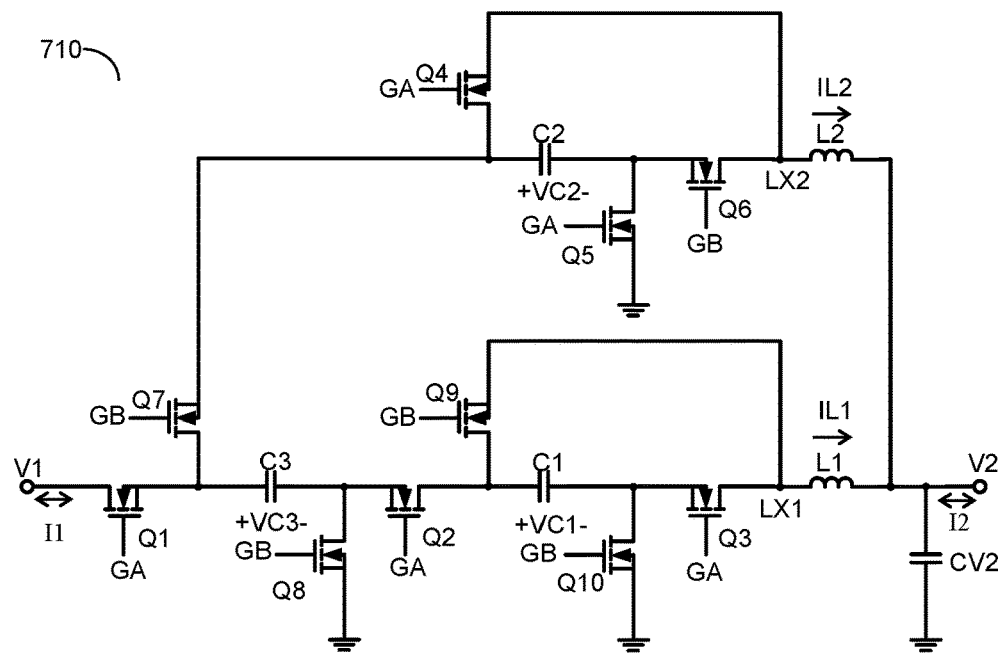
FIG. 7 shows a schematic diagram of a resonant switched capacitor converter circuit according to an embodiment of the present invention.

Please refer to FIG. 7, which shows a schematic diagram of a resonant switched capacitor converter circuit according to an embodiment of the present invention. The switching converter 710 of FIG. 7 is similar to the switching converter 310 of the embodiment shown in FIG. 3, but is different in that: the switching converter 710 of this embodiment further includes an inductor L1 and an inductor L2. The inductor L1 is coupled between the second power and a first switching node LX1, whereas, the inductor L2 is coupled between the second power and a second switching node LX2. During the first period within the cycle period, the switches Q1~Q10 control the first capacitor (i.e., capacitor C1) and the third capacitor (i.e., capacitor C3) to be electrically connected in series to the inductor L1 via the first switching node LX1, and the series circuit formed by the first capacitor (i.e., capacitor C1), the third capacitor (i.e., capacitor C3) and the inductor L1 is electrically connected in series between the first power and the second power, and the switches Q1~Q10 control the second capacitor (i.e., capacitor C2) to be electrically connected in series to the inductor L2 via the second switching node LX2, and the series circuit formed by the second capacitor (i.e., capacitor C2) and the inductor L2 is electrically connected in parallel to the second power. On the other hand, during the second period within the cycle period, the switches Q1~Q10 control the second capacitor (i.e., capacitor C2) and the third capacitor (i.e., capacitor C3) to be electrically connected in series to the inductor L2 via the second switching node LX2, and the series circuit formed by the second capacitor (i.e., capacitor C2), the third capacitor (i.e., capacitor C3) and the inductor L2 is electrically connected in series between the second power and the ground voltage level, and the switches Q1~Q10 control the first capacitor (i.e., capacitor C1) to be electrically connected in series to the inductor L1 via the first switching node LX1, and the series circuit formed by the first capacitor (i.e., capacitor C1) and the inductor L1 is electrically connected in parallel to the second power. In regard to operation details of the above-mentioned switches Q1~Q10, please refer to the embodiments shown in FIG. 4A and FIG. 4B.

In one embodiment, the capacitance of the third capacitor (i.e., capacitor C3) in the embodiments shown in FIG. 5 to FIG. 7 is far more greater than the capacitance of the first capacitor (i.e., capacitor C1) and the capacitance of the second capacitor (i.e., capacitor C2) in the embodiments shown in FIG. 5 to FIG. 7, so that a first resonant frequency of the first capacitor (i.e., capacitor C1) and the inductor is far more greater than a third resonant frequency of the third capacitor (i.e., capacitor C3) and the inductor, and a second resonant frequency of the second capacitor (i.e., capacitor C2) and the inductor is far more greater than a third resonant frequency of the third capacitor (i.e., capacitor C3) and the inductor. In one embodiment, the first resonant frequency and the second resonant frequency are both greater than or equal to ten times of the third resonant frequency.

Figure 8:
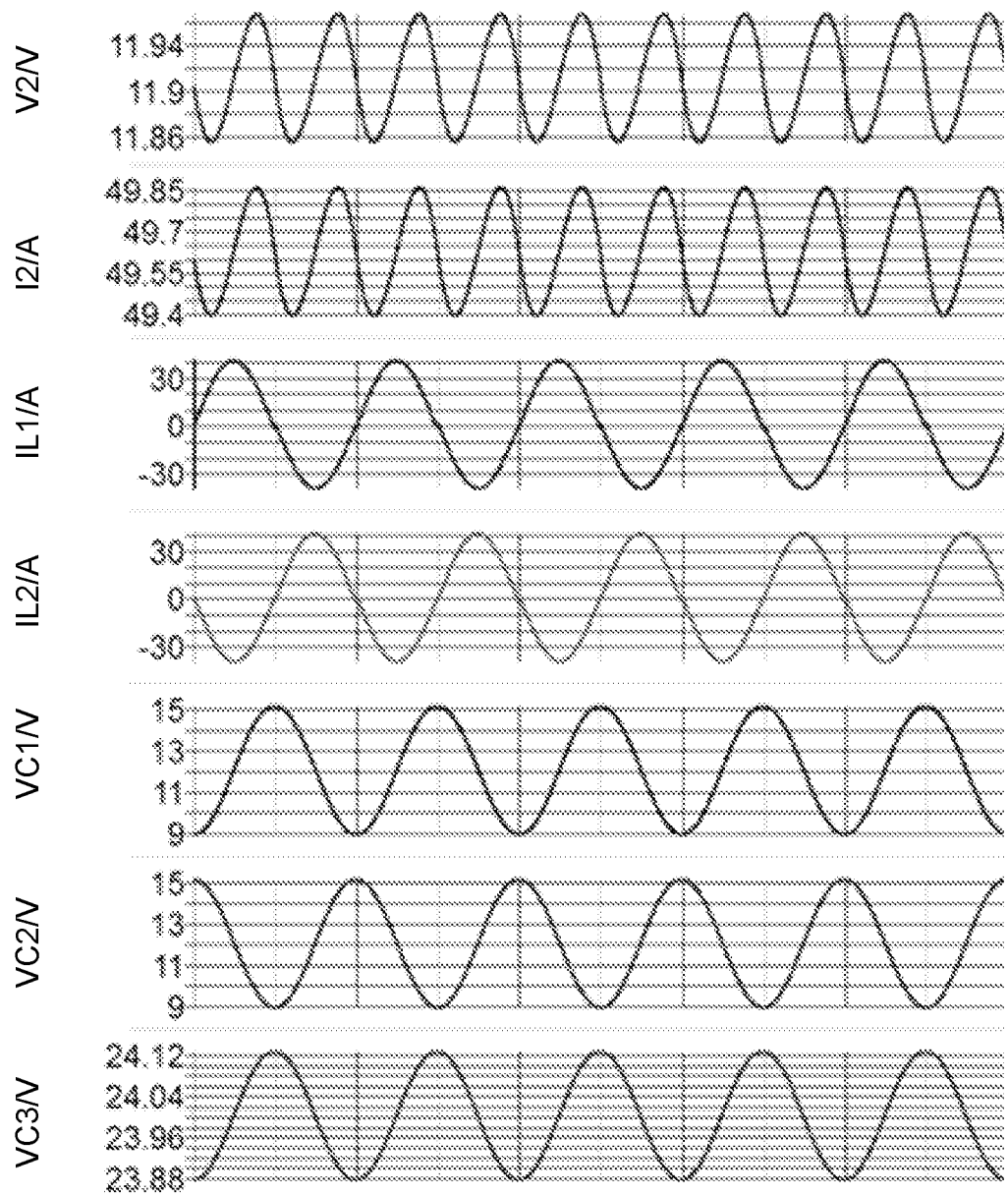
FIG. 8 illustrates signal waveforms depicting the operation of an embodiment of a resonant switched capacitor converter circuit according to the present invention.

Please refer to FIG. 8, which illustrates signal waveforms depicting the operation of an embodiment of a resonant switched capacitor converter circuit shown in FIG. 5. resonant currents (i.e., inductor current IL1 and inductor current IL2) flowing through the inductors L1 and L2 are full-wave AC sinusoidal waves, and the voltage VC1 across the capacitor C1, the voltage VC2 across the capacitor C2 and the voltage VC3 across the capacitor C3 are also full-wave AC sinusoidal waves. In more detail, what is shown is in an operation to convert the first power to the second power, wherein the second voltage V2 and the second current I2 (corresponding to the output voltage and the output current, respectively) and the voltage VC3 across the third capacitor (i.e., capacitor C3) all have relatively low ripples, and, the voltage VC1 across the capacitor C1 and the voltage VC2 across the capacitor C2 both are at low DC (direct current) level.

Figure 9:
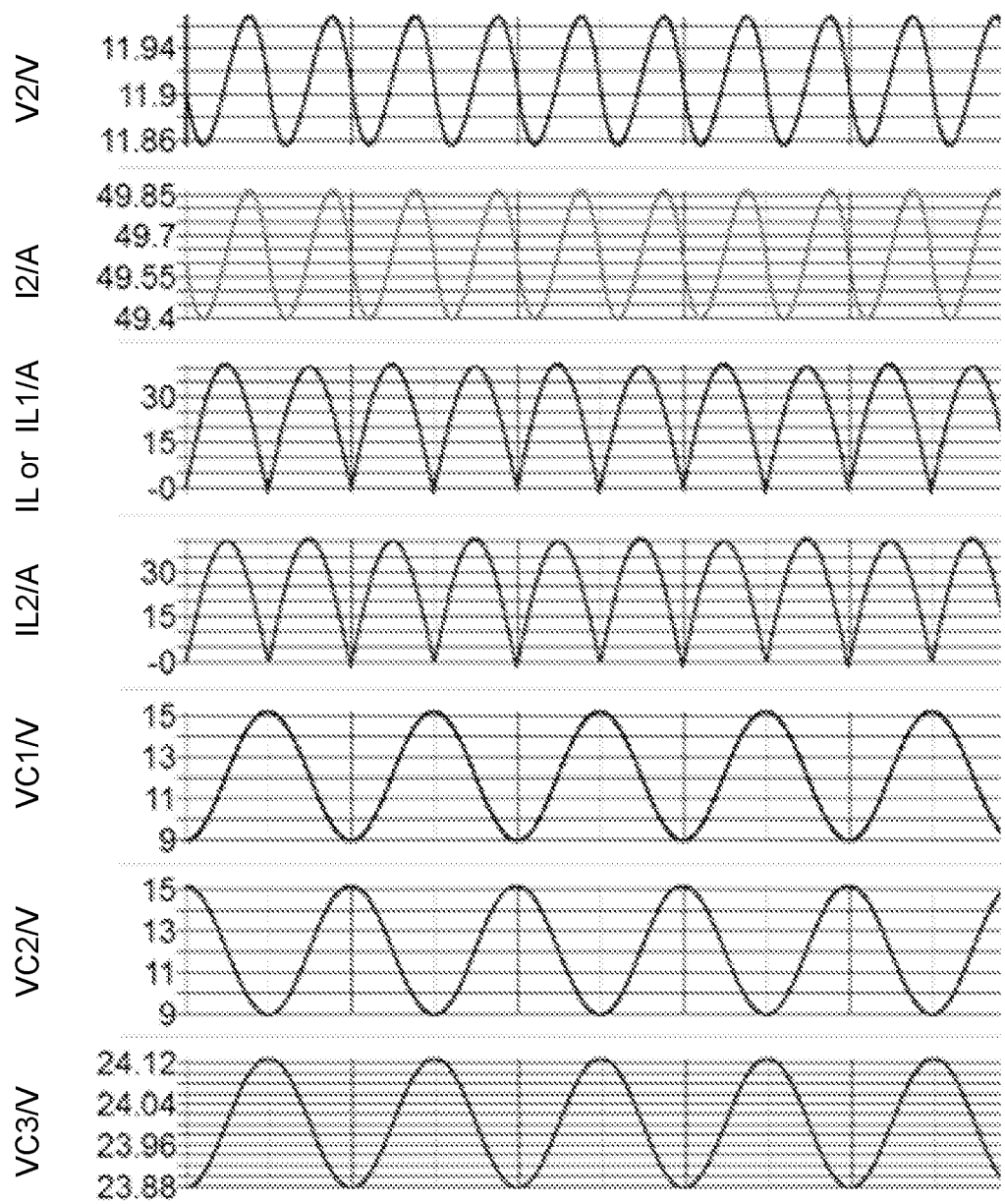
FIG. 9 illustrates signal waveforms depicting the operation of an embodiment of a resonant switched capacitor converter circuit according to the present invention.

Please refer to FIG. 9, which illustrates signal waveforms depicting the operation of an embodiment of a resonant switched capacitor converter circuit shown in FIG. 6 and FIG. 7. A resonant current (i.e., inductor current IL) flowing through the inductor L (corresponding to embodiment of FIG. 6) and resonant currents (i.e., inductor current IL1 and inductor current IL2) flowing through the inductors L1 and L2 (corresponding to embodiment of FIG. 7) are full-wave rectified sinusoidal waves. That is, in this embodiment, the resonant current IL, the resonant current IL1 and the resonant current IL2 are full-wave rectified sinusoidal waves which are greater than zero.

Please still refer to FIG. 9. From one perspective, in one embodiment, at least a part of the switches Q1~Q10 are switched at a time point when an inductor current (i.e., IL, IL1, and IL2) of the inductor (i.e., L, L1, L2) is zero, so that at least a part of the switches Q1~Q10 achieve zero current switching. The features and the details of the control mechanism of zero current switching will be described later.

The pipeline resonant switched capacitor converter circuit and the pipeline non-resonant switched capacitor converter circuit according to the present invention can be controlled to operate in different conversion ratio by controlling a part of switches to be always ON, while another part of switches to be always OFF. To elaborate in more detail, taking the above-mentioned switching converter 310 as an example, the switching converter 310 can operate in a 2-fold conversion mode by controlling a part of the switches Q1~Q10 to be always ON, another part of the switches Q1~Q10 to be always OFF, and a further other part of the switches Q1~Q10 to operably switch one of the second capacitor (i.e., capacitor C2) and the third capacitor (i.e., capacitor C3) according to the cycle period, so that during the first period within the cycle period, one of the second capacitor (i.e., capacitor C2) and the third capacitor (i.e., capacitor C3) is electrically connected in series between the first power and the second power, and during the second period within the cycle period, the one of the second capacitor (i.e., capacitor C2) and the third capacitor (i.e., capacitor C3) is electrically connected in parallel to the second power, whereby a ratio of the first voltage V1 of the first power to the second voltage V2 of the second power is equal to 2.

Figure 10A:
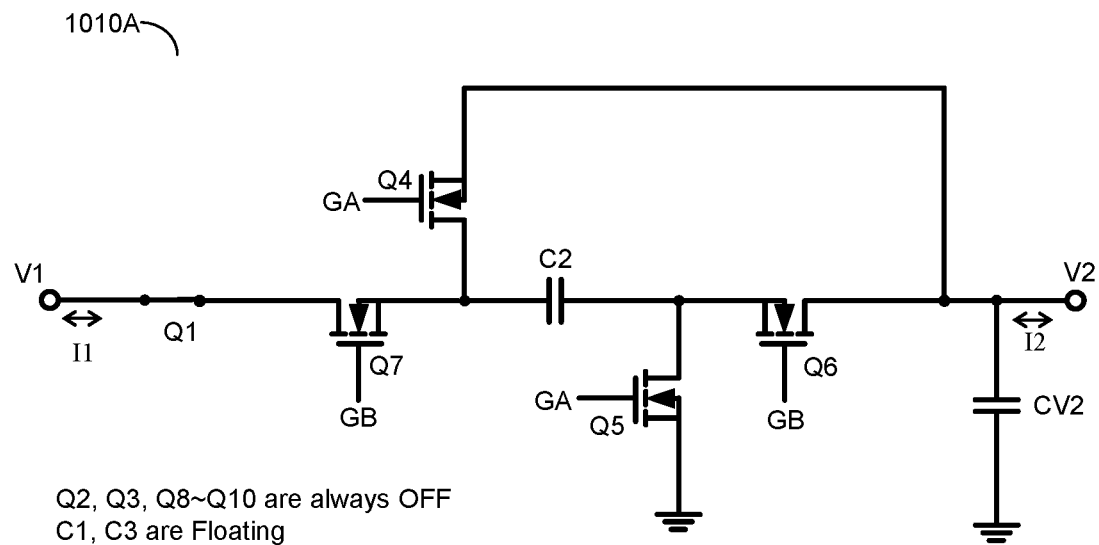
FIG. 10A and FIG. 10B show two embodiments of the non-resonant switched capacitor converter circuit according to the present invention.
Figure 10B:
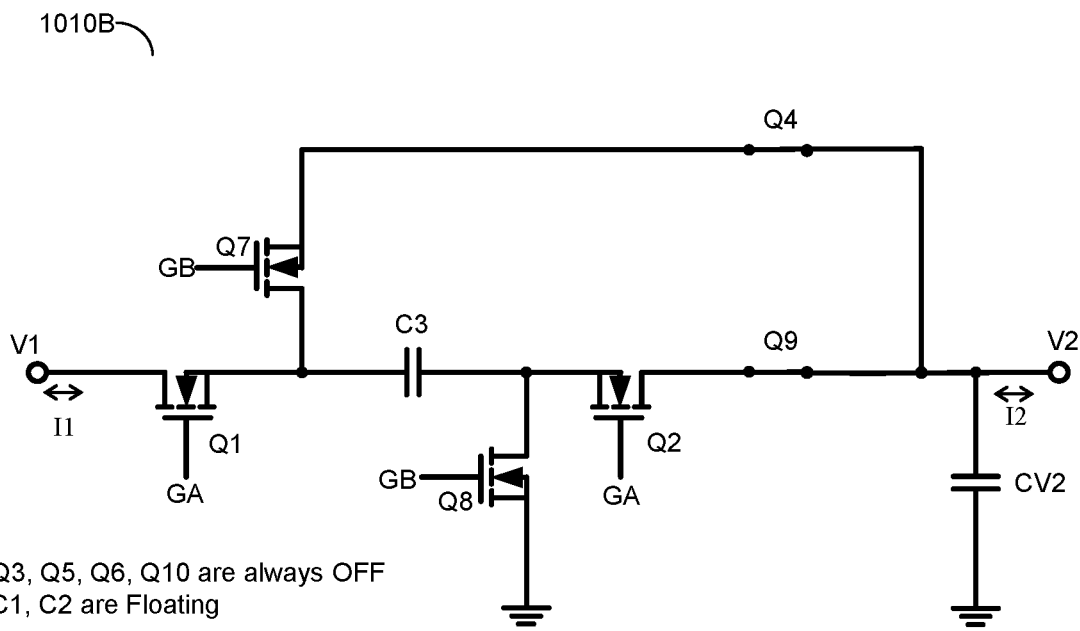

FIG. 10A and FIG. 10B show two embodiments of a non-resonant switched capacitor converter circuit. Please refer to FIG. 10A. The switching converter 1010A of in FIG.

10A corresponds to the switching converter 310 of the embodiment shown in FIG. 3. In this embodiment, the switching converter 1010A operates in a 2-fold conversion mode, wherein the switch Q1 is always ON (as shown by short circuit in FIG. 10A), whereas, the switches Q2, Q3, and Q8~Q10 are always OFF. Besides, the switches Q4~Q7 are configured to operably switch the second capacitor (i.e., capacitor C2) according to the cycle period, so that during the first period within the cycle period, the second capacitor (i.e., capacitor C2) is electrically connected in series between the first power and the second power, and during the second period within the cycle period, the second capacitor (i.e., capacitor C2) is electrically connected in parallel to the second power, such that the ratio of the first voltage V1 of the first power to the second voltage V2 of the second power is equal to 2. In this embodiment, because the switches Q2, Q3, and Q8~Q10 are always OFF, each of the first capacitor (i.e., capacitor C1) and the third capacitor (i.e., capacitor C3) has at least one end which is always floating.

Please refer to FIG. 10B which shows another embodiment, wherein the switching converter 1010B of FIG. 10A corresponds to the switching converter 310 of the embodiment shown in FIG. 3. In this embodiment, the switching converter 1010B operates in a 2-fold conversion mode, wherein the switches Q4 and Q9 are always ON (as shown by short circuit in FIG. 10B), whereas, the switches Q3, Q5, Q6, and Q10 are always OFF. Besides, the switches Q1, Q2, Q7, and Q8 are configured to operably switch the third capacitor (i.e., capacitor C3) according to the cycle period, so that during the first period within the cycle period, the third capacitor (i.e., capacitor C3) is electrically connected in series between the first power and the second power, and during the second period within the cycle period, the third capacitor (i.e., capacitor C3) is electrically connected in parallel to the second power, such that a ratio of the first voltage V1 of the first power to the second voltage V2 of the second power is equal to 2. In this embodiment, because the switches Q3, Q5, Q6, and Q10 are always OFF, each of the first capacitor (i.e., capacitor C1) and the second capacitor (i.e., capacitor C2) has at least one end which is always floating.

Figure 11:
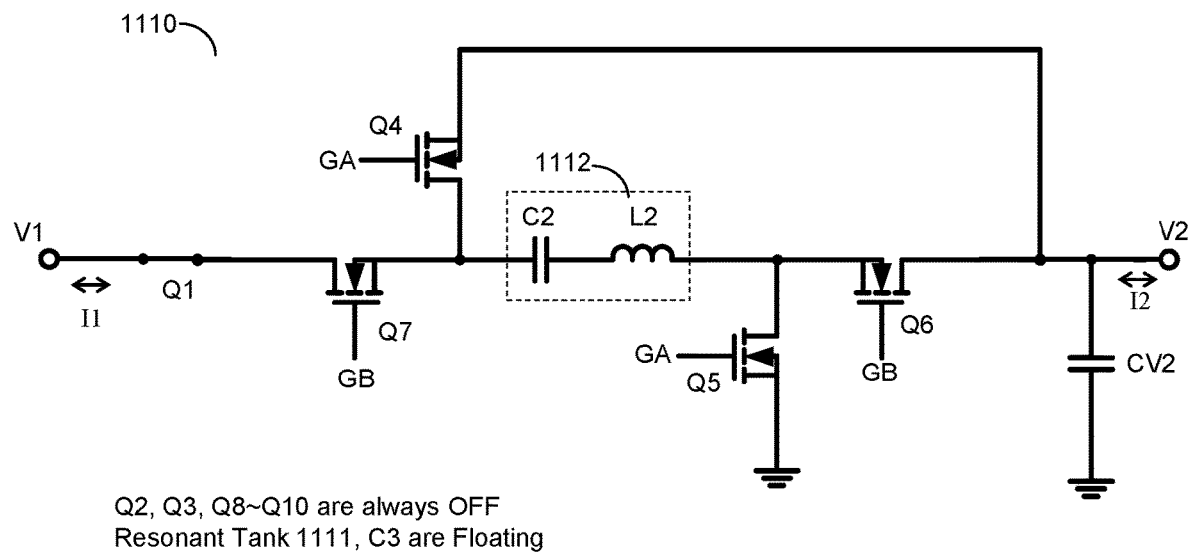
FIGS. 11-13 show schematic diagrams of a resonant switched capacitor converter circuit according to several embodiments of the present invention.
Figure 12:
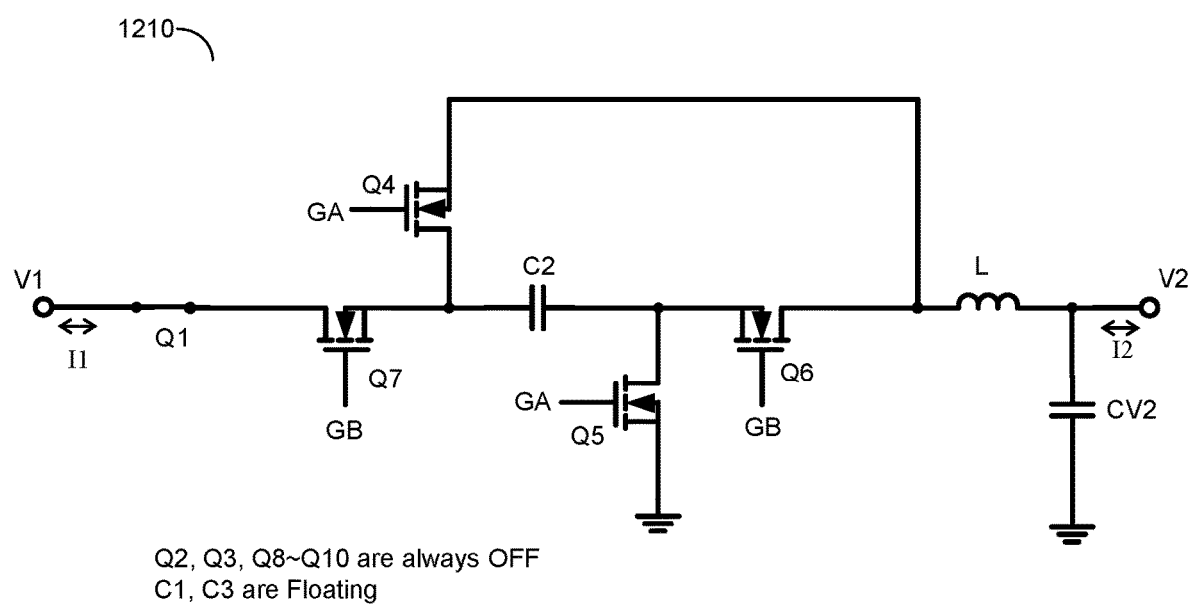
Figure 13:
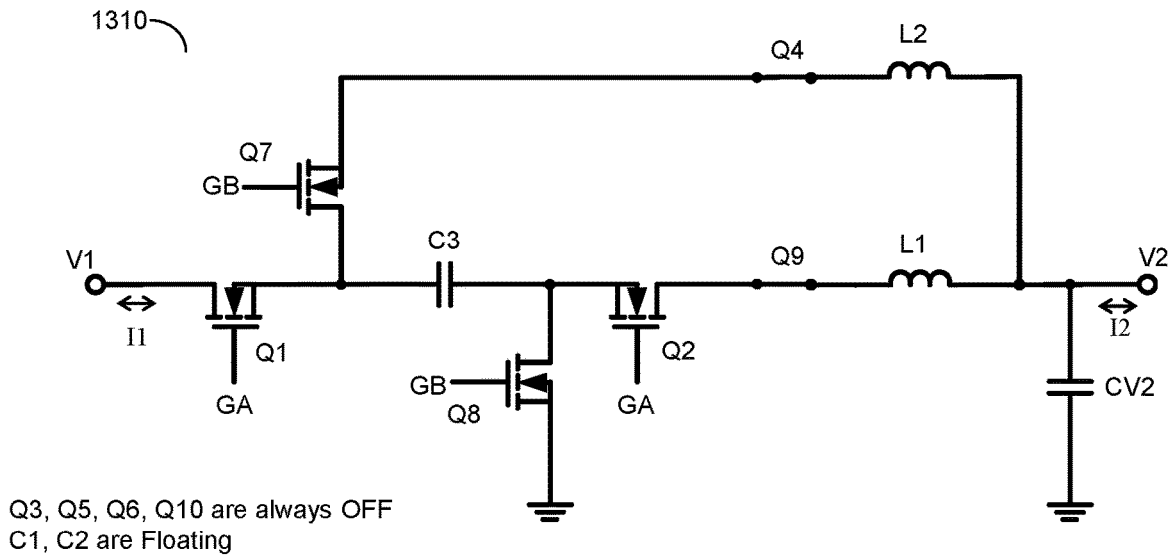

Please refer to FIGS. 11-13, which show schematic diagrams of a resonant switched capacitor converter circuit according to an embodiment of the present invention. The switching converter 1110 of FIG. 11 corresponds to the switching converter 510 of the embodiment shown in FIG. 5. And, the operation mechanism of switches in the switching converter 1110 shown in FIG. 11 is similar to the operation mechanism of switches in the switching converter 1010A shown in FIG. 10A. To elaborate in more detail, in this embodiment, the switching converter 1110 operates in a 2-fold conversion mode, wherein the switch Q1 is always ON (as shown by short circuit in FIG. 11), whereas, the switches Q2, Q3, and Q8~Q10 are always OFF. Besides, the switches Q4~Q7 are configured to operably switch the second capacitor (i.e., capacitor C2) according to the cycle period, so that during the first period within the cycle period, the second capacitor (i.e., capacitor C2) and the inductor L2 is electrically connected in series between the first power and the second power, and during the second period within the cycle period, the second capacitor (i.e., capacitor C2) and the inductor L2 form a series circuit which is electrically connected in parallel to the second power, such that a ratio of the first voltage V1 of the first power to the second voltage V2 of the second power is equal to 2. The second capacitor (i.e., capacitor C2) and the inductor L2 operate in resonant fashion to achieve power conversion between the first power and the second power. In this embodiment, because the switches Q2, Q3, and Q8~Q10 are always OFF, each of the resonant tank 1111 (which includes the first capacitor C1 and the inductor L1) and the third capacitor (i.e., capacitor C3) has at least one end which is always floating.

Please refer to FIG. 12. The switching converter 1210 of FIG. 12 corresponds to the switching converter 610 of the embodiment shown in FIG. 6. And, the operation mechanism of the switches in the switching converter 1210 shown in FIG. 12 is similar to the operation mechanism of the switches in the switching converter 1010A shown in FIG. 10A. To elaborate in more detail, in this embodiment, the switching converter 1210 operates in a 2-fold conversion mode, wherein the switch Q1 is always ON (as shown by short circuit in FIG. 12), whereas, the switches Q2, Q3, and Q8~Q10 are always OFF. Besides, the switches Q4~Q7 are configured to operably switch the second capacitor (i.e., capacitor C2) according to the cycle period, so that during the first period within the cycle period, the switches Q4~Q7 control the second capacitor (i.e., capacitor C2) to be electrically connected in series to the inductor L via the switching node LX, and the series circuit formed by the second capacitor (i.e., capacitor C2) and the inductor L is electrically connected in series between the first power and the second power, and during the second period within the cycle period, the switches Q4~Q7 control the second capacitor (i.e., capacitor C2) to be electrically connected in series to the inductor L via the switching node LX, and the series circuit formed by the second capacitor (i.e., capacitor C2) and the inductor L is electrically connected in parallel to the second power. In other words, during the second period within the cycle period, the switches Q4~Q7 control the second capacitor (i.e., capacitor C2) to be electrically connected in series to the inductor L via the switching node LX, and the series circuit formed by the second capacitor (i.e., capacitor C2) and the inductor L is connected between the second power and the ground voltage level, such that a ratio of the first voltage V1 of the first power to the second voltage V2 of the second power is equal to 2. The second capacitor (i.e., capacitor C2) and the inductor L operate in resonant fashion to achieve power conversion between the first power and the second power. In this embodiment, because the switches Q2, Q3, and Q8~Q10 are always OFF, each of the first capacitor (i.e., capacitor C1) and the third capacitor (i.e., capacitor C3) has at least one end which is always floating.

Please refer to FIG. 13. The switching converter 1310 of FIG. 13 corresponds to the switching converter 710 of the embodiment shown in FIG. 7. And, the operation mechanism of the switches in the switching converter 1310 shown in FIG. 13 is similar to the operation mechanism of the switches in the switching converter 1010A shown in FIG. 10A. To elaborate in more detail, in this embodiment, the switching converter 1310 operates in a 2-fold conversion mode, wherein the switches Q4 and Q9 are always ON (as shown by short circuit in FIG. 13), whereas, the switches Q3, Q5, Q6, and Q10 are always OFF. Besides, the switches Q1, Q2, Q7, and Q8 are configured to operably switch the third capacitor (i.e., capacitor C3) according to the cycle period, so that during the first period within the cycle period, the switches Q1, Q2, Q7, and Q8 control the third capacitor (i.e., capacitor C3) to be electrically connected in series to the inductor L via the switching node LX, and the series circuit formed by the third capacitor (i.e., capacitor C3) and the inductor L is electrically connected in series between the first power and the second power, and during the second period within the cycle period, the switches Q1, Q2, Q7, and Q8 control the third capacitor (i.e., capacitor C3) to be electrically connected in series to the inductor L via the switching node LX, and the series circuit formed by the third capacitor (i.e., capacitor C3) and the inductor L is electrically connected in parallel to the second power. In other words, during the second period within the cycle period, the switches Q1, Q2, Q7, and Q8 control the third capacitor (i.e., capacitor C3) to be electrically connected in series to the inductor L via the switching node LX, and the series circuit formed by the third capacitor (i.e., capacitor C3) and the inductor L is connected between the second power and the ground voltage level, such that a ratio of the first voltage V1 of the first power to the second voltage V2 of the second power is equal to 2. The third capacitor (i.e., capacitor C3) and the inductor L operate in resonant fashion to achieve power conversion between the first power and the second power. In this embodiment, because the switches Q3, Q5, Q6, and Q10 are always OFF, each of the first capacitor (i.e., capacitor C1) and the second capacitor (i.e., capacitor C2) has at least one end which is always floating.

Figure 14:
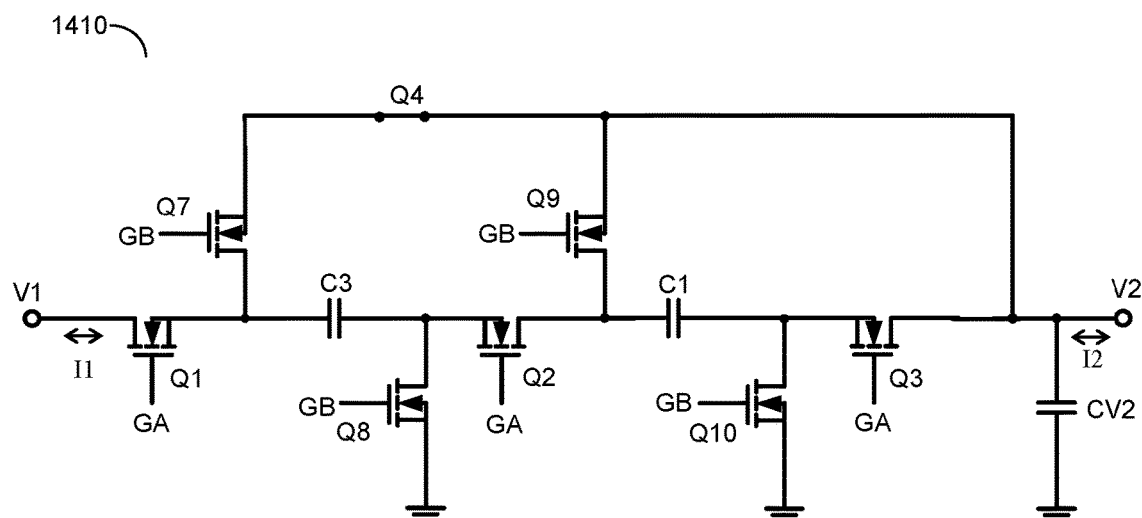
FIG. 14 shows a schematic diagram of a non-resonant switched capacitor converter circuit according to an embodiment of the present invention.

Please refer to FIG. 14, which shows a schematic diagram of a non-resonant switched capacitor converter circuit according to an embodiment of the present invention. The switching converter 1410 of FIG. 14 corresponds to the switching converter 310 of the embodiment shown in FIG. 3. In this embodiment, the switching converter 1410 operates in a 3-fold conversion mode, wherein the switch Q4 is always ON (as shown by short circuit in FIG. 14), whereas, the switches Q5 and Q6 are always OFF. Besides, the switches Q1~Q3 and Q7~Q10 are configured to operably switch the first capacitor (i.e., capacitor C1) and the third capacitor (i.e., capacitor C3) according to the cycle period, so that during the first period within the cycle period, the first capacitor (i.e., capacitor C1) and the third capacitor (i.e., capacitor C3) are electrically connected in series between the first power and the second power, and during the second period within the cycle period, the first capacitor (i.e., capacitor C1) and the third capacitor (i.e., capacitor C3) are electrically connected in parallel to the second power, such that a ratio of the first voltage V1 of the first power to the second voltage V2 of the second power is equal to 3. In this embodiment, because the switches Q5 and Q6 are always OFF, each of the second capacitor (i.e., capacitor C2) has at least one end which is always floating.

Figure 15A:
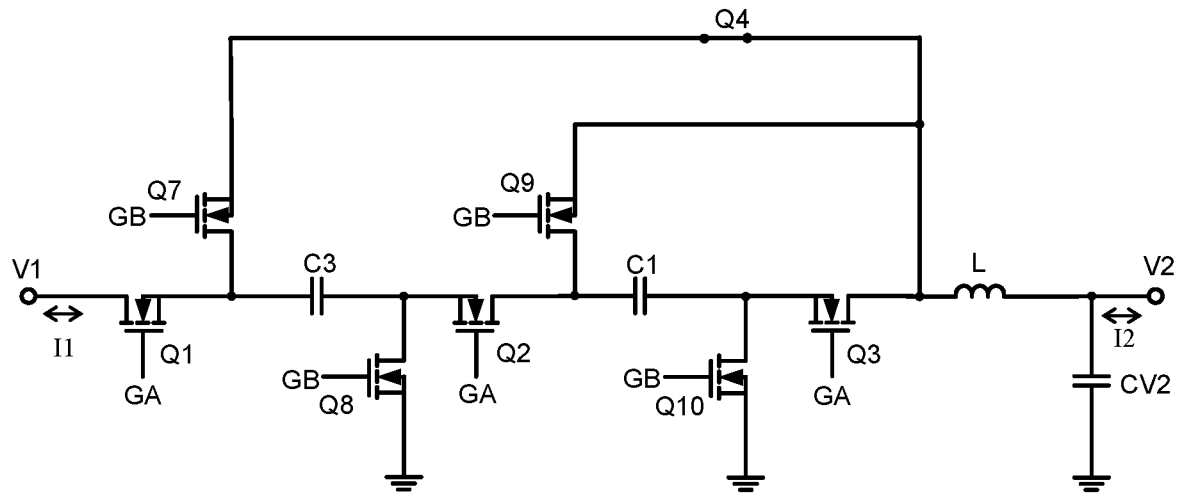
FIG. 15A and FIG. 15B show two embodiments of a resonant switched capacitor converter circuit according to the present invention.
Figure 15B:
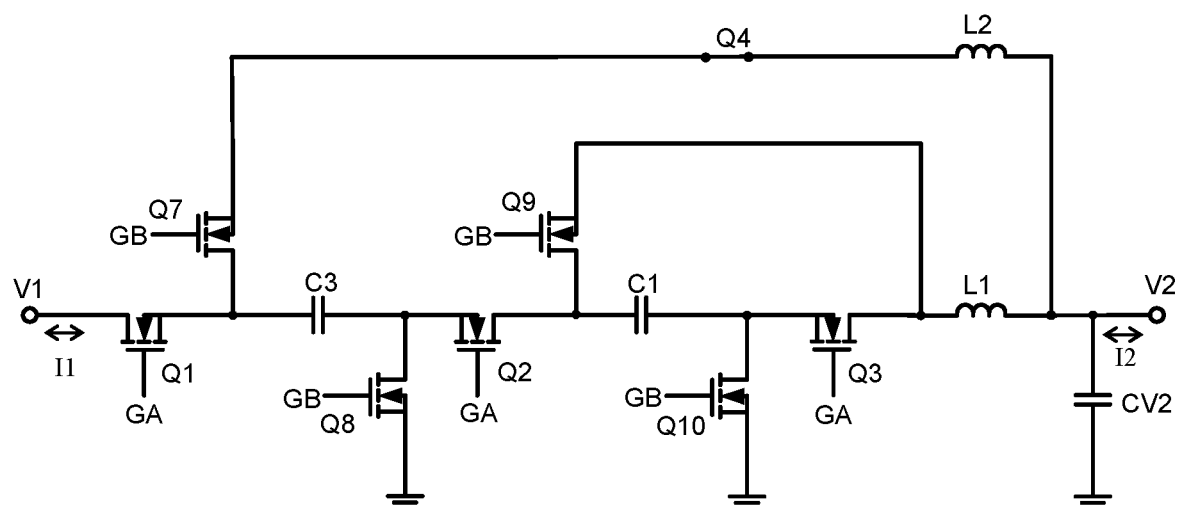

Please refer to FIG. 15A and FIG. 15B, which show two embodiments of a resonant switched capacitor converter circuit. The switching converter 1510A of FIG. 15A corresponds to the switching converter 610 of the embodiment shown in FIG. 6. And, the operation mechanism of the switches in the switching converter 1510A shown in FIG. 15A is similar to the operation mechanism of the switches in the switching converter 1410 shown in FIG. 14. To elaborate in more detail, in this embodiment, the switching converter 1510A operates in a 3-fold conversion mode, wherein the switch Q4 is always ON (as shown by short circuit in FIG. 15A), whereas, the switches Q5 and Q6 are always OFF. Besides, the switches Q1~Q3 and Q7~Q10 are configured to operably switch the first capacitor (i.e., capacitor C1) and the third capacitor (i.e., capacitor C3) according to the cycle period, so that during the first period within the cycle period, the first capacitor (i.e., capacitor C1), the third capacitor (i.e., capacitor C3) and the inductor L are electrically connected in series between the first power and the second power, and during the second period within the cycle period, the first capacitor (i.e., capacitor C1) and the third capacitor (i.e., capacitor C3) form a parallel circuit which is electrically connected in series to the inductor L, and the series circuit formed by the inductor L with the parallel circuit is electrically connected in parallel to the second power, such that a ratio of the first voltage V1 of the first power to the second voltage V2 of the second power is equal to 3. The first capacitor (i.e., capacitor C1) and the third capacitor (i.e., capacitor C3) and the inductor L operate in resonant fashion to achieve power conversion between the first power and the second power. In this embodiment, because the switches Q5 and Q6 are always OFF, the second capacitor (i.e., capacitor C2) has one end which is always floating.

Please refer to FIG. 15B. The switching converter 1510B of FIG. 15B corresponds to the switching converter 710 of the embodiment shown in FIG. 7. And, the operation mechanism of the switches in the switching converter 1510B shown in FIG. 15B is similar to the operation mechanism of the switches in the switching converter 1510A shown in FIG. 15A, but is different in that: during the first period within the cycle period, the first capacitor (i.e., capacitor C1), the third capacitor (i.e., capacitor C3) and the inductor L1 are electrically connected in series between the first power and the second power. On the other hand, during the second period within the cycle period, the first capacitor (i.e., capacitor C1) is electrically connected in series to the inductor L1 and the third capacitor (i.e., capacitor C3) is electrically connected in series to the inductor L2, and the series circuit formed by the first capacitor (i.e., capacitor C1) and the inductor L1 is electrically connected in parallel to the second power and the series circuit formed by the third capacitor (i.e., capacitor C3) and the inductor L2 is electrically connected in parallel to the second power, such that a ratio of the first voltage V1 of the first power to the second voltage V2 of the second power is equal to 3. In regard to operation details of the above-mentioned switches, please refer to the embodiments shown in FIG. 15A.

It is worthwhile noting that, the arrangement of switches and devices in the above-mentioned FIG. 10A, FIG. 10B, FIG. 11 to FIG. 14, FIG. 15A and FIG. 15B correspond to the arrangement of switches and devices in the above-mentioned FIG. 3 or FIG. 5 to FIG. 7. That is, by keeping a part of the switches to be always ON and another part of the switches to be always OFF, and controlling a still other part of the switches to switch according the required conversion mode, the embodiments shown in the above-mentioned FIG. 10A, FIG. 10B, FIG. 11 to FIG. 14, FIG. 15A and FIG. 15B can achieve a desired ratio of the first voltage V1 of the first power to the second voltage V2 of the second power, which can be several different values. Note that FIG. 10A, FIG. 10B, FIG. 11 to FIG. 14, FIG. 15A and FIG. 15B show equivalent circuit diagrams corresponding to the embodiments shown in FIG. 3 or FIG. 5 to FIG. 7, wherein for simplicity, the switches which are always OFF and the capacitors which are always floating are omitted.

Figure 16:
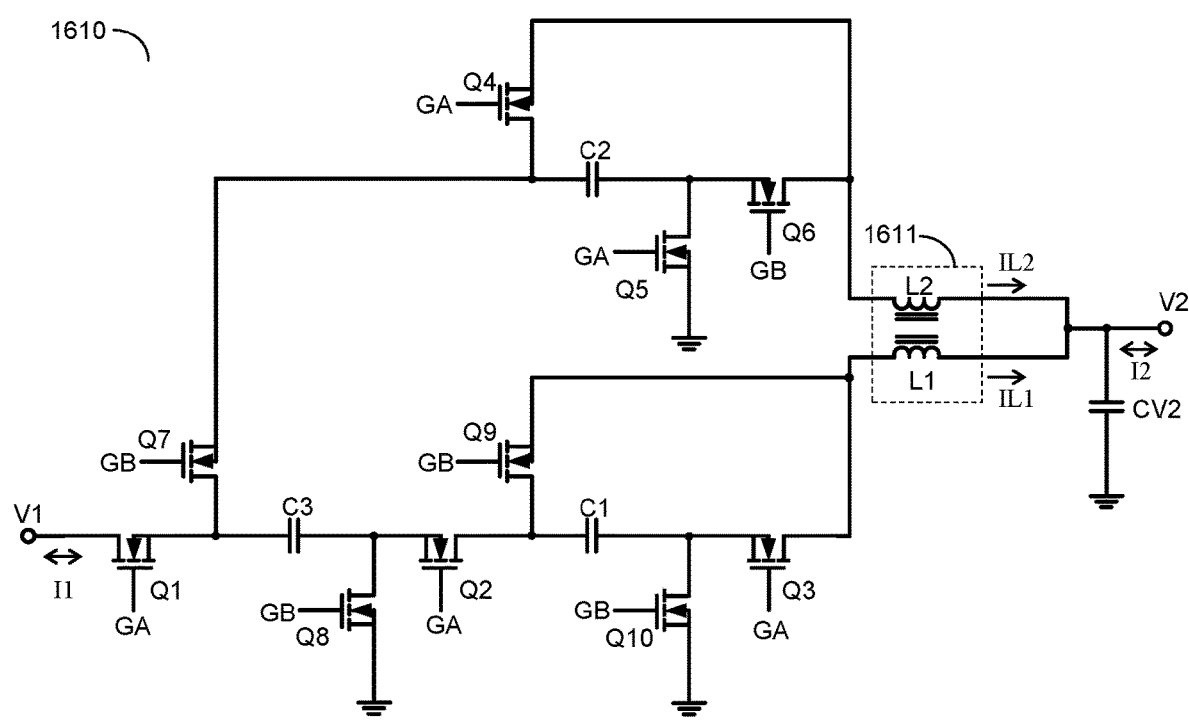
FIG. 16 shows a schematic diagram of a resonant switched capacitor converter circuit according to an embodiment of the present invention.

Please refer to FIG. 16, which shows a schematic diagram of a resonant switched capacitor converter circuit according to an embodiment of the present invention. The switching converter 1610 of FIG. 16 is similar to the switching converter 710 of the embodiment shown in FIG. 7, but is different in that: in this embodiment, the inductor L1 and the inductor L2 of the switching converter 1610 have coupled inductance (i.e. the inductances of interaction the inductor L1 and the inductor L2 interact with each other). As a consequence, there is better current balance between the inductor current IL1 and the inductor current IL2 of the switching converter 1610 and also a better voltage balance between the capacitor C1 and the capacitor C2 of the switching converter 1610.

In one embodiment, the inductor L1 and the inductor L2 can be configured as coupled inductors or configured as a transformer (e.g., as shown by numerical reference 1611 in FIG. 16).

Figure 17:
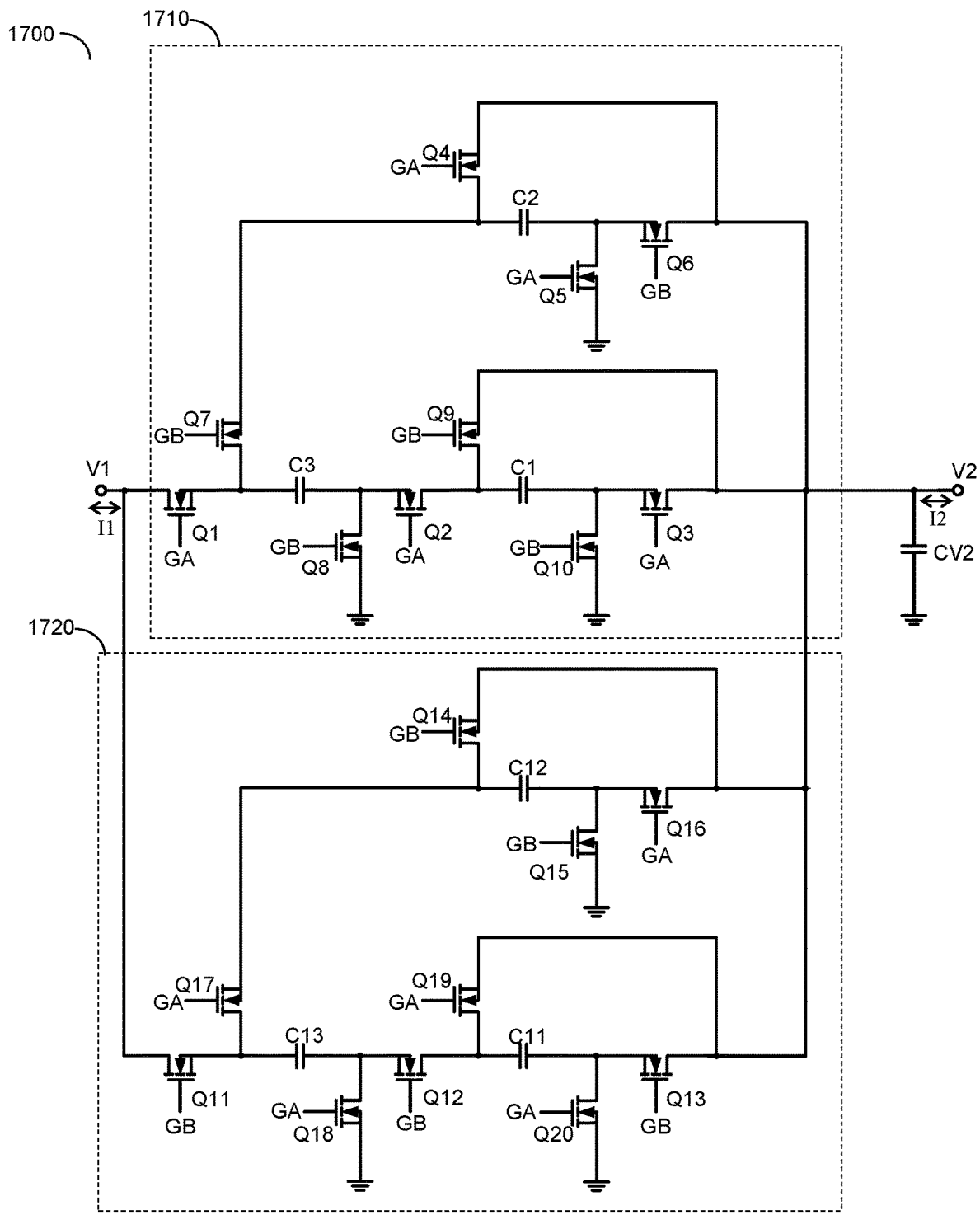
FIG. 17 shows a schematic diagram of a non-resonant switched capacitor converter circuit according to an embodiment of the present invention.

Please refer to FIG. 17, which shows a schematic diagram of a non-resonant switched capacitor converter circuit according to an embodiment of the present invention. In one embodiment, the switched capacitor converter circuit 1700 includes: a first switching converter 1710 and a second switching converter 1720. The first switching converter 1710 and the second switching converter 1720 are coupled in parallel between the first power and the second power. In this embodiment, the first switching converter 1710 and the second switching converter 1720 correspond to, for example, the switching converter 310 of the embodiment shown in FIG. 3. In this embodiment, through operation of the switching converters (i.e., the first switching converter 1710 and the second switching converter 1720) coupled in parallel to each other, this embodiment can increase the output power can or reduce the ripples. That the switching converters are "coupled in parallel" indicates that the input ends of the switching converters are both electrically connected to for example the first power, whereas, the output ends of the switching converters are both electrically connected to for example the second power.

In one embodiment, the first switching converter 1710 and the second switching converter 1720 are configured to respectively control the switches therein in opposite phases, to execute power conversion in an alternating fashion. To elaborate in more detail, in this embodiment, as shown in FIG. 17, control signals GA and GB for controlling the switches Q1~Q10 of the first switching converter 1710 are in phase with the control signals GA and GB for controlling the switches Q1~Q10 of the switching converter 310 of the embodiment shown in FIG. 3, whereas, control signals GA and GB for controlling the switches Q11~Q20 of the second switching converter 1720 are in opposite phase with the control signals GA and GB for controlling the switches Q1~Q10 of the switching converter 310 of the embodiment shown in FIG. 3 (i.e., the control signals GA and GB for controlling the switches Q11~Q20 of the second switching converter 1720 are in opposite phase with the control signals GA and GB for controlling the switches Q1~Q10 of the first switching converter 1710).

Figure 18:
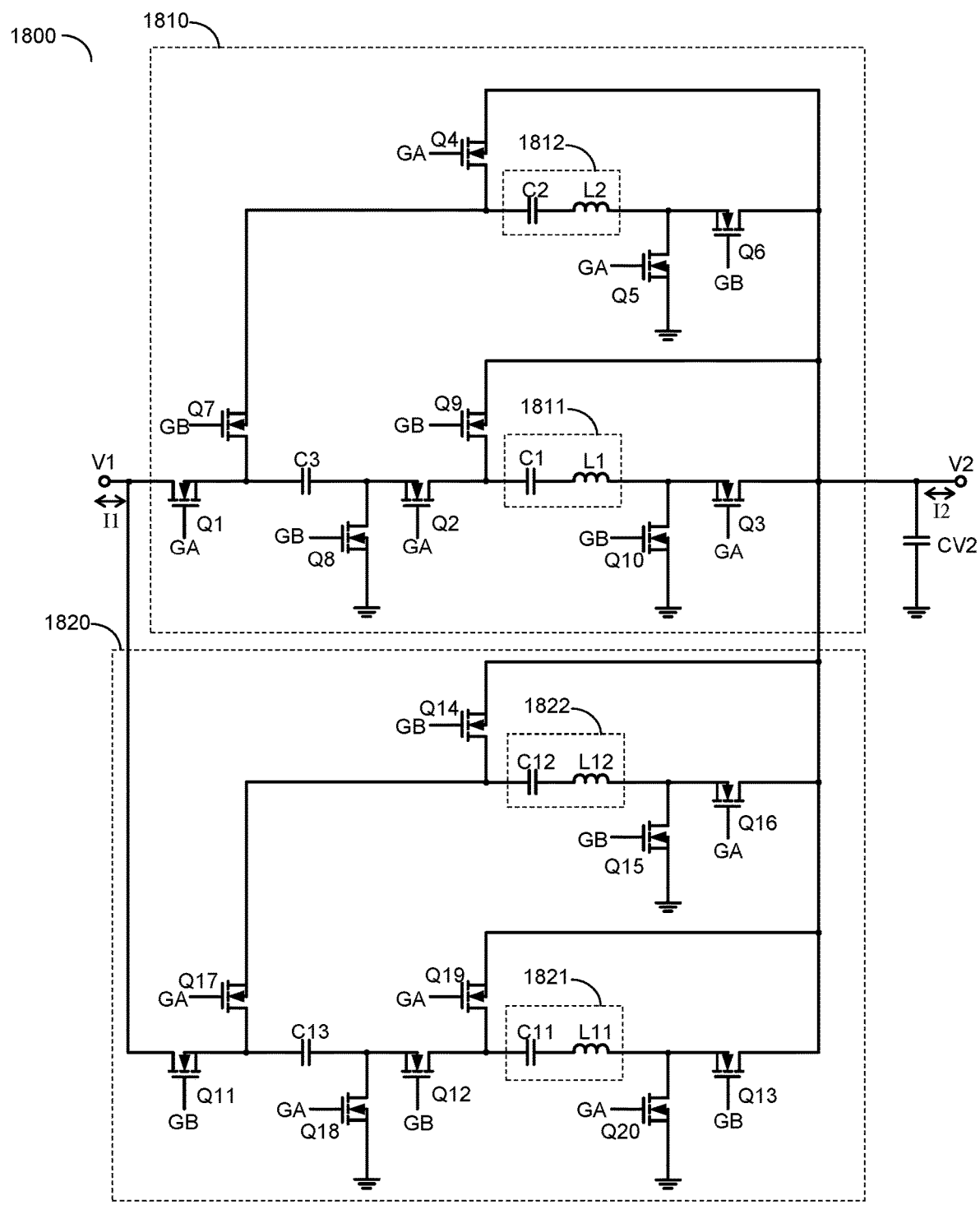
FIGS. 18-20 show schematic diagrams of a resonant switched capacitor converter circuit according to several embodiments of the present invention.
Figure 19:
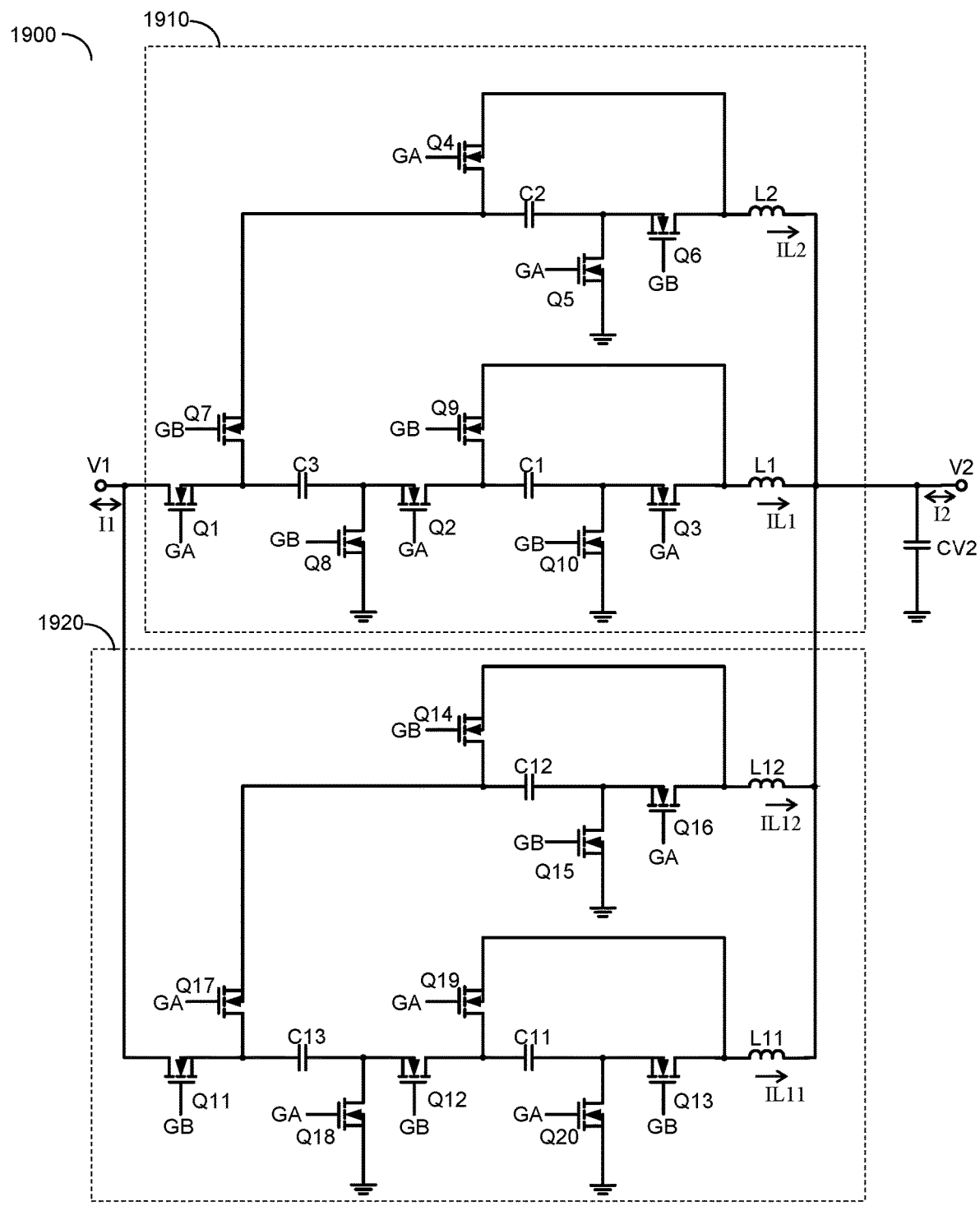
Figure 20:
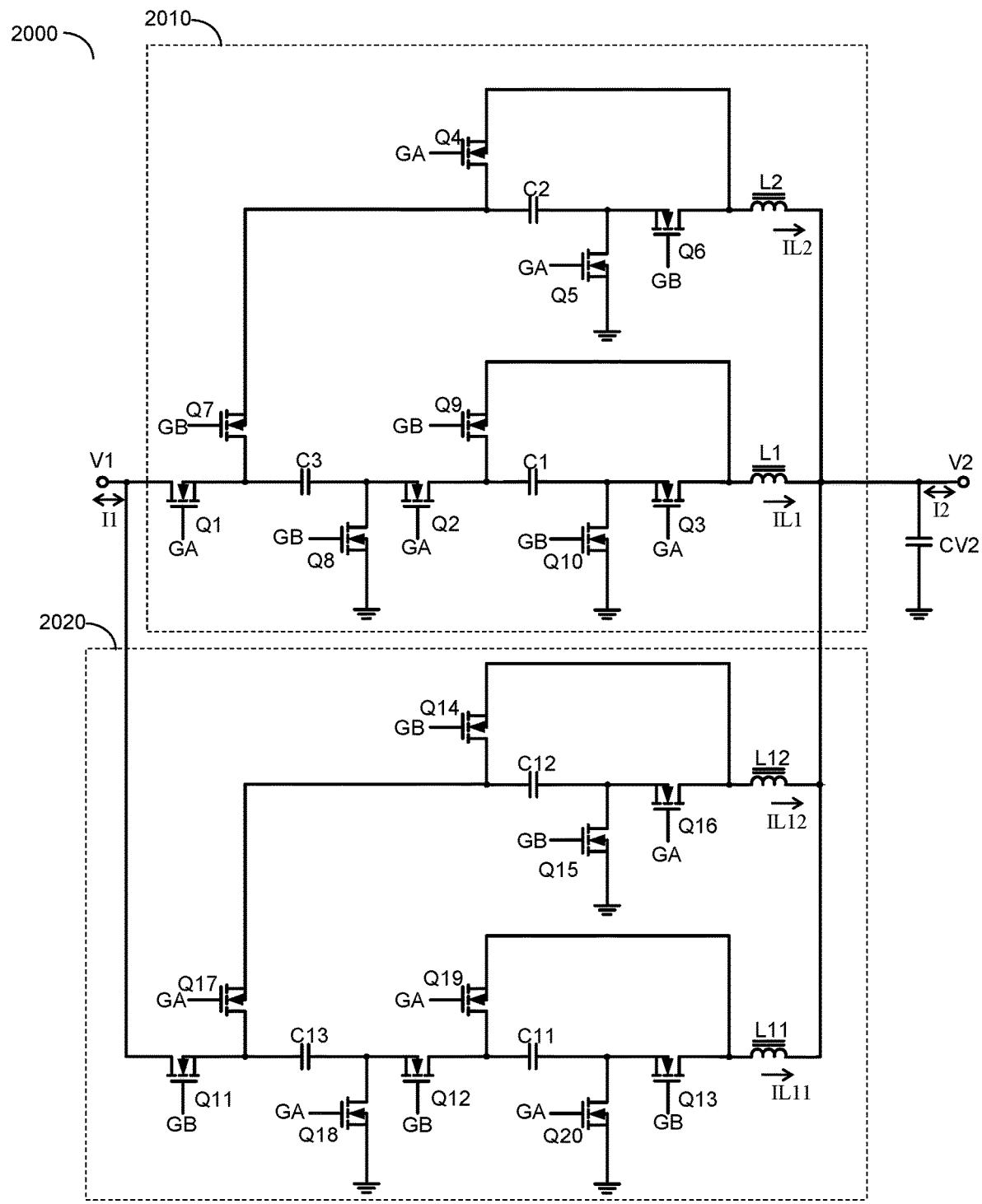

Please refer to FIGS. 18-20, which show schematic diagrams of a resonant switched capacitor converter circuit according to several embodiments of the present invention.

Please refer to FIG. 18. The switched capacitor converter circuit 1800 of FIG. 18 is similar to the switched capacitor converter circuit 1700 of the embodiment shown in FIG. 17 (i.e., the switched capacitor converter circuit 1800 includes a first switching converter 1810 and a second switching converter 1820), but is different in that: the first switching converter 1810 and the second switching converter 1820 further includes: an inductor L1, an inductor L2, an inductor L11 and an inductor L12, which are electrically connected in series to a capacitor C1, a capacitor C2, a capacitor C11 and a capacitor C12, respectively, so as to constitute a resonant tank 1811, a resonant tank 1812, a resonant tank 1821 and a resonant tank 1822, respectively. Similar to the switched capacitor converter circuit 1700 of the embodiment shown in FIG. 17, the switched capacitor converter circuit 1800 of FIG. 18 operates the first switching converter 1810 and the second switching converter 1820 in an alternating fashion, so as to execute power conversion in an alternating fashion. Each of the first switching converter 1810 and the second switching converter 1820 is similar to the switching converter 510 of the embodiment shown in FIG. 5, to execute power conversion in resonant fashion.

Please refer to FIG. 19. The switched capacitor converter circuit 1900 of FIG. 19 is similar to the switched capacitor converter circuit 1700 of the embodiment shown in FIG. 17 (i.e., the switched capacitor converter circuit 1900 includes a first switching converter 1910 and a second switching converter 1920), but is different in that: the first switching converter 1910 and the second switching converter 1920 further includes: an inductor L1, an inductor L2, an inductor L11 and an inductor L12, which are electrically connected in series (which is similar to the connection manners shown in FIG. 7) to a current path of a capacitor C1, a current path of a capacitor C2, a current path of a capacitor C11 and a current path of a capacitor C12, respectively. Similar to the switched capacitor converter circuit 1700 of the embodiment shown in FIG. 17, the switched capacitor converter circuit 1900 of FIG. 19 operates the first switching converter 1910 and the second switching converter 1920 in an alternating fashion, so as to execute power conversion in an alternating fashion. Each of the first switching converter 1910 and the second switching converter 1920 is similar to the switching converter 710 of the embodiment shown in FIG. 7, to execute power conversion in resonant fashion.

Please refer to FIG. 20. The switched capacitor converter circuit 2000 of FIG. 20 is similar to the switched capacitor converter circuit 1900 of the embodiment shown in FIG. 19. An inductor L1, an inductor L2, an inductor L11 and an inductor L12 of the switched capacitor converter circuit 2000 have coupled inductance among one another. As a consequence, there is better current balance among an inductor current IL1, an inductor current IL2, an inductor current IL11 and an inductor current IL12 of the switched capacitor converter circuit 2000, and better voltage balance among a capacitor C1, a capacitor C2, a capacitor C11 and a capacitor C12 of the switched capacitor converter circuit 2000. In one embodiment, depending upon practical consideration, it can be arranged so that all four of the inductor L1, the inductor L2, the inductor L11 and the inductor L12 of the switched capacitor converter circuit 2000 have coupled inductance among one another or just a part of the above-mentioned four inductors have coupled inductance among one another. In one embodiment, the inductor L1, the inductor L2, the inductor L11 and the inductor L12 can be configured as at least one transformer.

Figure 21:
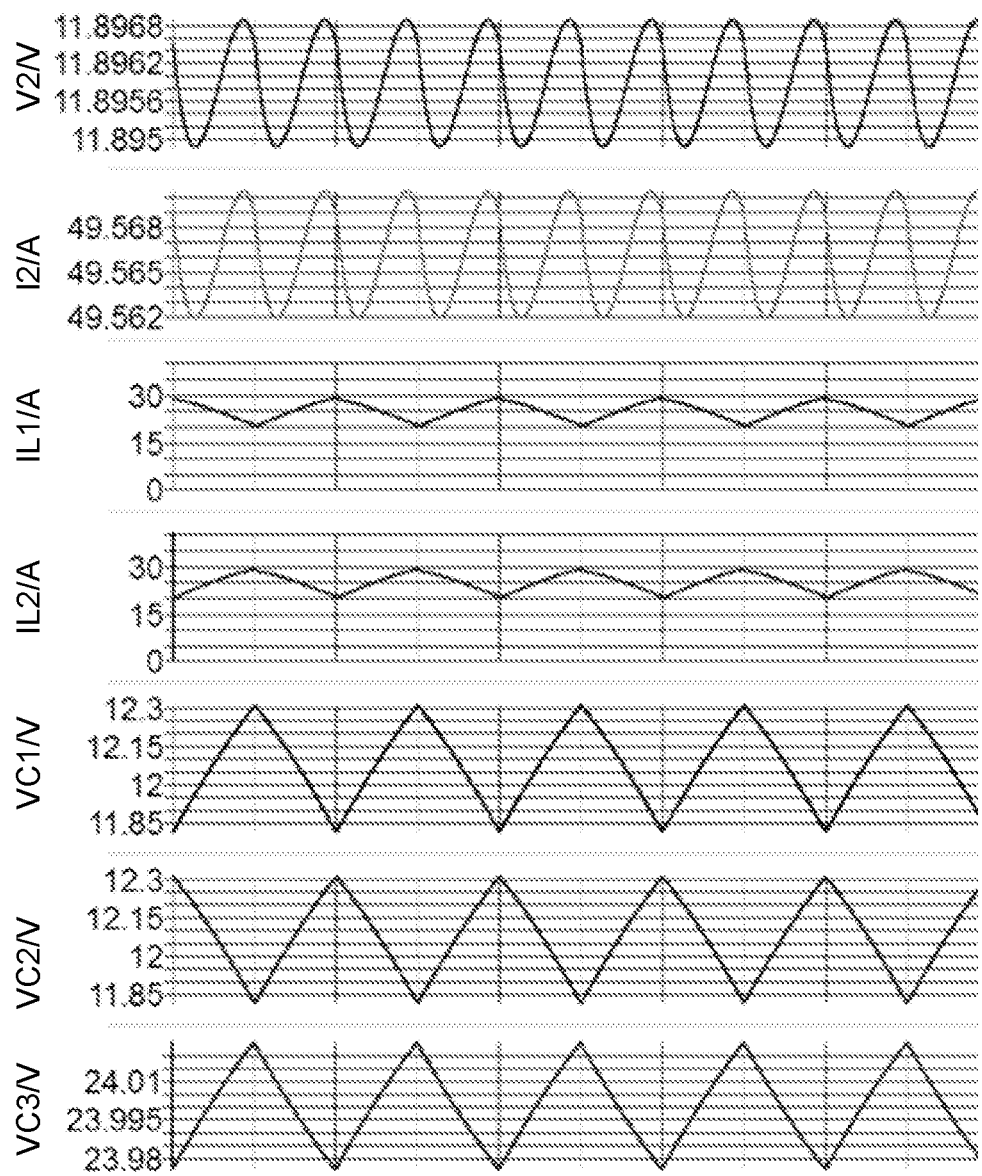
FIG. 21 illustrates signal waveforms depicting the operation of an embodiment of a resonant switched capacitor converter circuit according to the present invention.

Please refer to FIG. 21, which illustrates signal waveforms depicting the operation of a resonant switched capacitor converter circuit according to an embodiment of the present invention. FIG. 21 corresponds to the embodiment shown in FIG. 7. In this embodiment, both the inductor L1 and the inductor L2 operate in a continuous conduction mode (CCM), thus reducing ripples. As shown in FIG. 21, a waveform indicative of the inductor current IL1 and a waveform indicative of the inductor current IL2 demonstrate that both the inductor L1 and the inductor L2 operate in a continuous conduction mode (CCM). Under such circumstance, the ripple voltage of the voltage VC1 across the capacitor C1, the ripple voltage of the voltage VC2 across the capacitor C2, the ripple voltage of the voltage VC3 across the capacitor C3, the ripple voltage of the second voltage V2, the ripple current of the inductor current IL1, the ripple current of the inductor current IL2 and the ripple current of the second current I2 are all remarkably reduced.

Besides, in the implementation wherein inductors operate in the continuous conduction mode (CCM) (e.g., the implementation shown in FIG. 21), it is not required for the switching frequency corresponding to the cycle period (e.g., the frequency of the voltage VC1 across the capacitor C1 shown in FIG. 21) to precisely correspond to the resonant frequency of the inductor L1 and the first capacitor (i.e., capacitor C1) and the resonant frequency of the inductor L2 and the second capacitor (i.e., capacitor C2). In one embodiment, the switching frequency can be lower than the resonant frequency of the inductor L1 and the first capacitor (i.e., capacitor C1) and/or the switching frequency can be lower than the resonant frequency of the inductor L2 and the second capacitor (i.e., capacitor C2). Consequently, the switched capacitor converter circuit of the present invention has higher tolerance toward the variation of the inductor (e.g., L1 and/or L2) and the variation of the capacitor (e.g., C1 and/or C2).

Figure 22A:
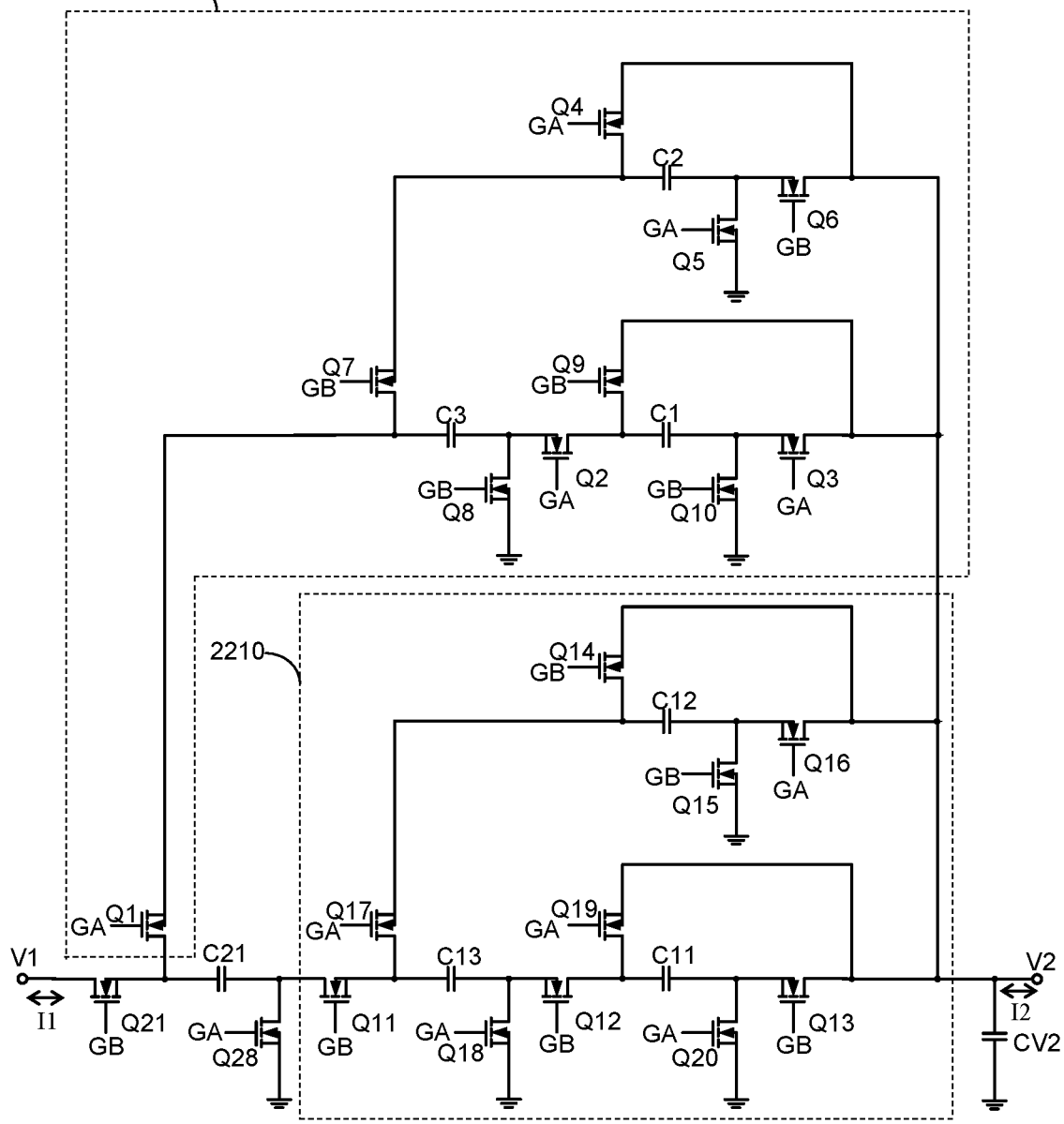
FIG. 22A shows a schematic diagram of a non-resonant switched capacitor converter circuit according to an embodiment of the present invention.
Figure 22B:
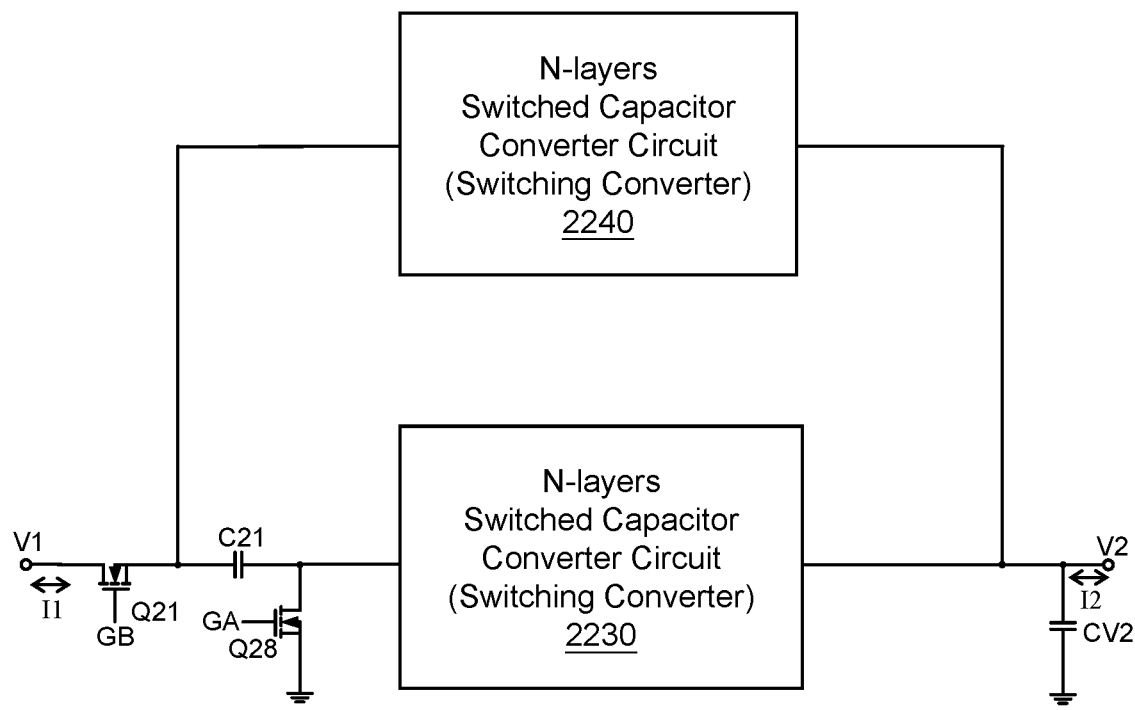
FIG. 22B shows a schematic circuit diagram of a non-resonant switched capacitor converter circuit according to an embodiment of the present invention.

Please refer to FIG. 21 in conjugation with FIG. 22A and FIG. 22B. FIG. 22A shows a schematic diagram of a non-resonant switched capacitor converter circuit according to an embodiment of the present invention. FIG. 22B shows a schematic circuit diagram of a switched capacitor converter circuit according to an embodiment of the present invention.

Please refer to FIG. 22A. In one embodiment, the switched capacitor converter circuit 2200A shown in FIG. 22A includes: a first switching converter 2210, a second switching converter 2220, an upper layer capacitor (i.e., capacitor C21) and upper layer switches (i.e., switches Q21 and Q28). The first switching converter 2210 and the second switching converter 2220 correspond to, for example, the switching converter 310 of the embodiment shown in FIG. 3. From one perspective, the switched capacitor converter circuit 2200A shown in FIG. 22A is a multi-layer structure based on a basic configuration of the switching converter 310 shown in FIG. 3. To elaborate in more detail, in this embodiment, the upper layer capacitor (i.e., capacitor C21), the upper layer switches (i.e., switches Q21 and Q28), the first switching converter 2210 and the second switching converter 2220 are coupled to one another according to a fundamental topology. Please refer FIG. 22B, the "fundamental topology" refers to a structure unit including the upper layer capacitor (i.e., capacitor C21), the upper layer switches (i.e., switches Q21 and Q28), the first switching converter 2210 and the second switching converter 2220, and the coupling relationships among them. The details thereof will be described later.

Please refer to FIG. 22A in conjugation with FIG. 22B. In one embodiment, based upon the above-mentioned fundamental topology, an input end of the first switching converter 2210 (corresponding to 2230 shown in FIG. 22B) is electrically connected to one end of the upper layer capacitor (i.e., capacitor C21), whereas, an input end of the second switching converter 2220 (corresponding to 2240 shown in FIG. 22B) is electrically connected to the end of the upper layer capacitor (i.e., capacitor C21). Besides, an output end of the first switching converter 2210 and an output end of the second switching converter 2220 are both electrically connected to the second power.

During a first period (e.g., corresponding to a period wherein the control signal GA is in enable state while the control signal GB is in disable state) within the cycle period, the upper layer switches (i.e., switches Q21 and Q28) and the switches (e.g., Q11~Q20) of the first switching converter 2210 control the upper layer capacitor (i.e., capacitor C21) to be electrically connected in series to the first switching converter 2210, so that at least one current path is formed between the first power and the second power, and the upper layer switches (i.e., switches Q21 and Q28) and the switches (e.g., Q1~Q10) of the second switching converter 2220 control the upper layer capacitor (i.e., capacitor C21) to be disconnected from the second switching converter 2220, and the upper layer switches (i.e., switches Q21 and Q28) and the switches (e.g., Q1~Q10) of the second switching converter 2220 control the second switching converter 2220 to form at least one current path between the second power and a ground voltage level.

On the other hand, during a second period (e.g., corresponding to a period wherein the control signal GA is in disable state while the control signal GB is in enable state) within the cycle period, the upper layer switches (i.e., switches Q21 and Q28) and the switches (e.g., Q1~Q10) of the second switching converter 2220 control the second switching converter 2220 and the upper layer capacitor (i.e., capacitor C21) to be electrically connected in series between the second power and the ground voltage level, so that at least one current path is formed between the second power and the ground voltage level, and the upper layer switches (i.e., switches Q21 and Q28) and the switches (e.g., Q11~Q20) of the first switching converter 2210 control the upper layer capacitor (i.e., capacitor C21) to be disconnected from the first switching converter 2210, and the upper layer switches (i.e., switches Q21 and Q28) and the switches (e.g., Q11~Q20) of the first switching converter 2210 control the first switching converter 2210 to form at least one current path between the second power and the ground voltage level.

The above-mentioned current path refers to a current path formed by conductive switches corresponding to the control signal GA or the control signal GB which is in enable state.

In this embodiment, as shown in FIG. 22A, a ratio of the first voltage V1 of the first power to the second voltage V2 of the second power is equal to 8. To be more specific, in a steady state, the voltage across the capacitor C21 is equal to 4*V2; the voltage across the capacitor C3 and the voltage across the capacitor C13 (both C3 and C13 correspond to the third capacitor in the aforementioned embodiment) are equal to 2*V2; the voltage across the capacitor C1, the voltage across the capacitor C11 (both C1 and C11 correspond to the first capacitor in the aforementioned embodiment), the voltage across the capacitor C2 and the voltage across the capacitor C12 (both C2 and C22 correspond to the second capacitor in the aforementioned embodiment) are equal to V2.

Please refer to FIG. 22B. The present invention can recursively expand layers of the pipeline switched capacitor converter circuit based on the fundamental topology shown in FIG. 22B, so as to achieve higher scaling factor of conversion between the first voltage and the second voltage. As shown in FIG. 22B, any pipeline switched capacitor converter circuit complying with the fundamental topology shown in FIG. 22B (e.g., corresponding to the N-layers pipeline switched capacitor converter circuit shown in FIG. 22B, wherein N is an integer greater than or equal to two) can be employed to replace the first switching converter 2230 and the second switching converter 2240, so that the pipeline switched capacitor converter circuit having even more layers. That is, under such situation, the pipeline switched capacitor converter circuit 2200B will become a pipeline switched capacitor converter circuit having (N+1) layers.

As an example, assumed that the first switching converter 2230 and the second switching converter 2240 shown in FIG. 22B are each replaced by a pipeline switched capacitor converter circuit 2200A shown in FIG. 22A, then the pipeline switched capacitor converter circuit 2200B shown in FIG. 22B will become a pipeline switched capacitor converter circuit having a conversion ratio of 16:1. Repeating such replacement recursively, the conversion ratio can be increased even more (e.g., by replacing each of the first switching converter 2230 and the second switching converter 2240 shown in FIG. 22B by a pipeline switched capacitor converter circuit having a conversion ratio of 16:1, the conversion ration becomes 32:1, and so on).

In this embodiment (i.e., a pipeline switched capacitor converter circuit having a ratio of 16:1), the first switching converter 2210 and the second switching converter 2220 shown in FIG. 22A are regarded as a bottom layer (which is the first layer) of the pipeline switched capacitor converter circuit, which has a configuration corresponding to, for example, the switching converter 310 of the embodiment shown in FIG. 3; the pipeline switched capacitor converter circuit 2200A shown in FIG. 22A can be regarded as a 2-layers pipeline switched capacitor converter circuit; if the first switching converter 2230 and the second switching converter 2240 shown in FIG. 22B are replaced by a 2-layers pipeline switched capacitor converter circuit 2200A shown in FIG. 22A, then the pipeline switched capacitor converter circuit 2200B shown in FIG. 22B will become a 3-layers pipeline switched capacitor converter circuit.

Figure 23:
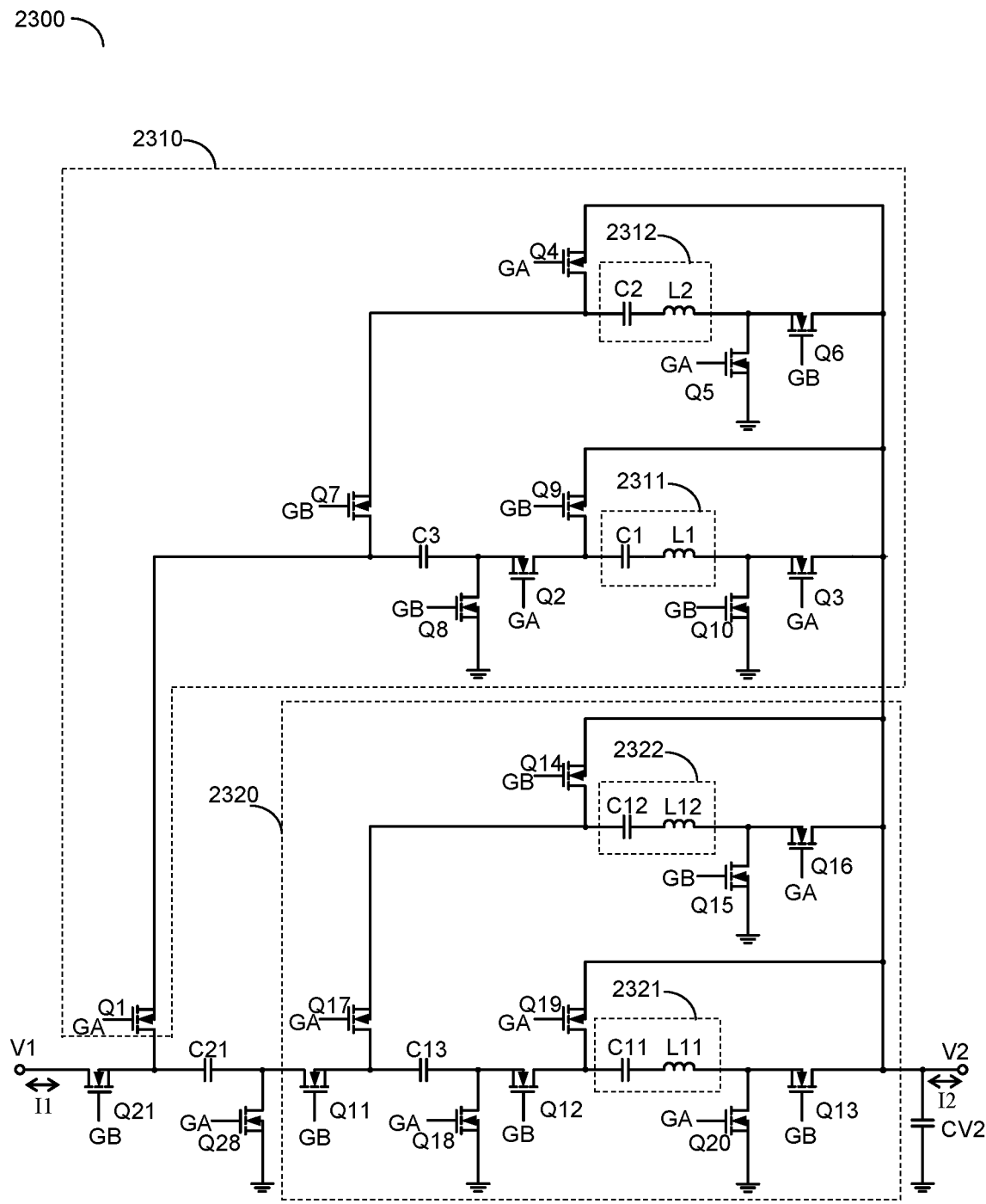
FIGS. 23-25 show schematic diagrams of a resonant switched capacitor converter circuit according to several embodiments of the present invention.
Figure 24:
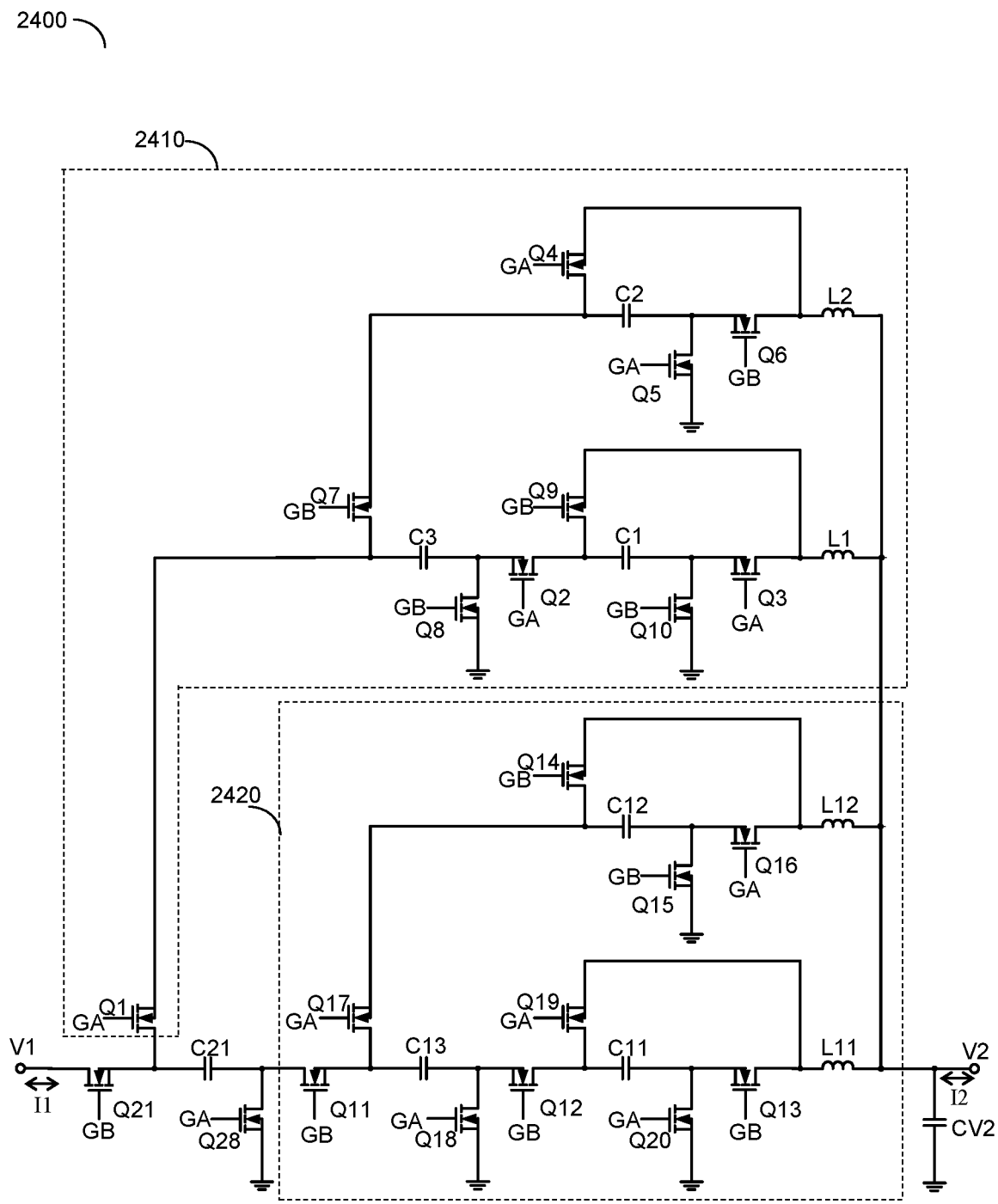
Figure 25:
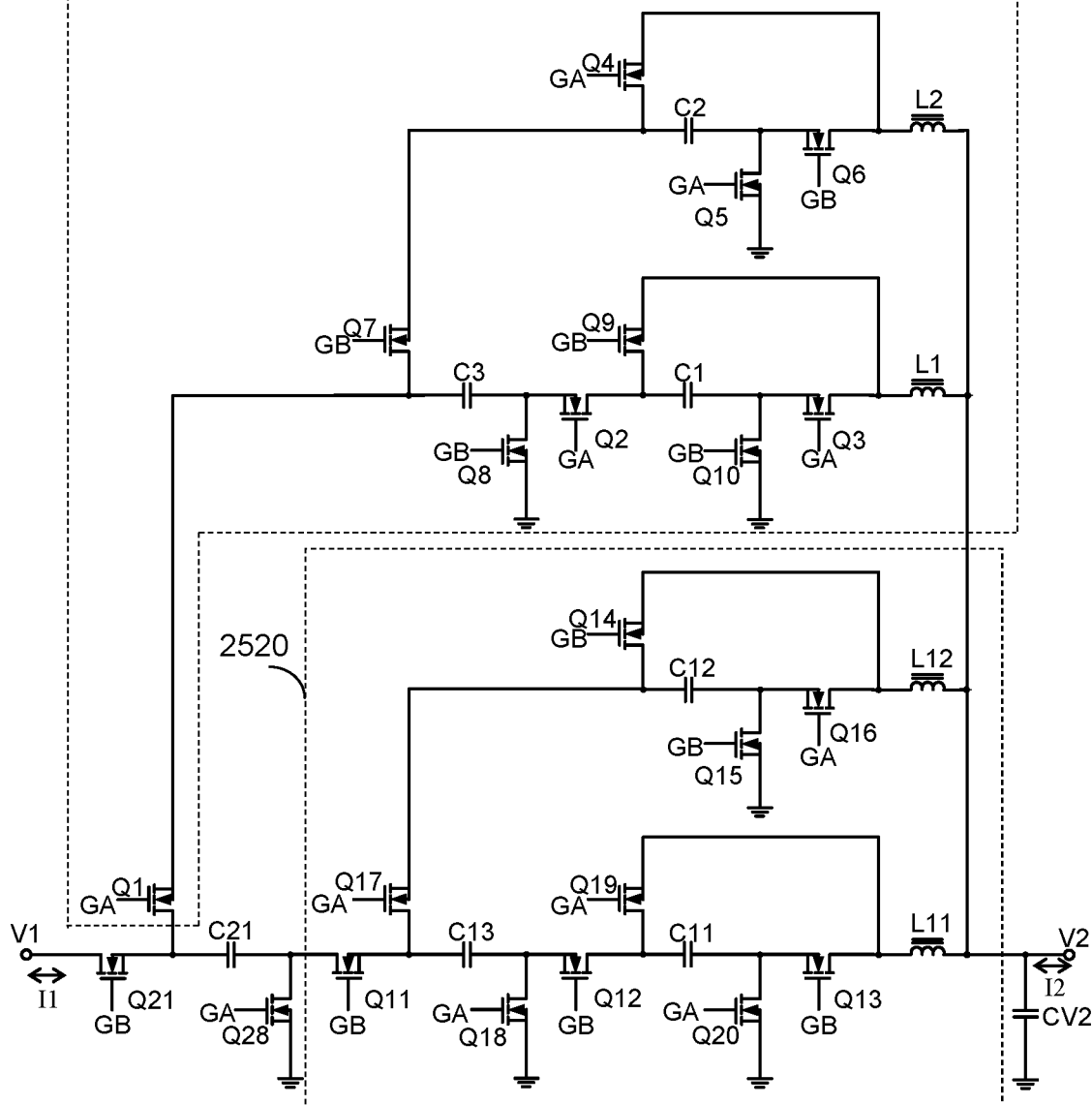

Please refer to FIGS. 23-25, which show schematic diagrams of a resonant switched capacitor converter circuit according to several embodiments of the present invention.

Please refer to FIG. 23. The switched capacitor converter circuit 2300 of FIG. 23 is similar to the switched capacitor converter circuit 2200A of the embodiment shown in FIG. 22A. Each of the first switching converter 2310 and the second switching converter 2320 further includes resonant tanks (as the resonant tank shown in FIG. 5). That is, the first switching converter 2310 further includes resonant tanks 2311 and 2312, while, the second switching converter 2320 further includes resonant tanks 2321 and 2322. The switched capacitor converter circuit 2300 operates in a way similar to the switched capacitor converter circuit 2200A. The switched capacitor converter circuit 2300 executes power conversion between the first power and the second power in resonant fashion via resonant tanks 2311, 2312, 2321 and 2322. In this embodiment, a ratio of the first voltage V1 of the first power to the second voltage V2 of the second power is also equal to 8.

Please refer to FIG. 24. The switched capacitor converter circuit 2400 of FIG. 24 is similar to the switched capacitor converter circuit 2200A of the embodiment shown in FIG. 22A. Each of the first switching converter 2410 and the second switching converter 2420 further includes inductors (as the inductor shown in FIG. 7). That is, the first switching converter 2410 further includes inductors L1 and L2, while, the second switching converter 2420 further includes inductors L11 and L12. The switched capacitor converter circuit 2400 operates in a way similar to the switched capacitor converter circuit 2200A. The switched capacitor converter circuit 2400 executes power conversion between the first power and the second power in resonant fashion (as the resonant fashion shown in FIG. 7) via the inductors L1, L2, L11 and L12 and the capacitors corresponding to the inductors L1, L2, L11 and L12. In this embodiment, a ratio of the first voltage V1 of the first power to the second voltage V2 of the second power is also equal to 8.

Please refer to FIG. 25. The switched capacitor converter circuit 2500 of FIG. 25 is similar to the switched capacitor converter circuit 2400 of the embodiment shown in FIG. 24. An inductor L1, an inductor L2, an inductor L11 and an inductor L12 of the switched capacitor converter circuit 2500 have coupled inductance among one another. As a consequence, there is better current balance among the inductor current IL1, the inductor current IL2, the inductor current IL11 and the inductor current IL12 of the switched capacitor converter circuit 2500, and there is better voltage balance among the capacitor C1, the capacitor C2, the capacitor C11 and the capacitor C12 of the switched capacitor converter circuit 2500. In one embodiment, depending upon practical consideration, the switched capacitor converter circuit 2500 can arrange all of the inductor L1, the inductor L2, the inductor L11 and the inductor L12 to have coupled inductance among one another or just a part of the above-mentioned four inductors to have coupled inductance among one another. In one embodiment, the inductor L1, the inductor L2, the inductor L11 and the inductor L12 can be configured as at least one transformer.

Figure 26A:
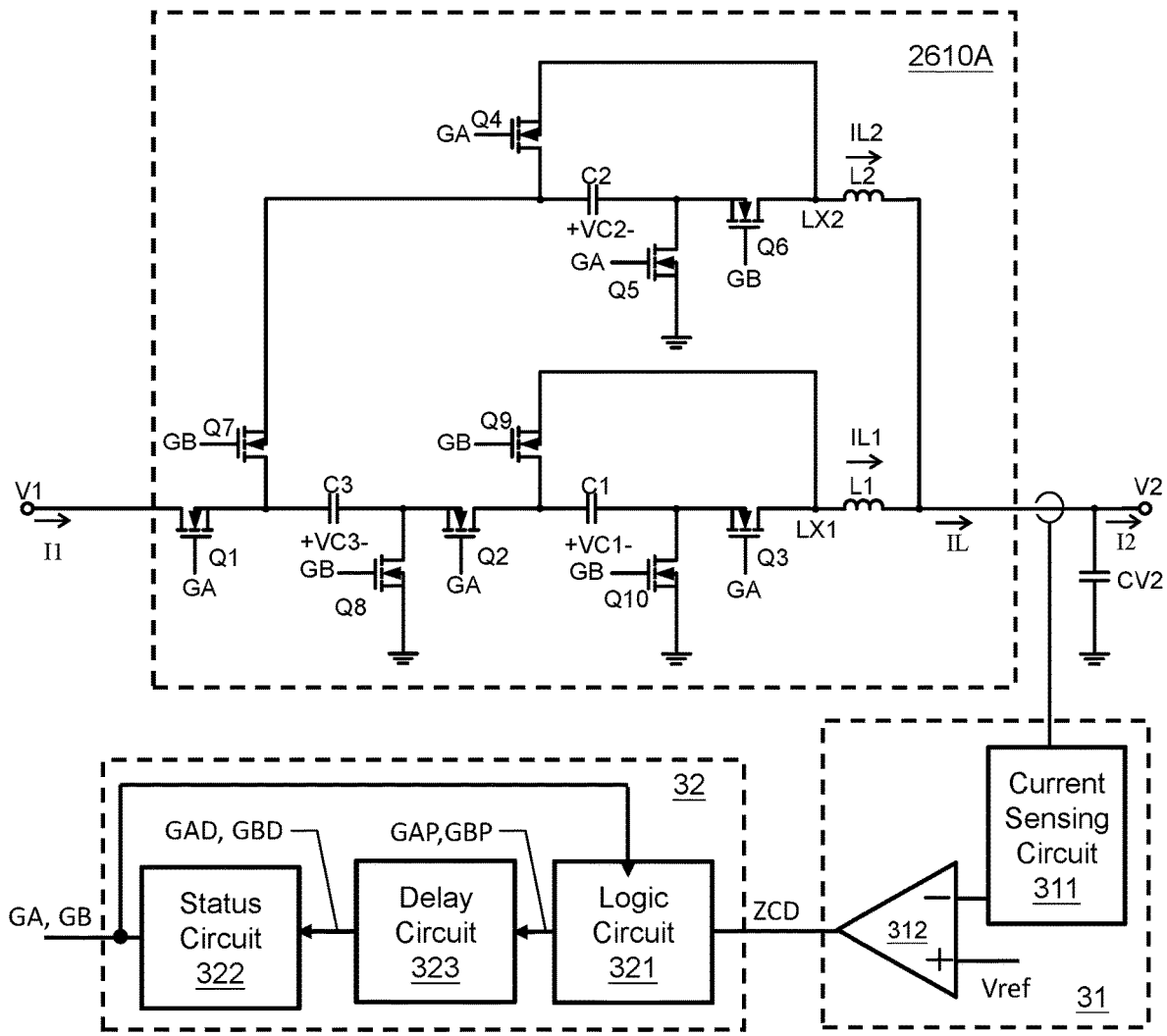
FIG. 26A and FIG. 26B show two embodiments of zero current detection circuit in a resonant switched capacitor converter circuit according to the present invention.
Figure 26B:
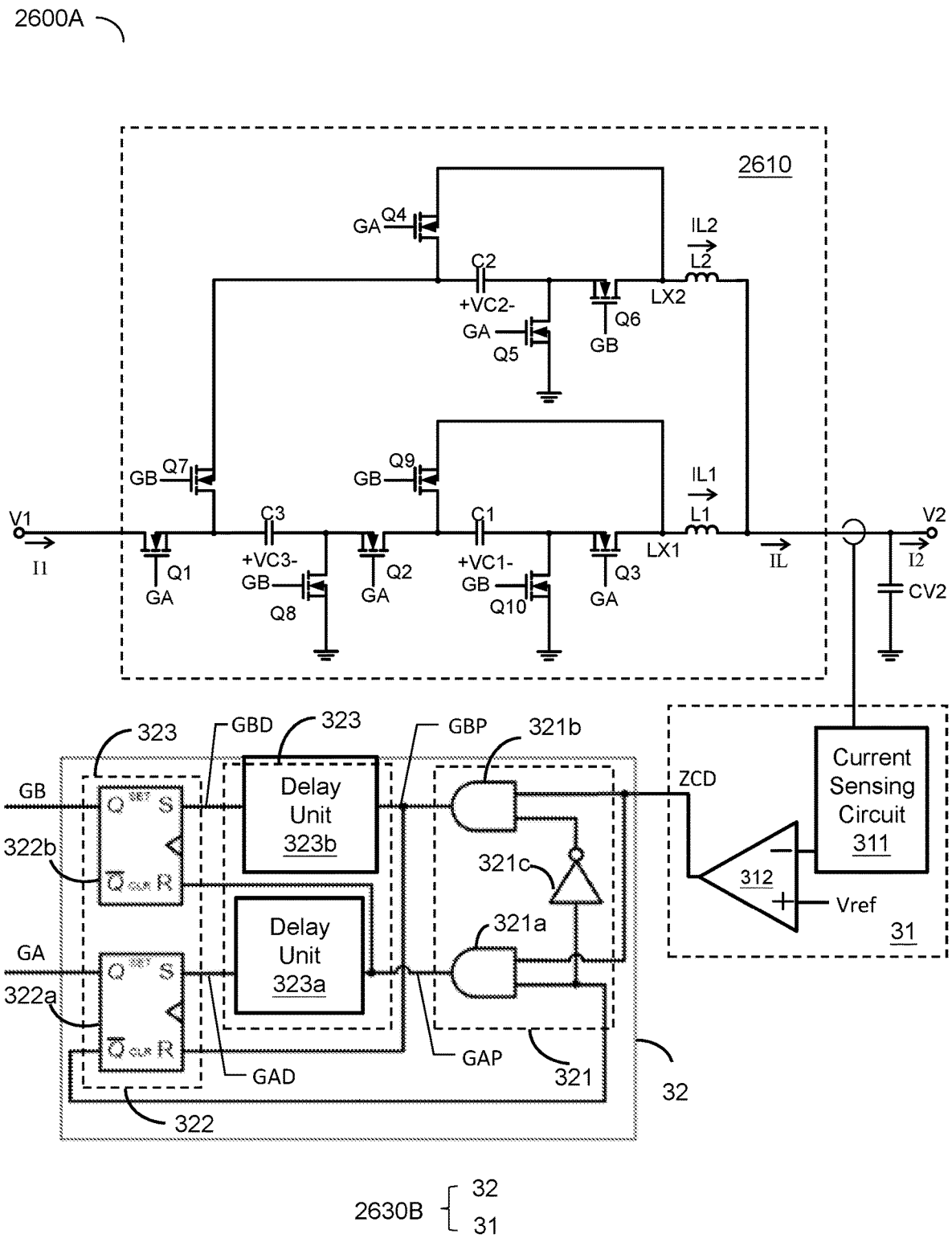
Figure 27A:
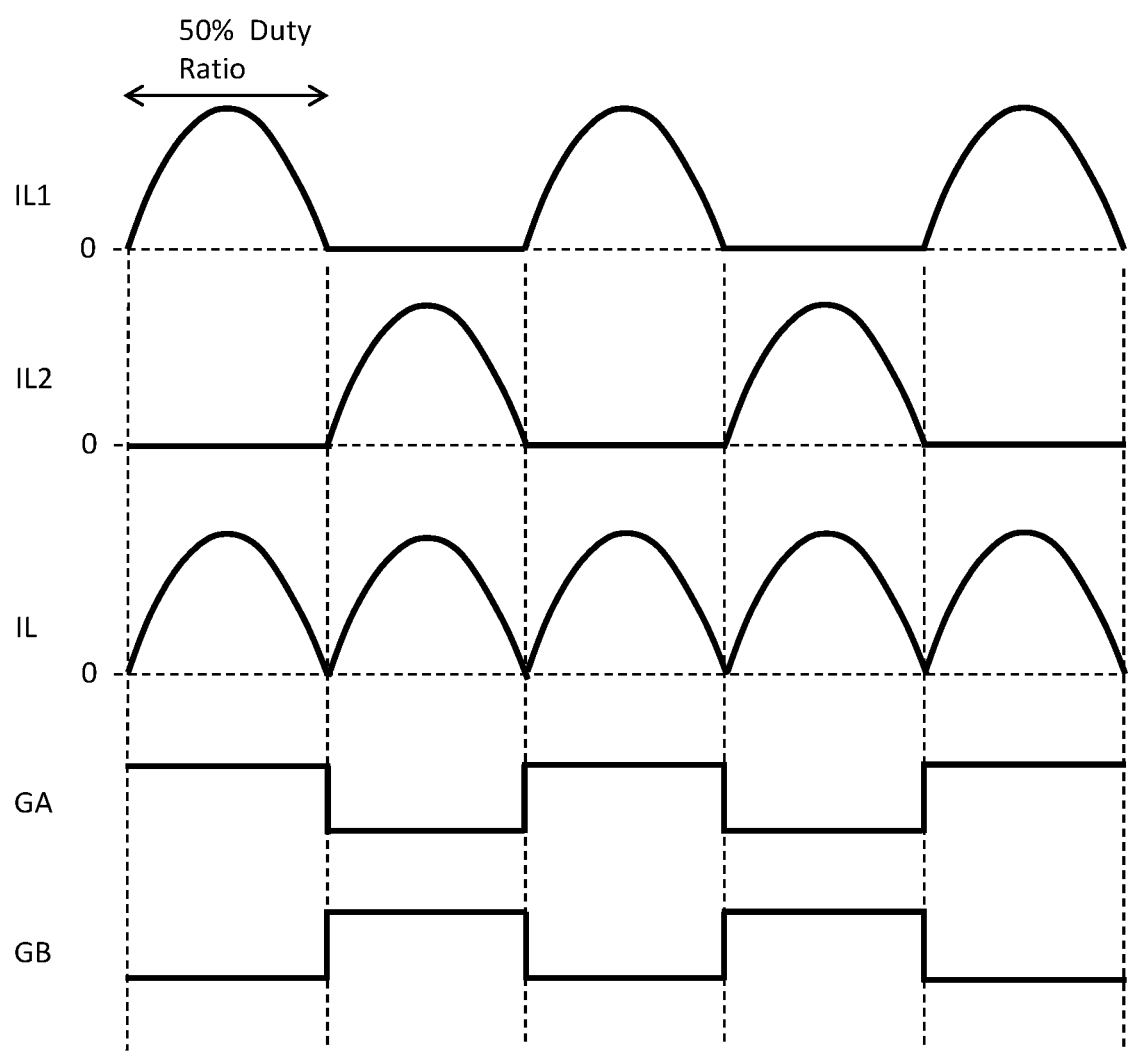
FIGS. 27A-27C illustrate signal waveforms depicting the operation of several embodiments of a resonant switched capacitor converter circuit according to the present invention.
Figure 27B:
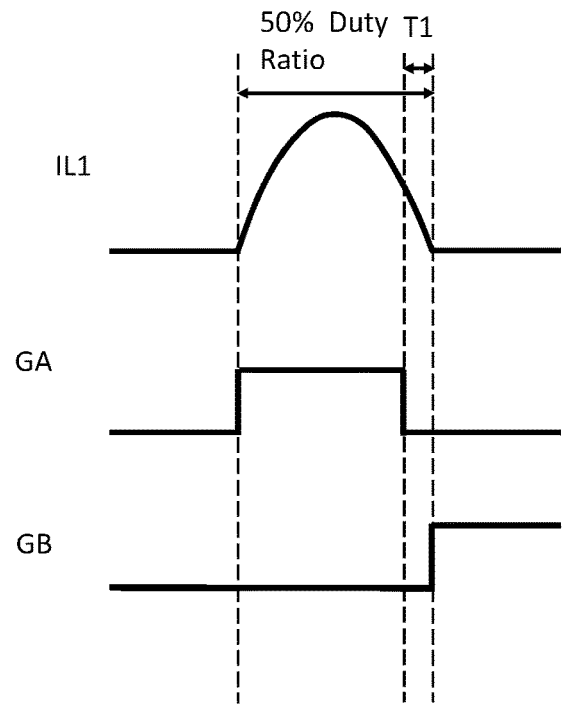
Figure 27C:
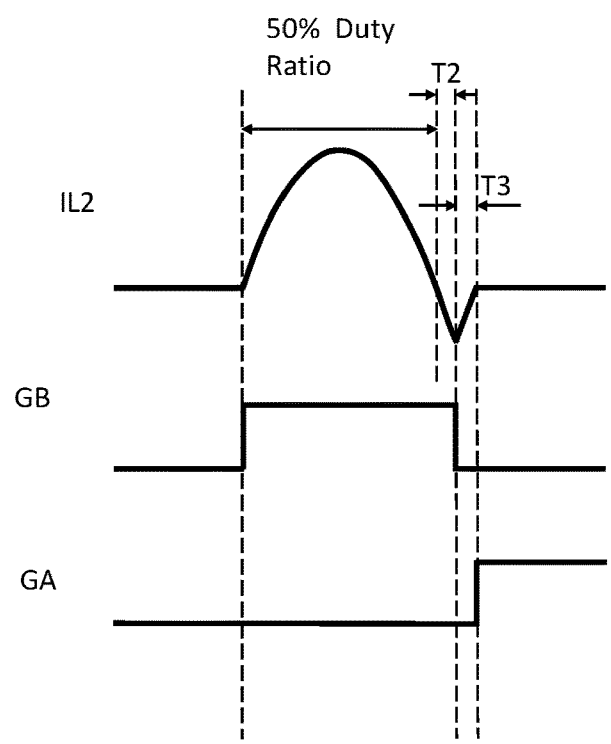

Please refer to FIGS. 26A-26B and FIGS. 27A-27C. FIGS. 26A-26B show two embodiments of a zero current detection circuit in a resonant switched capacitor converter circuit according to the present invention. FIGS. 27A-27C show operation waveforms corresponding to the embodiments shown in FIGS. 26A-26B.

Please refer to FIG. 26A. The switched capacitor converter circuit 2600A shown in FIG. 26A includes: a switching converter 2610 and a control circuit 2630. The configuration of the switching converter 2610 shown in FIG. 26A is the same as the configuration of the switching converter 710 shown in FIG. 7. The control circuit 2630 is configured to operably generate control signals (e.g., control signal GA and control signal GB) for controlling switches (e.g., Q1~Q10). The control circuit 2630 includes: a zero current detection circuit 31 and a determination circuit 32. The zero current detection circuit 31 is configured to operably generate a zero current detection signal ZCD according to an inductor current IL1 flowing through an inductor L1 and an inductor current IL2 flowing through an inductor L2. In this embodiment, the zero current detection circuit 31 is configured to operably detect an inductor current IL, which is a sum of the inductor current IL1 plus the inductor current IL2. In one embodiment, when the zero current detection signal ZCD indicates that the inductor current IL is zero, the switches Q1~Q10 are switched to their respective opposite states, to execute power conversion between the first power and the second power. Taking FIG. 27A as an example, when the inductor current IL is zero (in this embodiment, this indicates that one of the inductor current IL1 and the inductor current IL2 decreases to zero while the other is at zero), the control signal GA and the control signal GB are switched to their respective opposite levels, so that the switches Q1~Q10 are correspondingly switched to their respective opposite states. In one embodiment, in a case where a resonant frequency of the inductor current IL1 is equal to a resonant frequency of the inductor current IL2, as shown in FIG. 26A, a period ranging between any two adjacent zero current time point of the inductor current IL corresponds to 50% of a cycle period.

Please still refer to FIG. 26A. In one embodiment, the zero current detection circuit 31 includes: a current sensing circuit 311 and a comparator 312. The current sensing circuit 311 is configured to operably sense the inductor current IL. The comparator 312 is configured to operably compare a current related signal obtained by the current sensing circuit 311 with a reference signal Vref, so as to generate the zero current detection signal ZCD for indicating a time point at which the inductor current IL reaches zero.

Please still refer to FIG. 26A. In one embodiment, the determination circuit 32 includes: a logic circuit 321 and a state circuit 322. When the zero current detection signal ZCD indicates that the inductor current IL is zero, the logic circuit 321 is configured to operably generate a control pulse GAP and a control pulse GBP according to the zero current detection signal ZCD and present states of the control signal GA and the control signal GB. The control pulse GAP and the control pulse GBP are configured to operably trigger the state circuit 322, so as to generate the control signal GA and the control signal GB.

In one embodiment, the determination circuit 32 further includes: a delay circuit 323, which is configured to operably delay the control pulse GAP and the control pulse GBP, so as to generate a delayed control pulse GAD and a delayed control pulse GBD. the control signal GA and the control signal GB are accordingly delayed, so as to postpone a time point at which the switches Q1~Q10 are switched to their respective opposite states.

Please refer to FIG. 26A along with FIG. 27B. The embodiment shown in FIG. 27B can adjust the above-mentioned reference signal Vref, so that for example, a time point at which the control signal GA is switched to low level (which indicates a state of "OFF") is moved ahead to an earlier time point. For example, as shown in FIG. 27B, a time point at which the control signal GA is switched to low level is ahead of a time point at which an inductor current IL1 reaches zero by a period T1. During this period T1, the inductor current IL1 is for example a positive current, so that for example the switch Q10 can achieve zero voltage switching.

Please refer to FIG. 26A along with FIG. 27C. In one embodiment, the above-mentioned delay period can cause for example the inductor current IL2 to continue flowing during the above-mentioned delay period, so that for example the switch Q1 can achieve zero voltage switching. To elaborate in more detail, in this embodiment, as shown in FIG. 27C, the inductor current IL2 continues flowing for a delay period T2 after it has reached zero; during this delay period T2, the inductor current IL2 becomes a negative current. The control signal GB is switched to low level (which indicates a state of "OFF") at an end of the delay period T2. Next, after a delay period T3, the control signal GA is switched to high level (which indicates a state of "ON"), so that for example the switch Q1 can achieve zero voltage switching.

Please refer to FIG. 26B. FIG. 26B shows a specific embodiment of FIG. 26A. In this embodiment, the logic circuit 321 includes: an AND gate 321a and an AND gate 321b. The AND gate 321a is configured to operably generate a control pulse GAP according to the zero current detection signal ZCD and an opposite phase signal of the control signal GA. The AND gate 321b is configured to operably generate a control pulse GBP according to the zero current detection signal ZCD and an in-phase signal of the control signal GA. The delay circuit 323 includes: a delay unit 323a and a delay unit 323b, which are configured to operably delay the control pulse GAP and the control pulse GBP, respectively, so as to generate a delayed control pulse GAD and a delayed control pulse GBD, respectively. The state circuit 322 includes: a flip-flop 322a and a flip-flop 322b, which are configured to operably trigger generating the control signal GA and the control signal GB according to the delayed control pulse GAD and the delayed control pulse GBD, respectively.

It is worthwhile noting that, the above-mentioned operation mechanism wherein switching time points of the switches are determined according to a time point at which the inductor current reaches zero is not limited to being applied in the switching converter 2610 shown in FIG. 26A and FIG. 26B. In other embodiments, the above-mentioned operation mechanism can also be applied to for example the embodiments shown in FIG. 6, FIG. 13, FIG. 15A, FIG. 15B and FIG. 19. In the implementation wherein an inductor L is shared (e.g., the embodiment shown in FIG. 6), the zero current detection circuit 31 can be configured to operably sense an inductor current IL of the inductor L, so as to achieve the above-mentioned zero current detection and the control operations following the zero current detection.

Figure 28A:
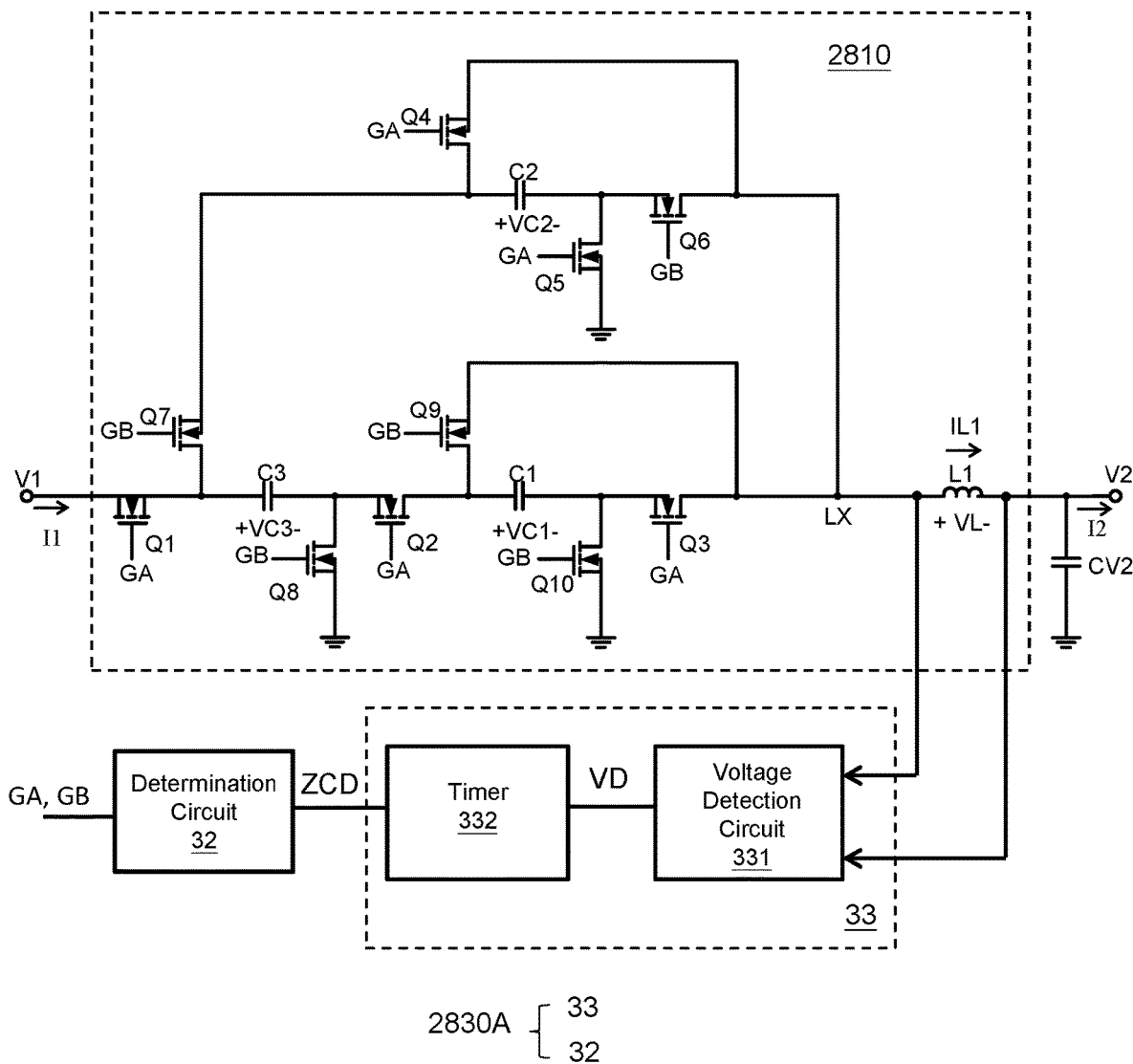
FIG. 28A and FIG. 28B show two embodiments of zero current detection circuit in a resonant switched capacitor converter circuit according to the present invention.
Figure 28B:
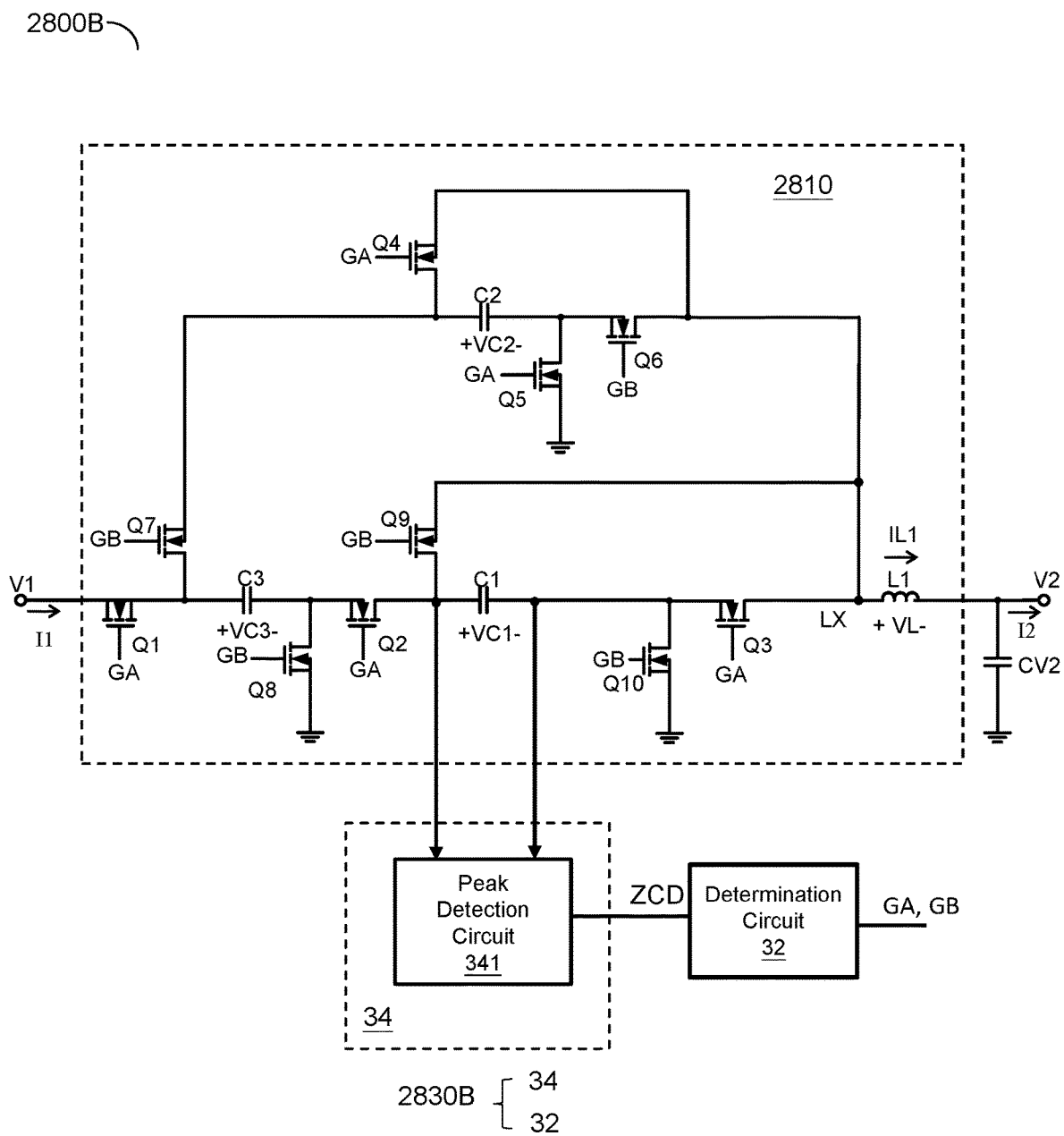

Please refer to FIGS. 28A-28B, which show two embodiments of a zero current estimation circuit in a resonant switched capacitor converter circuit (i.e., switched capacitor converter circuit 2800A and switched capacitor converter circuit 2800B) according to the present invention. These two embodiments shown in FIG. 28A and FIG. 28B also control the switches according to the zero current detection signal ZCD.

Please refer to FIG. 28A. The control circuit 2830A shown in FIG. 28A is configured to operably generate a zero current detection signal ZCD in a different way. The switching converter 2810 of FIG. 28A corresponds to the switching converter 610 of the embodiment shown in FIG. 6. In this embodiment, the an inductor L1 is located in a current path shared by the capacitor C1 and the capacitor C2, or to describe it from another perspective, the inductor L1 is shared by the capacitor C1 and the capacitor C2.

The control circuit 2830A includes: a zero current estimation circuit 33, which is coupled to the inductor L1 and which is configured to operably estimate a time point at which the inductor current IL1 is zero according to a voltage difference VL across two ends of the inductor L1 and a voltage difference across two ends of the first capacitor (i.e., capacitor C1), so as to generate the zero current detection signal ZCD. The determination circuit 32 is configured to operably generate the control signal GA and the control signal GB according to the zero current detection signal ZCD, so as to control operations of the switches (e.g., Q1~Q10). In regard to operation details of the above-mentioned switches Q1~Q10, please refer to the embodiment shown in FIG. 26A.

Figure 29:
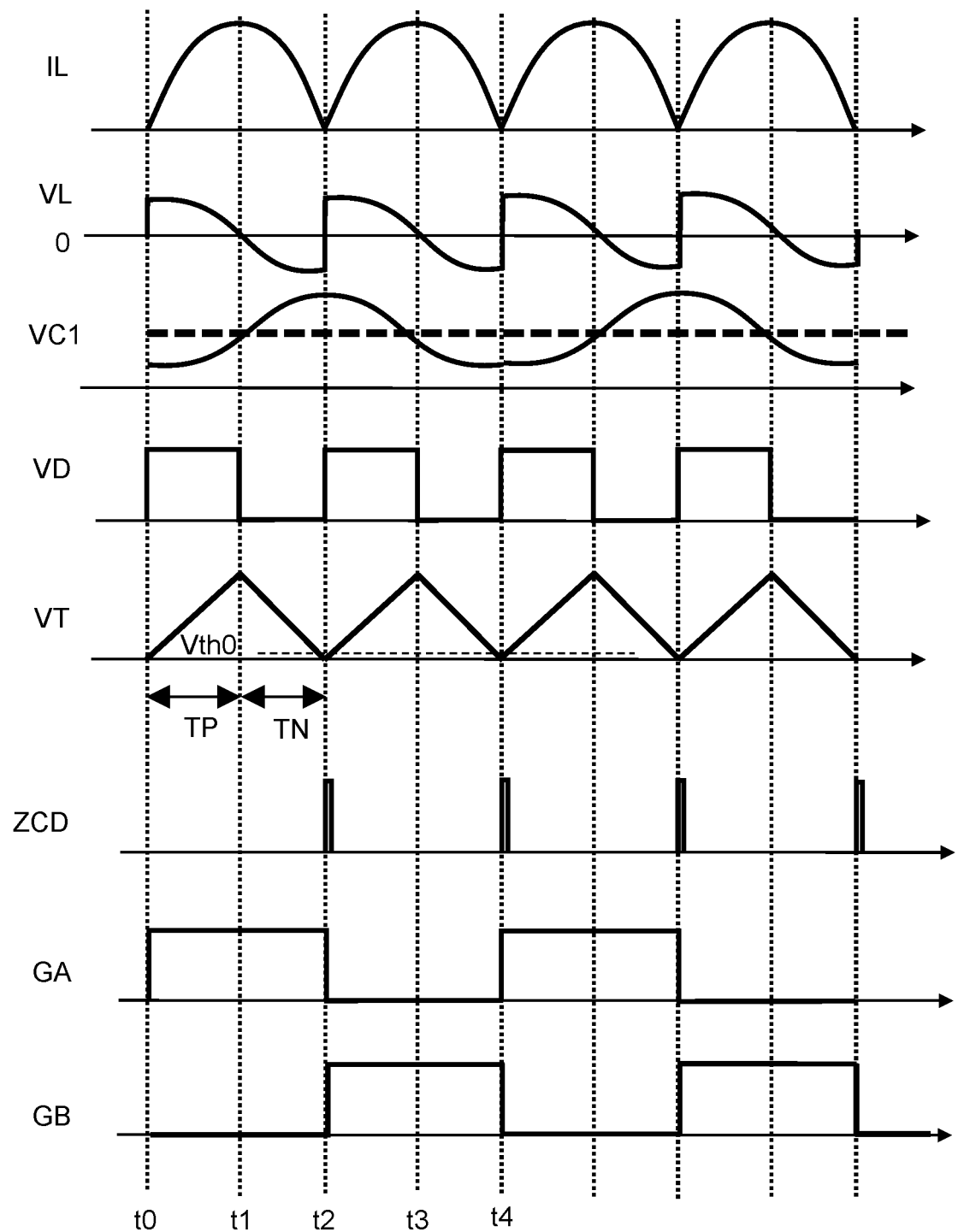
FIG. 29 illustrates signal waveforms depicting the operation of several embodiments of a resonant switched capacitor converter circuit according to the present invention.

Please refer to FIG. 28A along with FIG. 29. In one embodiment, the zero current estimation circuit 33 includes: a voltage detection circuit 331 and a timer 332. The voltage detection circuit 331 is configured to operably generate a voltage detection signal VD according to a voltage difference VL across the two ends of the inductor L1, wherein the voltage detection signal VD is indicative of a positive voltage period TP wherein the voltage difference VL across the two ends of the inductor L1 is above zero voltage. The timer 332 is coupled to an output end of the voltage detection circuit 331 and is configured to operably estimate a negative voltage period TN wherein the voltage difference VL across the two ends of the inductor L1 is not above zero voltage according to the voltage detection signal VD, so as to generate the zero current detection signal ZCD which is indicative of a time point at which an inductor current IL1 is zero.

It is worthwhile noting that, the above-mentioned operation mechanism wherein the voltage detection signal VD is generated according to the voltage difference VL across the two ends of the inductor L1 is not limited to being applied in the switching converter 2810 shown in FIG. 26A. In other embodiments, the above-mentioned operation mechanism can also be applied to for example the embodiments shown in FIG. 7. In the implementation wherein each capacitor cooperate with a corresponding inductor (e.g., inductor L1 and inductor L2 in the embodiment shown in FIG. 7), the voltage detection circuit 331 is configured to operably sense an inductor current IL1 flowing through the inductor L1 and an inductor current IL2 flowing through the inductor L2, so as to estimate a time point at which the inductor current IL1 reaches zero and a time point at which the inductor current IL2 reaches zero, respectively, and the following control operations are executed accordingly.

Please refer to FIG. 28B. The control circuit 2830B shown in FIG. 28B is configured to operably generate a zero current detection signal ZCD in a different way. The switching converter 2810 of FIG. 28B corresponds to the switching converter 610 of the embodiment shown in FIG. 6.

In this embodiment, the control circuit 2830B includes: a zero current estimation circuit 33, which is coupled to the first capacitor (i.e., capacitor C1) (or the zero current estimation circuit 33 can be coupled to the second capacitor (i.e., capacitor C2)) and which is configured to operably estimate a time point at which the inductor current IL1 is zero according to a voltage difference VC1 (or VC2) across two ends of the capacitor C1 (or the capacitor C2), so as to generate the zero current detection signal ZCD. The determination circuit 32 is configured to operably generate the control signal GA and the control signal GB according to the zero current detection signal ZCD, so as to control operations of the switches (e.g., Q1~Q10). In regard to operation details of the above-mentioned switches Q1~Q10, please refer to the embodiment shown in FIG. 26A.

Please refer to FIG. 28B along with FIG. 29. In this embodiment, the zero current estimation circuit 34 includes a peak detection circuit 341. The peak detection circuit 341 is configured to operably generate a voltage detection signal VD according to a voltage difference VC1 across the two ends of the capacitor C1, wherein the generated voltage detection signal VD is indicative of a peak time point (e.g., as shown by the time point t2 in FIG. 4) of a peak of the voltage difference VC1 across the two ends of the capacitor C1 and a valley time point (e.g., as shown by the time point t4 in FIG. 4) of a valley of the voltage difference VC1 across the two ends of the capacitor C1. And, the peak detection circuit 341 is configured to operably generate the zero current detection signal ZCD according to the voltage detection signal VD. The peak time point (e.g., as shown by the time point t2 in FIG. 4) and the valley time point (e.g., as shown by the time point t4 in FIG. 4) correspond to time points at which the inductor current IL1 is zero. There are various approaches to detect a peak and a valley of a voltage, which are well known to those skilled in the art, so the details thereof are not redundantly explained here.

Figure 30:
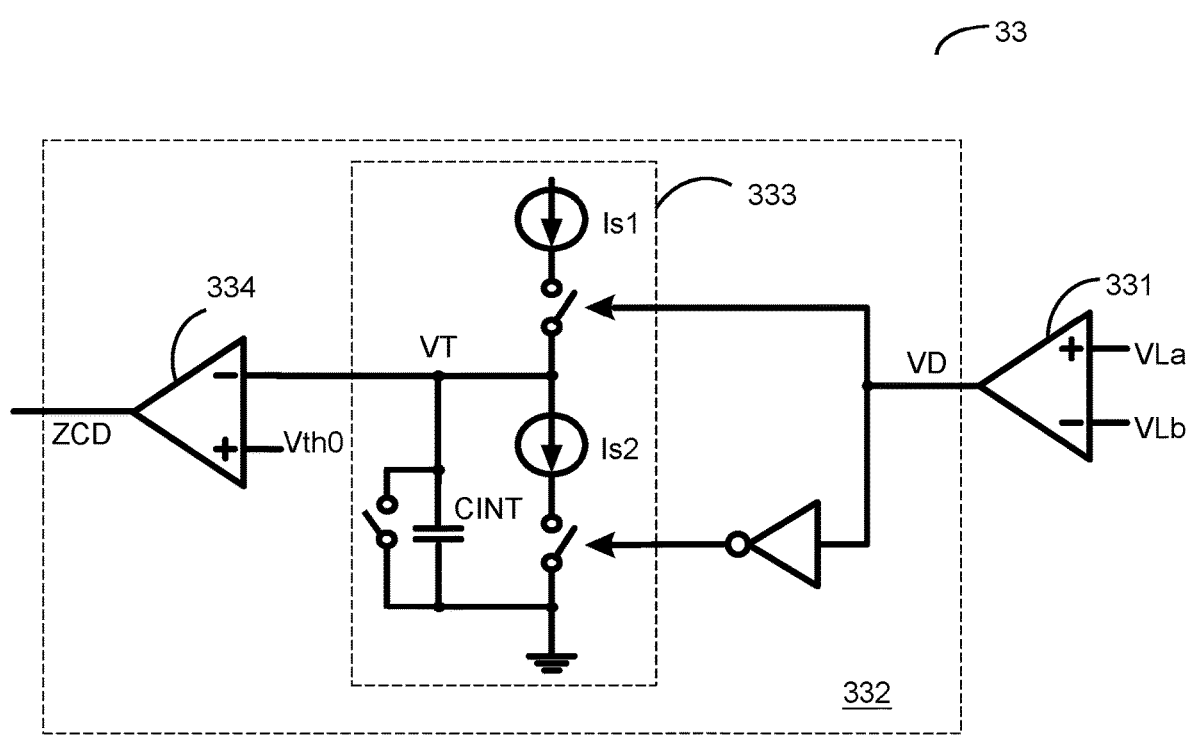
FIG. 30 shows an embodiment of zero current detection circuit in a resonant switched capacitor converter circuit according to the present invention.

Please refer to FIG. 30, which shows an embodiment of a zero current detection circuit in a resonant switched capacitor converter circuit corresponding to the embodiment of FIG. 28A. The zero current estimation circuit of this embodiment includes: a comparison circuit (corresponding to the above-mentioned voltage detection circuit 331), a ramp circuit 333 and a comparison circuit 334. The ramp circuit 333 and the comparison circuit 334 correspond to the above-mentioned timer 332.

The comparison circuit 331 is configured to operably compare a voltage VLa at one end of the inductor L1 with a voltage VLb at another end of the inductor L1, so as to generate the voltage detection signal VD, wherein the voltage detection signal VD is indicative of a period T1 wherein the voltage difference across the two ends of the inductor L1 is above zero voltage.

The ramp circuit 333 is configured to operably generate a first ramp of a ramp signal VT (e.g., as shown by the rising ramp in FIG. 29) according to the voltage detection signal VD during the period T1, and to operably generate a second ramp of the ramp signal VT (e.g., as shown by the falling ramp in FIG. 29) following an end of the first ramp (i.e., an upper of the ramp signal VT) after the period T1 ends. In this embodiment, the slope of the first ramp and the slope of the second ramp have the same absolute value but opposite signs. In one embodiment, the above-mentioned operation can be conducted through adopting a current source Is1 and a current source Is2 to charge/discharge an integration capacitor (i.e., capacitor CINT) with the same level of currents.

The comparison circuit 334 is configured to operably indicate the time point at which the inductor current IL1 is zero when the ramp signal VT (in particular the second ramp) reaches a zero current threshold Vth0, so as to generate the zero current detection signal ZCD. Note that in other embodiments, the slope of the first ramp and the slope of the second ramp can have different absolute values; under such situation, the zero current threshold Vth0 can be correspondingly adjusted.

Figure 31:
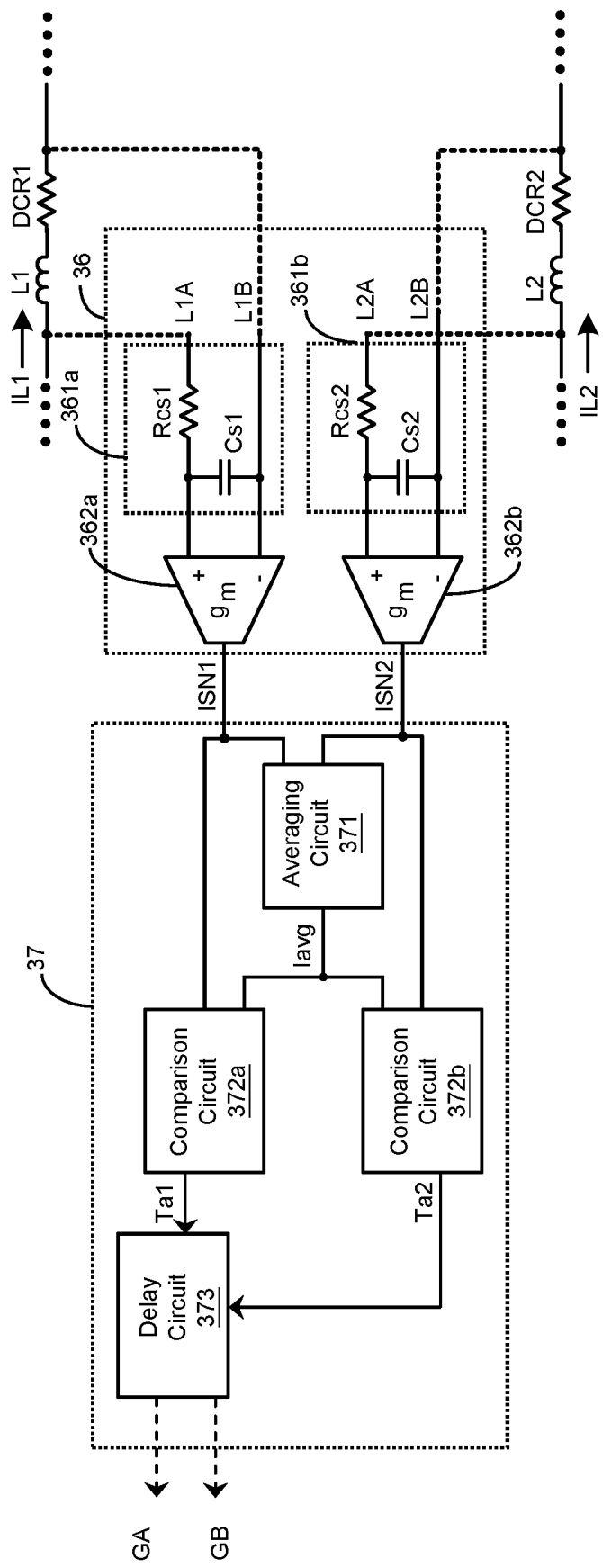
FIG. 31 shows a schematic diagram of an embodiment wherein the control circuit executes current balance control.

FIG. 31 shows a schematic diagram depicting that a control circuit 3130 of the switched capacitor converter circuit according to the present invention provides a function of control balance current. The switched capacitor converter circuit of this embodiment includes plural inductors, which corresponds to for example an embodiment shown in FIG. 5, FIG. 7, FIG. 13, FIG. 15B, FIG. 16, FIGS. 18-20 or FIGS. 23-25. As shown in FIG. 31, the control circuit 3130 is coupled to plural inductors (e.g., inductors L1 and L2) and is configured to operably sense plural inductor currents (e.g., inductor currents IL1 and IL2) of the plural inductors (e.g., inductors L1 and L2). And, the control circuit 3130 is configured to operably adjust control parameters related to the inductor currents IL1 and IL2 according to a difference between an average of the inductor currents and at least one of the inductor currents (i.e., the inductor current IL1 or IL2), so that inductor currents IL1 and IL2 are regulated to have a constant ratio with each other. In one embodiment, The inductor currents IL1 and IL2 are regulated to be equal to each other, to achieve current balance.

Figure 32:
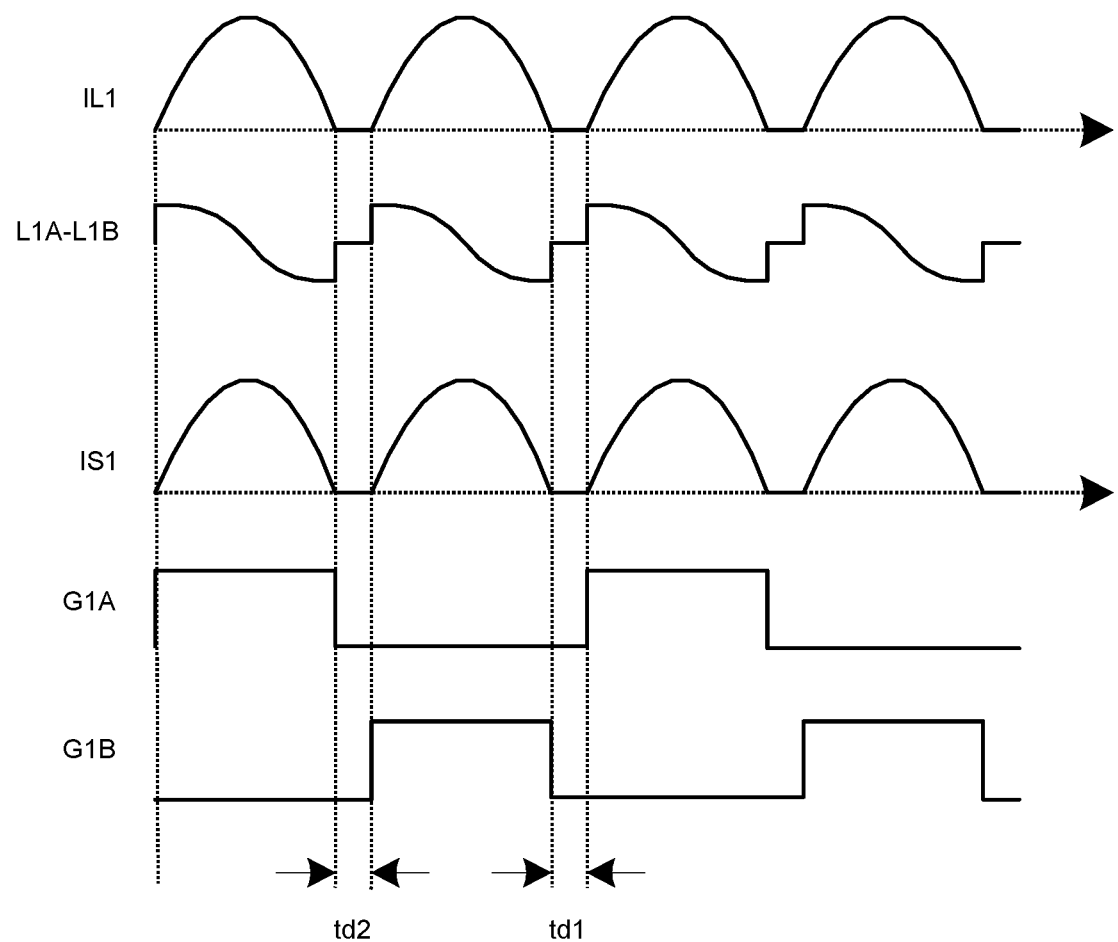
FIG. 32 illustrates signal waveforms depicting current balance operation in a resonant switched capacitor converter circuit according to the present invention.

Please refer to FIG. 31 along with FIG. 32. FIG. 32 illustrates signal waveforms depicting a current balance operation in a resonant switched capacitor converter circuit according to the present invention. In one embodiment, the control circuit 3130 is configured to operably adjust delay periods within a cycle period, such as td1 and/or td2 of at least part of the switches, to thereby adjust at least one of the inductor currents IL1 and IL2, so that the inductor currents IL1 and IL2 can achieve current balance. For example, when the inductor current IL1 is greater than the average current, by adjusting the delay periods td1 and/or td2 of the switches related to the inductor current IL1, the inductor current IL1 can be reduced to achieve current balance between the inductor currents IL1 and IL2. In other embodiments, it is also practicable and within the scope of the present invention that the inductor current IL1 and the inductor current IL2 can be adjusted in corresponding different direction, respectively; that is, if the inductor current IL1 is greater than the average current (which means that the inductor current IL2 is smaller than the average current), the inductor current IL1 can be adjusted lower while the inductor current IL2 can be adjusted higher.

Please refer to FIG. 31. In this embodiment, the control circuit 3130 includes: a current sensing circuit 36 and a current adjustment 37. The current sensing circuit 36 is configured to operably generate a current sensing signal ISN1 and a current sensing signal ISN2 according to the inductor current IL1 and the inductor current IL2, respectively. The current adjustment 37 includes: an averager circuit 371, a comparison circuit 372a and a comparison circuit 372b, and a delay circuit 373. The averager circuit 371 is configured to operably generate an average current signal Iavg according to the current sensing signal ISN1 and the current sensing signal ISN2. The comparison circuit 372a is configured to operably generate an adjustment signal Ta1 according to a difference between the current sensing signal ISN1 and the average current signal Iavg, and the comparison circuit 372b is configured to operably generate an adjustment signal Ta2 according to a difference between the current sensing signal ISN2 and the average current signal Iavg. The adjustment signal Ta1 and the adjustment signal Ta2 are configured to operably adjust the control signal GA and/or the control signal GB.

To elaborate in more detail, in one embodiment, the present invention can adjust the delay periods of one or both of the control signal GA and the control signal GB by at least one of the adjustment signal Ta1 and the adjustment signal Ta2 (which are received by the delay circuit 373 to adjust the delay period td1 and/or the delay period td2 accordingly), whereby one or both of the inductor current IL1 and the inductor current IL2 are adjusted to achieve the above-mentioned current balance.

Please still refer to FIG. 31. The current sensing circuit 36 includes: a voltage sensing circuit 361a, a voltage sensing circuit 361b, a conversion circuit 362a and a conversion circuit 362b. The voltage sensing circuit 361a is configured to operably sense a voltage difference (i.e., L1A-L1B) across a first inductor (i.e, inductor L1), so as to generate a first voltage sensing signal. The voltage sensing circuit 361b is configured to operably sense a voltage difference (i.e., L2A-L2B) across a second inductor (i.e, inductor L2), so as to generate a second voltage sensing signal. In one embodiment, the voltage sensing circuit 361a includes a filter consisting of a resistor Rcs1 and a capacitor Cs1, whereas, the voltage sensing circuit 361b includes a filter consisting of a resistor Rcs2 and a capacitor Cs2. The voltage sensing circuit 361a is coupled between two ends of the inductor L1 and is configured to operably retrieve a voltage across the inductor L1 and a parasitic resistor DCR1, whereas, the voltage sensing circuit 361b is coupled between two ends of the inductor L2 and is configured to operably retrieve a voltage across the inductor L2 and a parasitic resistor DCR2. Under such configuration, a voltage across the capacitor Cs1 is positively and linearly correlated with a voltage across the parasitic resistor DCR1, whereas, a voltage across the capacitor Cs2 is positively and linearly correlated with a voltage across the parasitic resistor DCR2.

The conversion circuit 362a is configured to operably generate a first current sensing signal (i.e., current sensing signal ISN1) according to the first voltage sensing signal, whereas, the conversion circuit 362b is configured to operably generate a second current sensing signal (i.e., current sensing signal ISN2) according to the second voltage sensing signal. In one embodiment, each of the conversion circuit 362a and the conversion circuit 362b can be for example a transconductance amplifier.

It is worthwhile noting that, the above-mentioned current sensing circuit 36 is implemented as a type of current sense configuration by means of sensing through the parasitic resistor DCR (i.e., parasitic DC resistor); however, this is only an illustrative example, but not for limiting the broadest scope of the present invention. In other embodiments, it is also practicable and within the scope of the present invention that sensing currents of the first power stage circuit and the second power stage circuit can be implemented by other current sensing approaches. For example, a current sensing resistor can be electrically connected in series to a current path, for sensing current. For another example, a current can be sensed through sensing a voltage across a switch. As long as the required current information can be obtained, the desired current balance can be achieved through the above-mentioned operation (e.g., by averaging and comparison).

Figure 33:
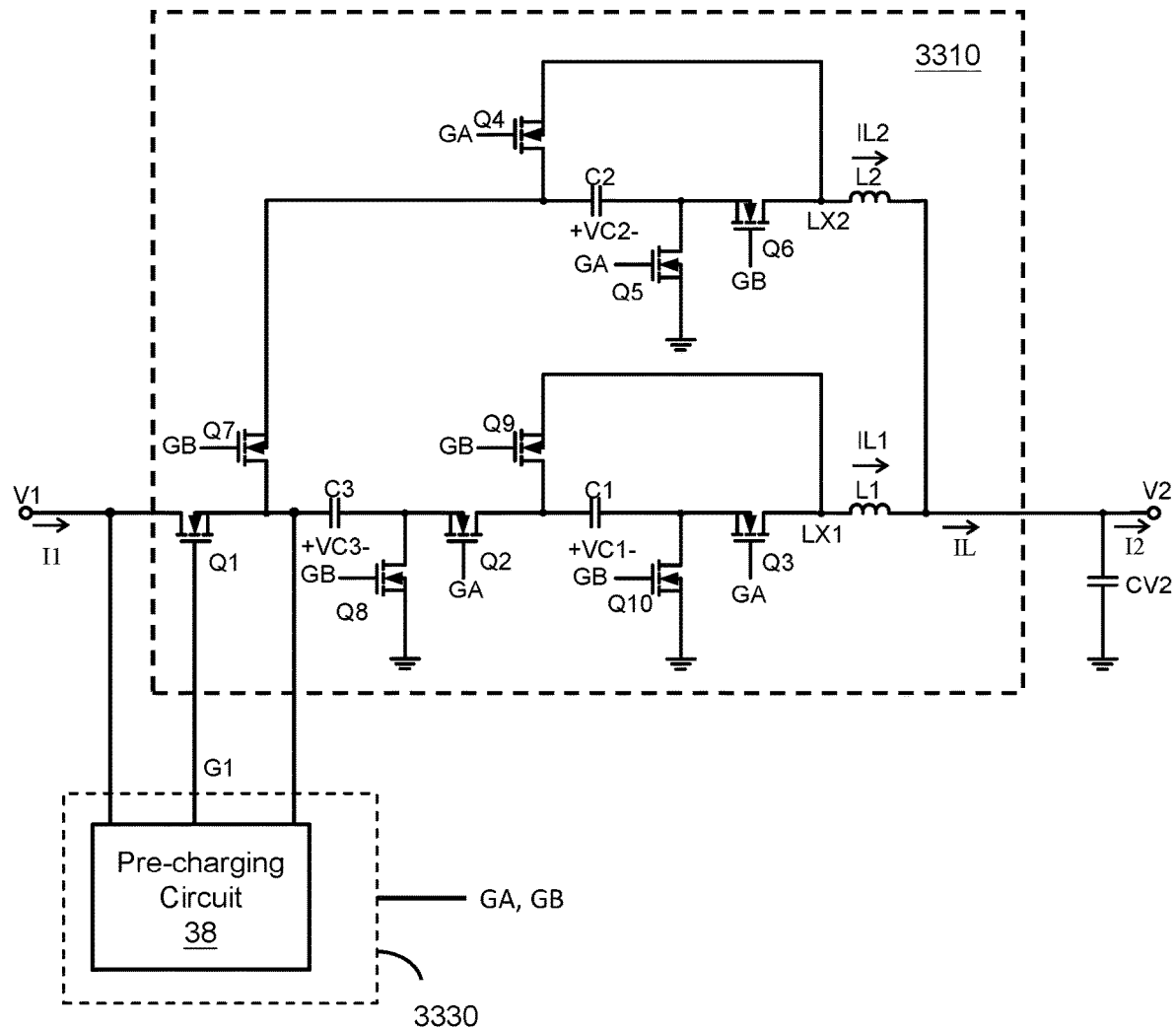
FIG. 33 and FIG. 34 show schematic diagrams depicting two embodiments of a pre-charging circuit in a resonant switched capacitor converter circuit according to the present invention.
Figure 34:
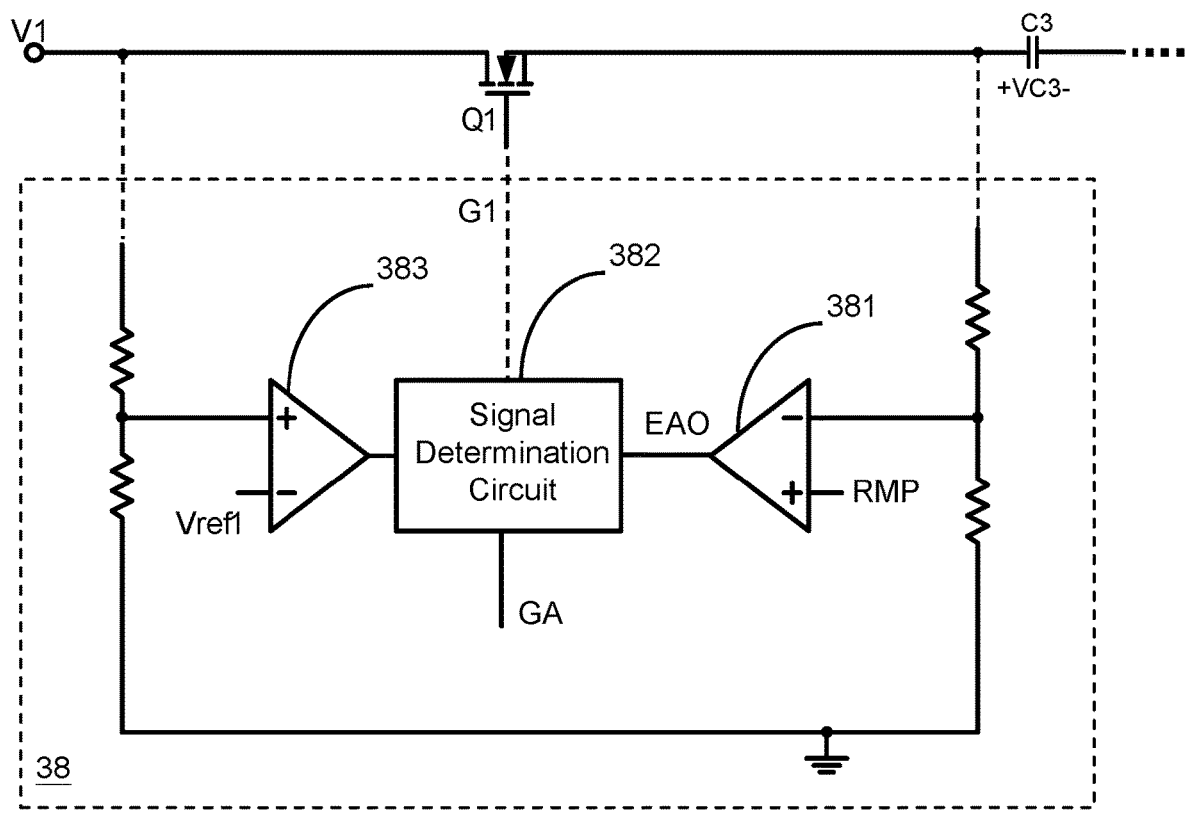

Please refer to FIG. 33 and FIG. 34, which show schematic diagrams depicting two embodiments of a pre-charging circuit in a resonant switched capacitor converter circuit according to the present invention.

In one embodiment, in the switched capacitor converter circuit of the present invention, one of the capacitors further functions as a distribution capacitor, whereas, one of the switches further functions as a pre-charging transistor. The pre-charging transistor is electrically connected between an input power and the distribution capacitor. The input power corresponds to one of the first power and the second power.

In the embodiment of FIG. 33, the switched capacitor converter circuit 3300 includes: a switching converter 3310 and a control circuit 3330. In this embodiment, the input power corresponds to for example the first power. The distribution capacitor corresponds to for example the capacitor C3. The pre-charging transistor corresponds to for example the switch Q1. The control circuit 3330 includes a pre-charging circuit 38. In a pre-charging mode, the pre-charging circuit 38 is configured to operably generate the control signal G1 for controlling the conduction level of the pre-charging transistor Q1 by feedback linear control. The pre-charging circuit 38 is also configured to operably control the rest of the switches Q2~Q10, so as to control electrical connection relationships among the capacitors C1~C3, so that when the voltage drop across the distribution capacitor C3 is lower than a voltage threshold, the voltage across at least one of the capacitors C1~C3 is pre-charged to a predetermined voltage, whereby the surge current can be effectively suppressed when power supply starts up.

In different embodiments, for example, it can be implemented as such to charge the voltage across the capacitor C1 to a predetermined voltage, or, it can be implemented as such to charge the voltages across the capacitors C1~C3 each to a corresponding predetermined voltage. In one embodiment, the predetermined voltage corresponds to a DC voltage of a capacitor when the capacitor is in a steady state. In one embodiment, the predetermined voltage is correlated to a target voltage of an output voltage. In this embodiment, the predetermined voltage corresponds to the second voltage V2 or a multiple of the second voltage V2.

Please refer to FIG. 34, which show a specific embodiment of a pre-charging circuit. The pre-charging circuit 38 includes: an amplifier circuit 381 and a signal determination circuit 382. In one embodiment, the amplifier circuit 381 is configured to operably generate an amplification control signal EAO according to a difference between a ramp signal RMP and a voltage at one end of a distribution capacitor (i.e., capacitor C3). The signal determination circuit 382 is configured to operably control a pre-charging transistor (i.e., switch Q1) according to the amplification control signal EAO, so as to charge the voltage at one end of the distribution capacitor (i.e., capacitor C3) to the predetermined voltage according to a rising speed of the ramp signal RMP.

In one embodiment, the pre-charging circuit 38 further includes: an amplifier circuit 383, which is configured to operably sense an input voltage (corresponding to a first voltage V1) and which is configured to operably trigger the above-mentioned pre-charging mode when determining that the input voltage is higher than a threshold voltage. The amplifier circuit 381 and the signal determination circuit 382 are also configured to operably determine whether or not to trigger the above-mentioned pre-charging mode according to whether or not the voltage across the distribution capacitor (i.e., capacitor C3) is higher than a threshold voltage.

It is worthwhile noting that, in one embodiment, after the pre-charging mode, the control signal G1 generated by the signal determination circuit 382 still remains synchronous with the control signal GA, to control the switch Q1 for power conversion between the first power and the second power.

Figure 35:
FIG. 35 and FIG. 36 illustrate signal waveforms depicting the operation of two embodiments wherein the resonant switched capacitor converter circuit executes pre-charging function.
Figure 36:
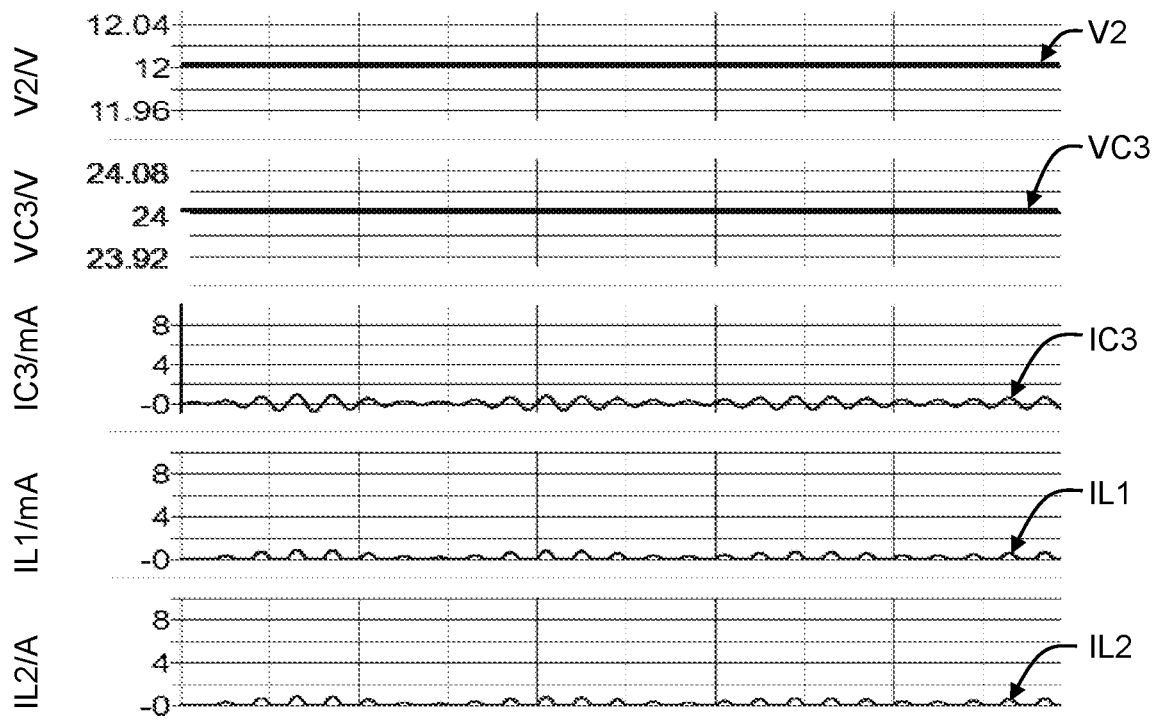

Please refer to FIGS. 35-36, which illustrate signal waveforms depicting the operations of two embodiments of a pre-charging circuit according to the present invention.

Please refer to FIG. 35. In a pre-charging mode, the switch Q1 is able to control a level of a predetermined current (as shown by a first current I1 in FIG. 35) to pre-charge the capacitor C3 and other capacitors, so that the voltage VC3 of the capacitor C3 and the second voltage V2 are each pre-charged to a corresponding predetermined voltage according to a predetermined rising slope.

Please refer to FIG. 36. FIG. 36 shows that: after the pre-charging mode, because the capacitors have been pre-charged to corresponding predetermined voltages, when the switches begin to periodically switch for power conversion, surge currents of the inductors and the capacitors are effectively reduced.

Figure 37:
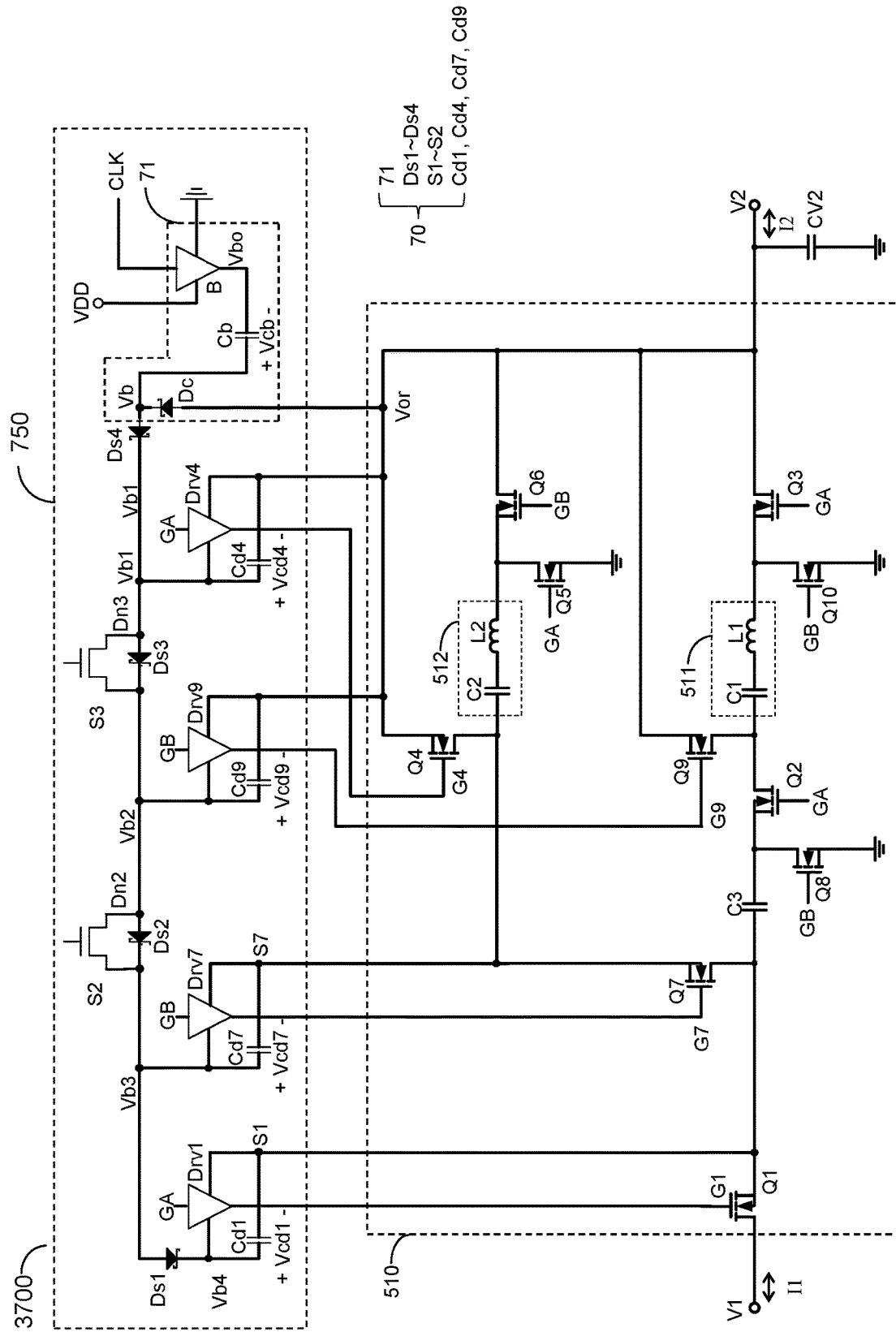
FIG. 37 and FIG. 38 show two embodiments of a driver circuit in a resonant switched capacitor converter circuit according to the present invention.
Figure 38:
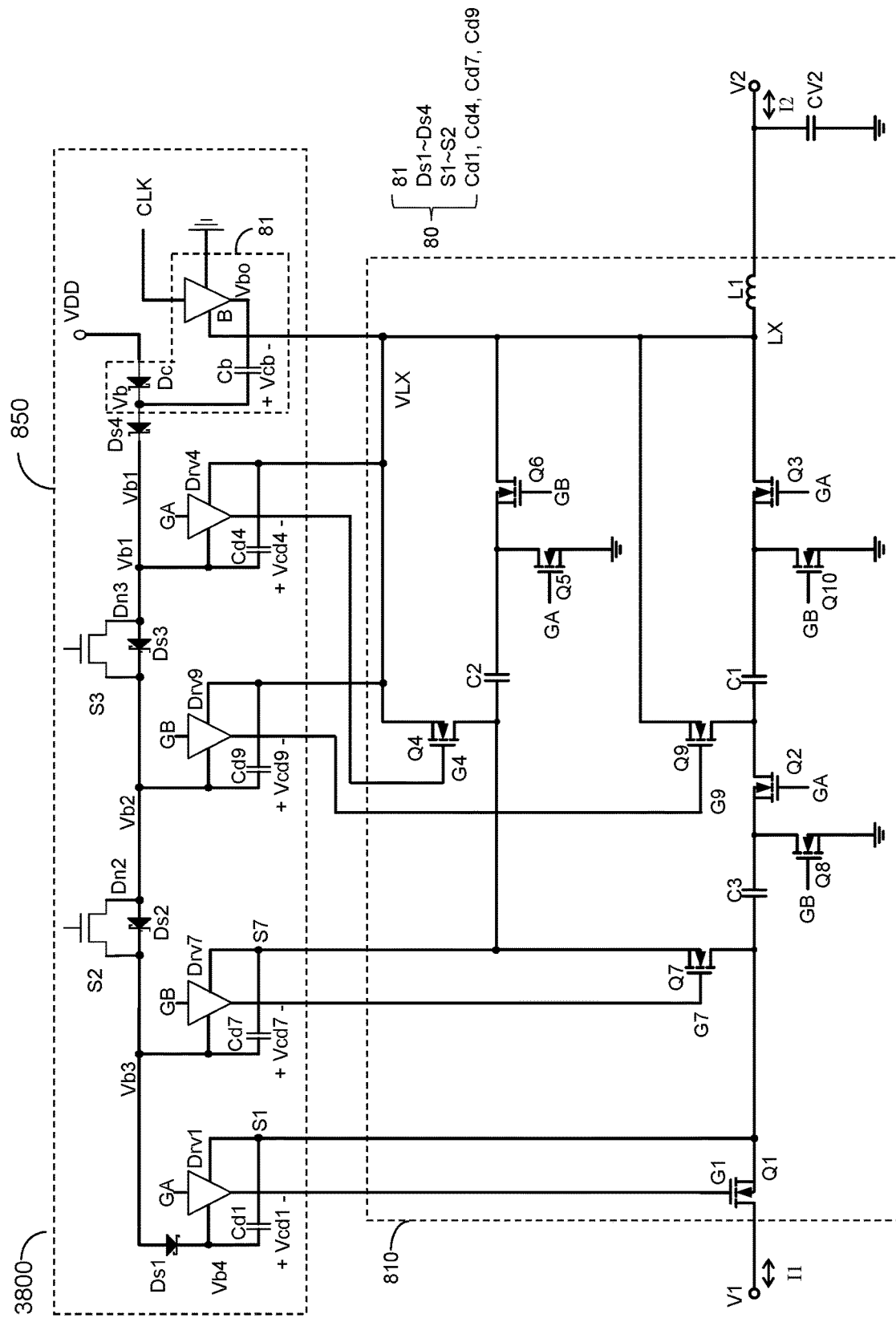

Please refer to FIGS. 37-38, which show two embodiments of a driver circuit in a resonant switched capacitor converter circuit according to the present invention.

Please refer to FIG. 37. In this embodiment, the switched capacitor converter circuit 3700 comprises: a switching converter (corresponding to the switching converter 510 of the embodiment shown in FIG. 5) and a driver circuit 750. The driver circuit 750 is configured to operably drive at least a part of the switches (e.g., Q1, Q4, Q7 and Q9). The driver circuit 750 includes: drivers Drv1, Drv4, Drv7 and Drv9 and a power supply circuit 70.

The drivers Drv1, Drv4, Drv7 and Drv9 are configured to operably generate driving signals G1, G4, G7 and G9 according to the control signal GA or the control signal GB. The driving signals G1, G4, G7 and G9 are configured to operably and periodically drive the switches Q1, Q4, Q7 and Q9, so as to execute power conversion between the first power and the second power in resonant fashion. It is worthwhile noting that, in one embodiment, the rest of the switches (i.e., those switches which can be driven in the absence of an offset voltage) are also driven according to the control signal GA or the control signal GB; the details of the operation of these switches are not the main point of this embodiment so the explain thereof is omitted.

The power supply circuit 70 is configured to operably provide driving powers Vcd1, Vcd4, Vcd7 and Vcd9 to the drivers Drv1, Drv4, Drv7 and Drv9. The power supply circuit 70 includes: a voltage booster circuit 71, driving capacitors (i.e., capacitors Cd1, Cd4, Cd7 and Cd9) and supply diodes Ds1~Ds4.

The voltage booster circuit 71 is configured to operably generate a boost power Vb according to a clock signal, a DC voltage VDD and an output related signal which is related to the output voltage (in this embodiment, the output voltage corresponds to the second voltage V2). The voltage of the boost power Vb is correlated to a sum of the input voltage (in this embodiment, the input voltage corresponds to a first voltage V1) plus the output related signal. The voltages across the driving capacitors (i.e., capacitor Cd1, Cd4, Cd7 and Cd9) correspond to the driving powers Vcd1, Vcd4, Vcd7 and Vcd9, respectively. Plural supply diodes Ds1~Ds4 are coupled in series, along their forward direction, in an order of Ds4, Ds3, Ds2 and Ds1, from the boost power Vb. The backward end of each supply diode Ds1~Ds4 is coupled to a positive end of a corresponding driving power Vcd1, Vcd7, Vcd9 and Vcd4, so as to charge a corresponding driving capacitor (i.e., capacitors Cd1, Cd7, Cd9 and Cd4), thus generating a corresponding driving power Vcd1, Vcd7, Vcd9 and Vcd4. Besides, the supply diodes Ds1~Ds4 are configured to operably block a backward current and a backward voltage.

Please still refer to FIG. 37. The voltage booster circuit 71, corresponding driving capacitors (i.e., capacitors Cd9 and Cd4) and corresponding supply diodes Ds3~Ds4 constitute a charge pump. When the boost power Vb is generated by the voltage booster circuit 71, the corresponding supply diodes Ds3~Ds4 charge the corresponding driving capacitors (i.e., capacitors Cd9 and Cd4) according to the boost power Vb, so as to generate corresponding driving powers Vcd9 and Vcd4. The negative ends of the driving power Vcd9 and Vcd4 are coupled to the output voltage (i.e., the second voltage V2) which is a relatively constant voltage. Each driving power Vcd9 and Vcd4 is related to the DC voltage VDD.

Please still refer to FIG. 37. In this embodiment, the voltage booster circuit 71, corresponding driving capacitors (i.e., capacitors Cd1 and Cd7), corresponding supply diodes Ds1~Ds2 and corresponding switches Q1 and Q7 constitute a bootstrap circuit. When the boost power Vb is generated by the voltage booster circuit 71, the corresponding supply diode Ds1~Ds2 charge the corresponding driving capacitors (i.e., capacitors Cd1 and Cd7) according to corresponding second boost power supplies Vb3 and Vb4, so as to generate corresponding driving power Vcd1 and Vcd7. The voltage at the negative end of each driving power Vcd1 and Vcd7 is varied as the switches Q1 and Q7 perform switching and the voltage at the positive end of each driving power Vcd1 and Vcd7 is also varied as the switches Q1 and Q7 perform switching (this is why it is referred to by the term "bootstrap"). In a steady state, each driving power Vcd1 and Vcd7 is correlated to the input voltage (i.e., the first voltage V1). The second boost power supplies Vb3-Vb4 are correlated to the boost power Vb.

Please still refer to FIG. 37. In one embodiment, the power supply circuit 70 further includes: a driving power switch S2 and a driving power switch S3, which are electrically connected in parallel to the supply diode Ds3 and the supply diode Ds4, respectively. In a case where the switching converter 510 is implemented as a resonant switching converter having a resonant tank, the driving power switch S2 and the driving power switch S3 can be always ON, to enhance coversion efficiency. On the other hand, in a case where the switching converter 510 is implemented as any other type of switching converter the driving power switch S2 and the driving power switch S3 can be always OFF. The details of will be explained later.

Please refer to FIG. 38. The switched capacitor converter circuit 3800 of FIG. 38 is similar to the switched capacitor converter circuit 3700 of the embodiment shown in FIG. 37. The switched capacitor converter circuit 3800 comprises: a switching converter (e.g. corresponding to the switching converter 610 of the embodiment shown in FIG. 6) and a driver circuit 850. The driver circuit 850 is configured to operably drive at least a part (e.g., Q1, Q4, Q7 and Q9) of the switches. The driver circuit 850 includes: drivers Drv1, Drv4, Drv7 and Drv9 and a power supply circuit 80. Similar to the power supply circuit 70 of the embodiment shown in FIG. 37, the power supply circuit 80 of FIG. 38 includes: a voltage booster circuit 81, driving capacitors (i.e., capacitors Cd1, Cd7, Cd9 and Cd4) and supply diodes Ds1~Ds4.

The switched capacitor converter circuit 3800 of FIG. 38 is different from the switched capacitor converter circuit 3700 of the embodiment shown in FIG. 37, in that: because the switching converter 610 in the switched capacitor converter circuit 3800 includes an inductor L which is shared by the capacitor C2 and the capacitor C3, the voltage booster circuit 81 of this embodiment is implemented as a bootstrap circuit, which is coupled to a switching node LX and is configured to operably generate a boost power Vb according to a switching node voltage VLX in a bootstrap fashion. In regard to the rest of operation details and features of the switched capacitor converter circuit 3800, please refer to the switched capacitor converter circuit 3700 of the embodiment shown in FIG. 37.

Figure 39:
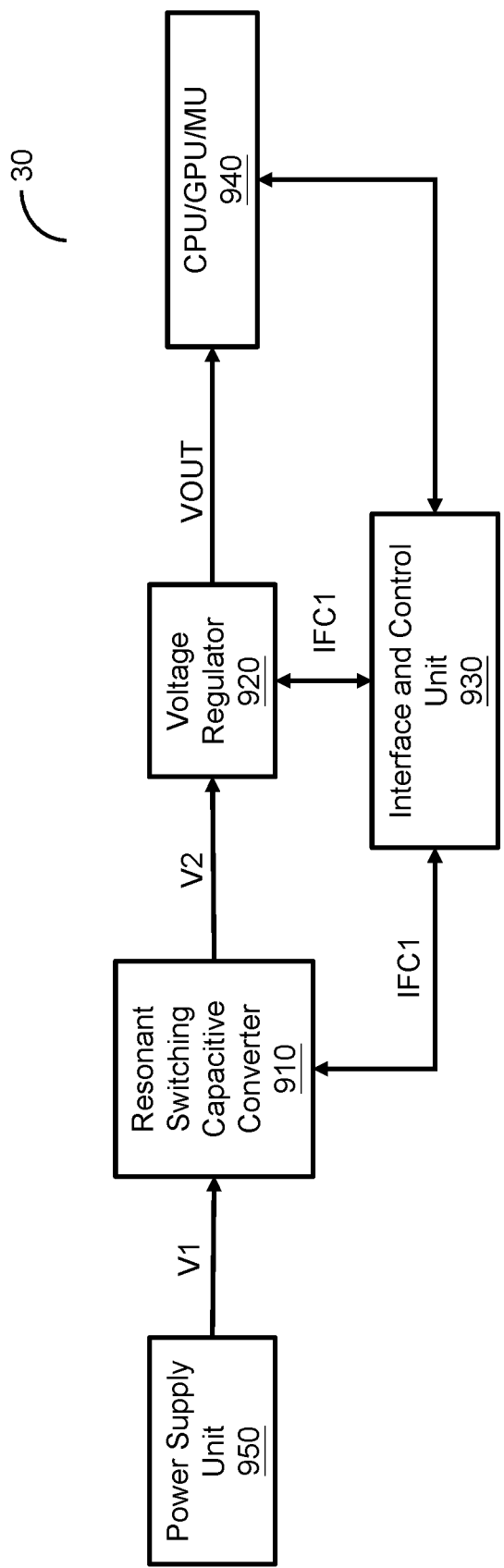
FIG. 39 shows a schematic diagram of a power conversion system configured by a resonant switched capacitor converter circuit according to an embodiment of the present invention.

FIG. 39 shows a schematic diagram of a power conversion system configured by a resonant switched capacitor converter circuit according to an embodiment of the present invention. The power conversion system 3900 comprises: a resonant switched capacitor converter circuit 910, a voltage regulator 920 and an interface and control unit 930.

The resonant switched capacitor converter circuit 910 corresponds to, for example, anyone of the aforementioned switched capacitor converter circuit including inductors. The resonant switched capacitor converter circuit 910 is configured to operably convert the first power (e.g., corresponding to a first voltage V1) to the second power (e.g., corresponding to the second voltage V2).

The voltage regulator 920 is configured to operably convert the second power to an output voltage VOUT, and regulate the output voltage VOUT to a predetermined level.

The interface and control unit 930 is configured to operably control the voltage regulator 920, so as to regulate the output voltage VOUT to the predetermined level. And, the interface and control unit 930 is configured to operably control a switching frequency of the voltage regulator 920 and/or configured to operably control a switching frequency of the resonant switched capacitor converter circuit 910 via a communication interface IFC1 and a communication interface IFC2, to enhance power conversion efficiency of the power conversion system 3900.

In one embodiment, the interface and control unit 930 is configured to operably control the switching frequency of the voltage regulator 920 to be synchronous with the switching frequency of the resonant switched capacitor converter circuit 910, to mitigate electrical magnetic interference (EMI) of the power conversion system 3900.

In one embodiment, the resonant switched capacitor converter circuit 910 is configured to operably adjust the switching frequency of the resonant switched capacitor converter circuit 910 through adjusting the delay periods of at least a part of the switches (i.e. a part of the switches Q1~Q10 in the aforementioned embodiments).

As shown in FIG. 39, the interface and control unit 930 and the voltage regulator 920 are coupled to a center processing unit (CPU)/graphic processing unit (GPU)/memory unit (MU) 940, and the output voltage VOUT is supplied to the CPU/GPU/MU 940. The CPU/GPU/MU 940, as expressed by its name, can be a processing unit, a graphic processing unit (GPU), a memory unit (MU), or a circuit combining two or more of the above functions.

In one embodiment, the interface and control unit 930 is configured to operably adjust for example the above-mentioned control signal GA, control signal GB and/or a delay period of the control signal GA and a delay period of the control signal GB according to demands from the CPU/GPU/MU 940, so as to regulate a ratio of the first voltage V1 to the second voltage V2 and a ratio of the second voltage V2 to the output voltage VOUT. In another embodiment, the interface and control unit 930 is configured to operably adjust a resonant frequency of the resonant switched capacitor converter circuit 910 and a switching frequency of the voltage regulator 920 according to demands from the CPU/GPU/MU 940. The above-mentioned communication interface can be, for example but not limited to an Inter-Integrated Circuit (I2C) interface.

In one embodiment, the power conversion system 3900 further comprises a power supply unit 950, which is configured to operably provide a power supply. In one embodiment, the power supply unit 950 comprises: an electrical magnetic interference (EMI) mitigator having a filtering frequency band. The aforementioned resonant frequency of the resonant switched capacitor converter circuit 910 and switching frequency of the voltage regulator 920 which are synchronous with each other can be arranged to lie within the filtering frequency band of the EMI mitigator, to simultaneously filter EMIs of the resonant switched capacitor converter circuit 910 and the voltage regulator 920, thereby improving EMI filtering effects.

The present invention proposes an innovated switched capacitor converter circuit having a pipeline configuration. Advantages of the present invention include that: the pipeline switched capacitor converter circuit of the present invention can expand its layers and can adjust its scaling factor of conversion flexibly according to practical requirements; through configuring inductors at current paths, the switched capacitor converter circuit of the present invention can be expanded to become a resonant switched capacitor converter circuit having a pipeline configuration; the surge current is suppressed; the pipeline resonant switched capacitor converter circuit of the present invention can execute bidirectional power conversion; zero current switching and zero voltage switching can be achieved by several control mechanisms; the pipeline resonant switched capacitor converter circuit of the present invention can operate in CCM and provides a function of pre-charging, etc; the present invention can effectively simplify circuit structure, enhance power conversion efficiency, and reduce ripple and noise.

The present invention has been described in considerable detail with reference to certain preferred embodiments thereof. It should be understood that the description is for illustrative purpose, not for limiting the broadest scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. In view of the foregoing, the spirit of the present invention should cover all such and other modifications and variations, which should be interpreted to fall within the scope of the following claims and their equivalents.

What is claimed is:

1. A switched capacitor converter circuit, which is configured to operably convert a first power to a second power or to operably convert the second power to the first power; the switched capacitor converter circuit comprising:
  at least one switching converter; and
  a control circuit, which is configured to operably control the switching converter;
  wherein the at least one switching converter includes:
    a plurality of capacitors; and
    a plurality of switches, which are controlled by the control circuit to operably and periodically switch the plurality of capacitors according to a plurality of cycle periods;
    wherein during a first period within one cycle period, the plurality of switches are configured to operably control at least two of the plurality of capacitors to be electrically connected in series between the first power and the second power, and the plurality of switches are configured to operably control at least one of the plurality of capacitors to be electrically connected in parallel to the second power;
    wherein during a second period within the one cycle period, the plurality of switches are configured to operably control at least two of the plurality of capacitors to be electrically connected in series between the second power and a ground voltage level, and the plurality of switches are configured to operably control at least one of the plurality of capacitors to be electrically connected in parallel to the second power;
    wherein the capacitor electrically connected in parallel to the second power during the first period is different from the capacitor electrically connected in parallel to the second power during the second period;
    whereby power conversion between the first power and the second power is achieved during the plurality of cycle periods.

2. The switched capacitor converter circuit of claim 1, wherein the plurality of capacitors include: a first capacitor, a second capacitor and a third capacitor, which are coupled to one another;
  wherein during the first period within the one cycle period, the plurality of switches are configured to operably control the first capacitor and the third capacitor to be electrically connected in series between the first power and the second power, and the plurality of switches are configured to operably control the second capacitor to be electrically connected in parallel to the second power;
  wherein during the second period within the one cycle period, the plurality of switches are configured to operably control the second capacitor and the third capacitor to be electrically connected in series between the second power and the ground voltage level, and the plurality of switches are configured to operably control the first capacitor to be electrically connected in parallel to the second power;
  whereby power conversion between the first power and the second power is achieved during the plurality of cycle periods.

3. The switched capacitor converter circuit of claim 2, wherein a ratio of a first voltage of the first power to a second voltage of the second power is equal to 4.

4. The switched capacitor converter circuit of claim 3, wherein a ratio of a voltage across the third capacitor to the second voltage is equal to 2, whereas, a ratio of a voltage across the first capacitor to the second voltage is equal to 1, and whereas, a ratio of a voltage across the second capacitor to the second voltage is equal to 1.

5. The switched capacitor converter circuit of claim 2, wherein the plurality of switches include:
  a first switch, a second switch, a third switch, a fourth switch, a fifth switch, a sixth switch, a seventh switch, an eighth switch, a ninth switch and a tenth switch;
  wherein during the first period within the one cycle period, the first switch, the second switch and the third switch are ON to control the first capacitor and the third capacitor to be electrically connected in series between the first power and the second power, and the fourth switch and the fifth switch are ON to control the second capacitor to be electrically connected in parallel to the second power, while the sixth switch to the tenth switch are OFF;
  wherein during the second period within the one cycle period, the sixth switch, the seventh switch and the eighth switch are ON to control the second capacitor and the third capacitor to be electrically connected in series between the second power and the ground voltage level, and the ninth switch and the tenth switch are ON to control the first capacitor to be electrically connected in parallel to the second power;
  whereby power conversion between the first power and the second power is achieved during the plurality of cycle periods.

6. The switched capacitor converter circuit of claim 2, further comprising:
  at least one inductor coupled to at least one current path of the plurality of capacitors; wherein the plurality of switches are further configured to operably and periodically switch a coupling relationship between the at least one inductor and the first capacitor and/or a coupling relationship between the at least one inductor and the second capacitor, so that the at least one inductor and the first capacitor and/or the at least one inductor and the second capacitor operate in resonant fashion, thereby achieving power conversion between the first power and the second power.

7. The switched capacitor converter circuit of claim 6, wherein the switched capacitor converter circuit further comprises one of the following features:
  (1) the at least one inductor includes: a first inductor and a second inductor, wherein the first capacitor is directly electrically connected in series to the first inductor, so that the first capacitor and the first inductor constitutes a first resonant tank, and wherein the second capacitor is directly electrically connected in series to the second inductor, so that the second capacitor and the second inductor constitutes a second resonant tank;
  wherein during the first period within the one cycle period, the plurality of switches are configured to operably control the first resonant tank and the third capacitor to be electrically connected in series between the first power and the second power, and the plurality of switches are configured to operably control the second resonant tank to be electrically connected in parallel to the second power;

wherein during the second period within the one cycle period, the plurality of switches are configured to operably control the second resonant tank and the third capacitor to be electrically connected in series between the second power and the ground voltage level, and the plurality of switches are configured to operably control the first resonant tank to be electrically connected in parallel to the second power;

(2) the at least one inductor is coupled between the second power and a switching node;

wherein during the first period within the one cycle period, the plurality of switches control the first capacitor and the third capacitor to be electrically connected in series to the at least one inductor via the switching node, and the series circuit formed by the first capacitor, the third capacitor and the at least one inductor is electrically connected in series between the first power and the second power, and the plurality of switches control the second capacitor to be electrically connected in series to the at least one inductor via the switching node, and the series circuit formed by the second capacitor and the at least one inductor is electrically connected in parallel to the second power;

wherein during the second period within the one cycle period, the plurality of switches control the second capacitor and the third capacitor to be electrically connected in series to the at least one inductor via the switching node, and the series circuit formed by the second capacitor, the third capacitor and the at least one inductor is electrically connected in series between the second power and the ground voltage level, and the plurality of switches control the first capacitor to be electrically connected in series to the at least one inductor via the switching node, and the series circuit formed by the first capacitor and the at least one inductor is electrically connected in parallel to the second power; or (3) the at least one inductor includes: a third inductor and a fourth inductor, wherein the third inductor is coupled between the second power and a first switching node, whereas, the fourth inductor is coupled between the second power and a second switching node;

wherein during the first period within the one cycle period, the plurality of switches control the first capacitor and the third capacitor to be electrically connected in series to the third inductor via the first switching node, and the series circuit formed by the first capacitor, the third capacitor and the third inductor is electrically connected in series between the first power and the second power, and the plurality of switches control the second capacitor to be electrically connected in series to the fourth inductor via the second switching node, and the series circuit formed by the second capacitor and the fourth inductor is electrically connected in parallel to the second power;

wherein during the second period within the one cycle period, the plurality of switches control the second capacitor and the third capacitor to be electrically connected in series to the fourth inductor via the second switching node, and the series circuit formed by the second capacitor, the third capacitor and the fourth inductor is electrically connected in series between the second power and the ground voltage level, and the plurality of switches control the first capacitor to be electrically connected in series to the third inductor via the first switching node, and the series circuit formed by the first capacitor and the third inductor is electrically connected in parallel to the second power.

8. The switched capacitor converter circuit of claim 6, wherein a capacitance of the third capacitor is far more greater than a capacitance of the first capacitor and the capacitance of the third capacitor is far more greater than a capacitance of the second capacitor, so that a first resonant frequency of the first capacitor and the at least one inductor is greater than or equal to ten times of a third resonant frequency of the third capacitor and the at least one inductor, and a second resonant frequency of the second capacitor and the at least one inductor is greater than or equal to ten times of a third resonant frequency of the third capacitor and the at least one inductor.

9. The switched capacitor converter circuit of claim 7, wherein in the feature (1), a resonant current of the at least one inductor is a full-wave AC sinusoidal wave.

10. The switched capacitor converter circuit of claim 7, wherein in the feature (2) or the feature (3), a resonant current of the at least one inductor is a full-wave rectified sinusoidal wave.

11. The switched capacitor converter circuit of claim 6, wherein at least a part of the plurality of switches are switched at time points at which an inductor current of the at least one inductor is zero, so that the at least a part of the plurality of switches achieve zero current switching.

12. The switched capacitor converter circuit of claim 11, wherein a first part of the plurality of switches are switched after a delay period subsequent to a time point at which the inductor current reaches zero, so that the inductor current of the at least one inductor continues flowing, so that a second part of the plurality of switches achieve zero voltage switching; or the first part of the plurality of switches are switched before a preceding period prior to the time point at which the inductor current reaches zero, so that the second part of the plurality of switches achieve the zero voltage switching.

13. The switched capacitor converter circuit of claim 2, wherein in a 2-fold conversion mode, a part of the plurality of switches are always ON, whereas, another part of the plurality of switches are always OFF, and whereas, yet another part of the plurality of switches are configured to operably switch one of the second capacitor and the third capacitor according to the plurality of cycle periods, so that during the first period within the one cycle period, one of the second capacitor and the third capacitor is electrically connected in series between the first power and the second power, and during the second period within the one cycle period, said one of the second capacitor and the third capacitor is electrically connected in parallel to the second power, such that a ratio of a first voltage of the first power to a second voltage of the second power is equal to 2.

14. The switched capacitor converter circuit of claim 6, wherein in a 2-fold conversion mode, a part of the plurality of switches are always ON, whereas, another part of the plurality of switches are always OFF, and whereas, yet another part of the plurality of switches are configured to operably switch one of the second capacitor and the third capacitor according to the plurality of cycle periods, so that during the first period within the one cycle period, said one of the second capacitor and the third capacitor and the at least one inductor are electrically connected in series between the first power and the second power, and during the second period within the one cycle period, a series circuit formed by the capacitor and the at least one inductor is electrically connected in parallel to the second power, such that a ratio of a first voltage of the first power to a second voltage of the second power is equal to 2, wherein the capacitor and the at least one inductor operate in resonant fashion to achieve power conversion between the first power and the second power.

15. The switched capacitor converter circuit of claim 2, wherein in a 3-fold conversion mode, a part of the plurality of switches are always ON, whereas, another part of the plurality of switches are always OFF, and whereas, yet another part of the plurality of switches are configured to operably switch the first capacitor and the third capacitor according to the plurality of cycle periods, so that during the first period within the one cycle period, the first capacitor and the third capacitor are electrically connected in series between the first power and the second power, and during the second period within the one cycle period, the first capacitor and the third capacitor are electrically connected in parallel to the second power, such that a ratio of a first voltage of the first power to a second voltage of the second power is equal to 3.

16. The switched capacitor converter circuit of claim 6, wherein in a 3-fold conversion mode, a part of the plurality of switches are always ON, whereas, another part of the plurality of switches are always OFF, and whereas, yet another part of the plurality of switches are configured to operably switch the first capacitor and the third capacitor according to the plurality of cycle periods, so that during the first period within the one cycle period, the first capacitor and the third capacitor are electrically connected in series between the first power and the second power, and during the second period within the one cycle period, the first capacitor and the third capacitor are electrically connected in parallel to the second power, such that a ratio of a first voltage of the first power to a second voltage of the second power is equal to 3; wherein the at least one inductor along with the first capacitor and/or the at least one inductor along with the third capacitor operate in resonant fashion to achieve power conversion between the first power and the second power.

17. The switched capacitor converter circuit of claim 6, wherein the switching converter includes: a plurality of inductors coupled to a plurality of current patties of the plurality of capacitors, wherein the plurality of switches are configured to operably and periodically switch coupling relationships between the plurality of inductors and the plurality of capacitors, so that each inductor and a corresponding one of the capacitors operate in resonant fashion to achieve power conversion between the first power and the second power, wherein at least two of the plurality of inductors have coupled inductance between each other.

18. The switched capacitor converter circuit of claim 17, wherein the at least two of the plurality of inductors having coupled inductance between each other are configured as coupled inductors or configured as a transformer.

19. The switched capacitor converter circuit of claim 1, wherein the at least one switching converter includes: a first switching converter and a second switching converter, wherein the first switching converter and the second switching converter are coupled in parallel between the first power and the second power, wherein the first switching converter and the second switching converter are configured to operably switch the corresponding plurality of switches therein, respectively, in respective phases of the first switching converter and the second switching converter which are opposite to each other.

20. The switched capacitor converter circuit of claim 7, wherein the at least one switching converter includes: a first switching converter and a second switching converter, wherein the first switching converter and the second switching converter are coupled in parallel between the first power and the second power, wherein the first switching converter and the second switching converter are configured to operably switch the corresponding plurality of switches therein, respectively, in respective phases of the first switching converter and the second switching converter which are opposite to each other.

21. The switched capacitor converter circuit of claim 7, wherein the switched capacitor converter circuit has the feature (3), and wherein the third inductor and the fourth inductor both operate in a continuous conduction mode (CCM).

22. The switched capacitor converter circuit of claim 21, wherein the switched capacitor converter circuit has the feature (3), and wherein a switching frequency corresponding to the cycle period is lower than a resonant frequency of the third inductor and the first capacitor and/or the switching frequency corresponding to the cycle period is lower than a resonant frequency of the fourth inductor and the second capacitor.

23. The switched capacitor converter circuit of claim 6, wherein the control circuit includes:
a zero current detection circuit, which is configured to operably generate a zero current detection signal according to an inductor current flowing through the at least one inductor;
wherein when the zero current detection signal indicates that the inductor current is zero, each switch is switched to its opposite phase state, whereby power conversion between the first power and the second power is executed.

24. The switched capacitor converter circuit of claim 23, wherein the control circuit further includes:
a delay circuit, which is configured to operably delay a time point at which each switch is switched to its opposite phase state.

25. The switched capacitor converter circuit of claim 24, wherein the zero current detection circuit includes:
a zero current estimation circuit, which is coupled to one or more of (1)-(3): (1) the at least one inductor, (2) the first capacitor and (3) the second capacitor, and which is configured to operably estimate a time point at which the inductor current is zero correspondingly according to one or more of (1)-(3): (1) a voltage difference across two ends of the at least one inductor, (2) a voltage difference across two ends of the first capacitor and (3) a voltage difference across two ends of the second capacitor, so as to generate the zero current detection signal.

26. The switched capacitor converter circuit of claim 25, wherein the zero current estimation circuit includes:
a voltage detection circuit, which is configured to operably generate a voltage detection signal according to the voltage difference across the two ends of the at least one resonator, wherein the voltage detection signal is indicative of a first period wherein the voltage difference across the two ends of the at least one resonator is above zero voltage;
a ramp circuit, which is configured to operably generate a first ramp of a ramp signal according to the voltage detection signal during the first period, and to operably generate a second ramp of the ramp signal following an end of the first ramp after the first period ends, wherein a slope of the first ramp and a slope of the second ramp have a same absolute value but opposite signs; and a comparison circuit, which is configured to operably indicate the time point at which the inductor current is zero when the second ramp reaches a zero current threshold, for generating the zero current detection signal.

27. The switched capacitor converter circuit of claim 25, wherein the zero current estimation circuit is configured to operably estimate the time point at which the inductor current is zero according to one or more of (1)-(2): (1) a time point at which a voltage difference across two ends of the first capacitor reaches a peak and a time point at which the voltage difference across two ends of the first capacitor reaches a valley and (2) a time point at which a voltage difference across two ends of the second capacitor reaches a peak and a time point at which the voltage difference across two ends of the second capacitor reaches a valley, for generating the zero current detection signal.

28. The switched capacitor converter circuit of claim 6, wherein the at least one inductor includes a plurality of inductors, and wherein a plurality of inductor currents of the plurality of inductors are regulated via the following way:
wherein the control circuit is further configured to operably generate a plurality of delay periods and the control circuit is further configured to operably adjust at least one of the plurality of delay periods according to a difference between an average of the plurality of inductor currents and at least one of the plurality of inductor currents, so that the plurality of inductor currents have a constant ratio among one another;
wherein the plurality of inductor currents correspond to an inductor current of the first inductor and an inductor current of the second inductor or the plurality of inductor currents correspond to an inductor current of the third inductor and an inductor current of the fourth inductor;
wherein the plurality of delay periods are configured to operably delay a starting time point of charging a corresponding one of the inductor or a starting time point of discharging a corresponding one of the inductor.

29. The switched capacitor converter circuit of claim 28, wherein the constant ratio is 1:1.

30. The switched capacitor converter circuit of claim 6, wherein one of the plurality of capacitors functions as a distribution capacitor, and one of the plurality of switches functions as a pre-charging transistor;
wherein the pre-charging transistor is electrically connected between an input power and the distribution capacitor, wherein the input power corresponds to one of the first power and the second power;
wherein in a pre-charging mode, the control circuit is further configured to operably control a conduction level of the pre-charging transistor by feedback linear control and is further configured to operably control switchings of the rest of the plurality of switches, so as to control electrical connection relationships among the plurality of capacitors, so that when a voltage drop across the distribution capacitor is lower than a voltage threshold, a voltage across at least one of the plurality of capacitors is pre-charged to a predetermined voltage.

31. The switched capacitor converter circuit of claim 30, wherein the predetermined voltage is a target voltage of an output voltage, wherein the output voltage corresponds to a voltage of another one of the first power and the second power.

32. The switched capacitor converter circuit of claim 6, further comprising: a driver circuit, which is configured to operably drive at least a part of the plurality of switches, wherein the driver circuit includes:
a plurality of drivers, which are configured to operably generate a plurality of driving signals under control by the control circuit, wherein the plurality of driving signals are configured to operably and periodically drive a part of the plurality of switches, so as to execute power conversion between the first power and the second power in resonant fashion; and
a power supply circuit, which is configured to operably provide a plurality of driving powers for the part of the plurality of switches, wherein the power supply circuit includes:
a voltage booster circuit, which is configured to operably generate a boost power according to a clock signal, a direct current (DC) voltage and an output related signal which is related to an output voltage, wherein a voltage of the boost power is correlated to a sum of an input voltage plus the output related signal, wherein the input voltage and the output voltage correspond to a first voltage of the first power and a second voltage of the second power, respectively, or wherein the input voltage and the output voltage correspond to the second voltage and the first voltage, respectively;
a plurality of driving capacitors, wherein a voltage across each driving capacitor corresponds to a corresponding one of the driving powers; and
a plurality of supply diodes, which are coupled to the boost power and coupled in series in an order along a forward friction of the plurality of supply diodes from the boost power, wherein a backward end of each supply diode is coupled to a positive end of the corresponding driving power, so as to charge a corresponding one of the driving capacitors to generate the corresponding driving power, and wherein the plurality of supply diodes are configured to operably block a backward current and a backward voltage.

33. The switched capacitor converter circuit of claim 32, wherein the voltage booster circuit, a corresponding one of the driving capacitors and a corresponding one of the supply diodes constitute a charge pump, wherein when the boost power is generated by the voltage booster circuit, the corresponding supply diode charges the corresponding driving capacitor according to the boost power, so as to generate the corresponding driving power, wherein a negative end of the corresponding driving power is coupled to the output voltage, and the corresponding driving power is correlated to the input voltage.

34. The switched capacitor converter circuit of claim 32, wherein the voltage booster circuit, a corresponding one of the driving capacitors, a corresponding one of the supply diodes and a corresponding one of the switches constitute a bootstrap circuit, when the boost power is generated by the voltage booster circuit, the corresponding supply diode charges the corresponding driving capacitor according to a second boost power, so as to generate the corresponding driving power, wherein a voltage at a negative end of the corresponding driving power is varied as the plurality of switches perform switching and a voltage at the positive end of the corresponding driving power is varied as the plurality of switches perform switching, wherein in a steady state, the corresponding driving power is correlated to the input voltage, wherein the second boost power is correlated to the boost power.

35. The switched capacitor converter circuit of claim 1, further comprising: an upper layer capacitor and a plurality of upper layer switches, wherein the at least one switching converter includes: a first switching converter and a second switching converter; wherein the upper layer capacitor, the plurality of upper layer switches, the first switching converter and the second switching converter are coupled to one another according to a fundamental topology;

wherein during a first period within the one cycle period, the plurality of upper layer switches are configured to operably control the first switching converter and the upper layer capacitor to be electrically connected in series between the first power and the second power, and the plurality of upper layer switches are configured to operably control the second switching converter to be electrically connected in parallel to the second power;

wherein during a second period within the one cycle period, the plurality of upper layer switches are configured to operably control the second switching converter and the upper layer capacitor to be electrically connected in series between the second power and a ground voltage level, and the plurality of upper layer switches are configured to operably control the first switching converter to be electrically connected in parallel to the second power.

36. The switched capacitor converter circuit of claim 6, further comprising: an upper layer capacitor and a plurality of upper layer switches, wherein the at least one switching converter includes: a first switching converter and a second switching converter; wherein the upper layer capacitor, the plurality of upper layer switches, the first switching converter and the second switching converter are coupled to one another according to a fundamental topology;

wherein during a first period within the one cycle period, the plurality of upper layer switches are configured to operably control the first switching converter and the upper layer capacitor to be electrically connected in series between the first power and the second power, and the plurality of upper layer switches are configured to operably control the second switching converter to be electrically connected in parallel to the second power;

wherein during a second period within the one cycle period, the plurality of upper layer switches are configured to operably control the first switching converter and the upper layer capacitor to be electrically connected in series between the second power and a ground voltage level, and the plurality of upper layer switches are configured to operably control the second switching converter to be electrically connected in parallel to the second power.

37. The switched capacitor converter circuit of claim 36, wherein a ratio of a first voltage of the first power to a second voltage of the second power is equal to 8.

38. The switched capacitor converter circuit of claim 36, further comprising: a further upper layer capacitor, a plurality of further upper layer switches, a further upper layer first switching converter and a further upper layer second switching converter, wherein the further upper layer capacitor, the plurality of further upper layer switches, the further upper layer first switching converter and the further upper layer second switching converter are coupled to one another according to the fundamental topology so that the fundamental topology expands recursively, wherein each of the further upper layer first switching converter and the further upper layer second switching converter has a configuration corresponding to the switched capacitor converter circuit of a layer below.

39. A power conversion system, comprising:
a switched capacitor converter circuit of claim 6;
a voltage regulator, which is configured to operably receive a first stage power supply, so as to generate an output voltage, wherein the output voltage is regulated to a predetermined level; and
an interface and control unit, which is configured to operably control the voltage regulator, so as to regulate the output voltage to the predetermined level, wherein the interface and control unit is configured to operably control a switching frequency of the voltage regulator and/or configured to operably control a switching frequency of the switched capacitor converter circuit via a communication interface, thus enhancing power conversion efficiency of the power conversion system.

40. The power conversion system of claim 39, wherein the interface and control unit is configured to operably control the switching frequency of the voltage regulator to be synchronous with the switching frequency of the switched capacitor converter circuit, thus mitigating electrical magnetic interference (EMI) of the power conversion system.

41. The power conversion system of claim 39, wherein the switched capacitor converter circuit is configured to operably adjust the switching frequency of the switched capacitor converter circuit through adjusting delay periods corresponding to at least part of the plurality of switches.

\* \* \* \* \*